US012596059B2

(12) United States Patent
Mitra et al.

(10) Patent No.: US 12,596,059 B2
(45) Date of Patent: Apr. 7, 2026

(54) AUTOMATED TISSUE SECTIONING AND STORAGE SYSTEM

(71) Applicant: Clarapath, Inc., New York, NY (US)

(72) Inventors: Partha P. Mitra, New York, NY (US); Baris Yagci, Montclair, NJ (US); Cong Zhang, Hawthorne, NY (US)

(73) Assignee: Clarapath, Inc., Hawthorne, NY (US)

( * ) Notice: Subject to any disclaimer, the term of this patent is extended or adjusted under 35 U.S.C. 154(b) by 131 days.

(21) Appl. No.: 18/529,124

(22) Filed: Dec. 5, 2023

(65) Prior Publication Data

US 2024/0288342 A1 Aug. 29, 2024

Related U.S. Application Data

(63) Continuation of application No. 17/505,182, filed on Oct. 19, 2021, now Pat. No. 11,874,208, which is a continuation of application No. 16/940,176, filed on Jul. 27, 2020, now Pat. No. 11,169,056, which is a continuation of application No. 15/588,636, filed on May 6, 2017, now Pat. No. 10,724,929.

(60) Provisional application No. 62/336,521, filed on May 13, 2016, provisional application No. 62/336,523, filed on May 13, 2016.

(51) Int. Cl.
*G01N 1/00* (2006.01)
*G01N 1/28* (2006.01)

(52) U.S. Cl.
CPC ... *G01N 1/2813* (2013.01); *G01N 2001/2833* (2013.01)

(58) Field of Classification Search
None
See application file for complete search history.

(56) References Cited

U.S. PATENT DOCUMENTS

| | | | |
|---|---|---|---|
| 3,552,247 | A | 1/1971 | Pickett |
| 3,667,330 | A | 6/1972 | Kobernick |
| 3,690,933 | A | 9/1972 | Cole |
| 3,690,988 | A | 9/1972 | Ullberg et al. |
| 3,832,923 | A | 9/1974 | Lassmann et al. |
| 3,939,019 | A | 2/1976 | Pickett |
| 4,190,472 | A | 2/1980 | Sionicki |
| 4,257,346 | A | 3/1981 | Ornstein et al. |

(Continued)

FOREIGN PATENT DOCUMENTS

| | | |
|---|---|---|
| JP | 2008216109 A | 9/2008 |
| WO | WO 2012033842 A2 | 3/2012 |

(Continued)

OTHER PUBLICATIONS

Palmgren, "Tape for Microsectioning of Very Large, Hard or Brittle Specimens" Nature, vol. 174, p. 46, Jul. 3, 1954.

(Continued)

*Primary Examiner* — Jyoti Nagpaul
(74) *Attorney, Agent, or Firm* — Greenberg Traurig, LLP; Roman Fayerberg; Richard Brooks

(57) ABSTRACT

A method and apparatus for automatically transferring sections from a sample block to a tape and for transferring select sections to a slide. A tissue storage system for storing cut sections on the tape and digital storage system for storing photos and other information during the transfer of the sections can also be provided, thereby creating a tissue repository and data repository for future use.

20 Claims, 34 Drawing Sheets

(56) References Cited

U.S. PATENT DOCUMENTS

| | | | |
|---|---|---|---|
| 4,264,560 | A | 4/1981 | Natelson |
| 4,545,831 | A | 10/1985 | Ornstein |
| 4,752,347 | A | 6/1988 | Rada |
| 4,883,642 | A | 11/1989 | Bisconte |
| 5,156,019 | A | 10/1992 | McCormick |
| 5,444,105 | A | 8/1995 | Ornstein |
| 5,480,508 | A | 1/1996 | Manabe et al. |
| 5,713,255 | A | 2/1998 | Izvozichikov et al. |
| 5,740,708 | A | 4/1998 | Tabone |
| 5,746,855 | A | 5/1998 | Bolles |
| 5,958,341 | A | 9/1999 | Chu |
| 6,253,653 | B1 | 7/2001 | Walter et al. |
| 6,330,348 | B1 | 12/2001 | Kerschmann et al. |
| 6,387,653 | B1 | 5/2002 | Voneiff et al. |
| 6,568,307 | B1 | 5/2003 | Gunther |
| 6,598,507 | B1 | 7/2003 | Gunther et al. |
| 6,634,268 | B1 | 10/2003 | Guenther et al. |
| 6,715,870 | B2 | 4/2004 | Kiene et al. |
| 6,720,191 | B1 | 4/2004 | Goldstein et al. |
| 7,374,907 | B1 | 5/2008 | Voneiff et al. |
| 7,503,245 | B2 | 3/2009 | Miyazawa et al. |
| 7,677,289 | B2 | 3/2010 | Hayworth et al. |
| 7,811,518 | B2 | 10/2010 | Kokubo |
| 7,866,464 | B2 | 1/2011 | Miyatani et al. |
| 7,966,091 | B2 | 6/2011 | Fujimoto et al. |
| 8,048,206 | B2 | 11/2011 | Schmitt et al. |
| 8,051,760 | B2 | 11/2011 | Walter |
| 8,056,456 | B2 | 11/2011 | Walter |
| 8,074,547 | B2 | 12/2011 | Ito et al. |
| 8,166,855 | B2 | 5/2012 | Ito et al. |
| 8,192,136 | B2 | 6/2012 | Walter et al. |
| 8,256,332 | B2 | 9/2012 | Walter |
| 8,272,225 | B2 | 9/2012 | Walter |
| 8,309,038 | B2 | 11/2012 | Walter et al. |
| 8,640,585 | B2 | 2/2014 | Zust et al. |
| 8,647,836 | B2 | 2/2014 | Heid et al. |
| 8,765,401 | B2 | 7/2014 | Schmitt et al. |
| 8,869,666 | B2 | 10/2014 | Yang et al. |
| 8,967,024 | B2 | 3/2015 | Magavi et al. |
| 8,996,570 | B2 | 3/2015 | Stratman et al. |
| 9,032,854 | B2 | 5/2015 | Yang et al. |
| 9,057,671 | B1 | 6/2015 | Orfield et al. |
| 9,250,253 | B2 | 2/2016 | Markin |
| 9,304,064 | B2 | 4/2016 | Walter |
| 9,541,473 | B2 | 1/2017 | Walter |
| 9,915,816 | B2 | 3/2018 | Alessi |
| 10,012,567 | B2 | 7/2018 | Bui et al. |
| 10,087,016 | B2 | 10/2018 | Nakajima et al. |
| 10,139,613 | B2 | 11/2018 | Hing et al. |
| 10,473,557 | B2 | 11/2019 | Mitra et al. |
| 10,571,368 | B2 | 2/2020 | Zhang et al. |
| 10,724,929 | B2 | 7/2020 | Zhang et al. |
| 11,169,056 | B2 | 11/2021 | Mitra et al. |
| 11,435,268 | B2 | 9/2022 | Mitra et al. |
| 11,467,071 | B2 | 10/2022 | Mitra et al. |
| 11,506,577 | B2 | 11/2022 | Zhang et al. |
| 11,609,162 | B2 | 3/2023 | Mitra et al. |
| 11,630,035 | B2 | 4/2023 | Mitra et al. |
| 11,821,826 | B2 | 11/2023 | Mitra et al. |
| 11,874,208 | B2 | 1/2024 | Mitra et al. |
| 11,898,948 | B2 | 2/2024 | Mitra et al. |
| 11,959,835 | B2 | 4/2024 | Mitra et al. |
| 12,158,404 | B2 | 12/2024 | Mitra et al. |
| 2002/0188224 | A1 | 12/2002 | Roe |
| 2005/0126311 | A1 | 6/2005 | Miyazawa et al. |
| 2005/0235542 | A1 | 10/2005 | Metzner et al. |
| 2006/0008790 | A1 | 1/2006 | Hayworth et al. |
| 2007/0039435 | A1 | 2/2007 | Kokubo |
| 2007/0157786 | A1 | 7/2007 | Miyatani et al. |
| 2007/0180965 | A1 | 8/2007 | Ito et al. |
| 2007/0199418 | A1 | 8/2007 | Ito |
| 2007/0204734 | A1 | 9/2007 | Ito et al. |
| 2007/0204740 | A1 | 9/2007 | Miyatani et al. |

| | | | |
|---|---|---|---|
| 2008/0072723 | A1 | 3/2008 | Nakajima et al. |
| 2008/0088834 | A1 | 4/2008 | Miyatani et al. |
| 2008/0202308 | A1 | 8/2008 | Fujiwara et al. |
| 2009/0133556 | A1 | 5/2009 | Ito et al. |
| 2009/0137028 | A1 | 5/2009 | Ito et al. |
| 2009/0181422 | A1 | 7/2009 | Schmitt et al. |
| 2009/0241751 | A1 | 10/2009 | Walter |
| 2010/0030364 | A1 | 2/2010 | Fujimoto et al. |
| 2010/0047860 | A1 | 2/2010 | Fukuoka et al. |
| 2010/0050839 | A1 | 3/2010 | Miyatani et al. |
| 2010/0058913 | A1 | 3/2010 | Walter |
| 2010/0089516 | A1 | 4/2010 | Kawamoto |
| 2010/0093022 | A1 | 4/2010 | Hayworth et al. |
| 2010/0101385 | A1 | 4/2010 | Walter et al. |
| 2010/0118133 | A1 | 5/2010 | Walter et al. |
| 2010/0216221 | A1 | 8/2010 | Walter et al. |
| 2010/0229702 | A1 | 9/2010 | Fujimoto et al. |
| 2010/0279342 | A1 | 11/2010 | Kijima et al. |
| 2011/0303352 | A1 | 12/2011 | Nakajima et al. |
| 2012/0011975 | A1 | 1/2012 | Ito et al. |
| 2013/0166072 | A1 | 6/2013 | Yang et al. |
| 2014/0026683 | A1 | 1/2014 | Hayworth et al. |
| 2014/0041500 | A1 | 2/2014 | Isagawa et al. |
| 2014/0137715 | A1 | 5/2014 | Sneyders et al. |
| 2015/0008096 | A1 | 1/2015 | Ito |
| 2015/0017679 | A1 | 1/2015 | Ito et al. |
| 2015/0260619 | A1 | 9/2015 | Ott et al. |
| 2015/0268141 | A1* | 9/2015 | Miyatani .............. G01N 1/2813 |
| | | | 435/286.2 |
| 2015/0323925 | A1 | 11/2015 | Kondo |
| 2016/0084741 | A1 | 3/2016 | Bambot et al. |
| 2016/0245728 | A1 | 8/2016 | Walter et al. |
| 2016/0290895 | A1 | 10/2016 | Daniel et al. |
| 2017/0284904 | A1 | 10/2017 | Lim et al. |
| 2017/0328818 | A1 | 11/2017 | Zhang et al. |
| 2017/0363519 | A1 | 12/2017 | Gong et al. |
| 2019/0368982 | A1 | 12/2019 | Schleifer et al. |
| 2020/0064232 | A1 | 2/2020 | Mitra et al. |
| 2020/0166434 | A1 | 5/2020 | Zhang et al. |
| 2021/0063288 | A1 | 3/2021 | Mitra et al. |
| 2021/0262905 | A1 | 8/2021 | Mitra et al. |
| 2021/0262907 | A1 | 8/2021 | Mitra et al. |
| 2021/0263055 | A1 | 8/2021 | Mitra et al. |
| 2022/0034768 | A1 | 2/2022 | Mitra et al. |
| 2022/0034769 | A1 | 2/2022 | Mitra et al. |
| 2022/0042887 | A1 | 2/2022 | Mitra et al. |
| 2022/0113228 | A1 | 4/2022 | Mitra et al. |
| 2022/0128810 | A1 | 4/2022 | Mitra et al. |
| 2022/0349788 | A1 | 11/2022 | Mitra et al. |
| 2022/0364960 | A1 | 11/2022 | Smith et al. |
| 2022/0404241 | A1 | 12/2022 | Yagci et al. |
| 2023/0057075 | A1 | 2/2023 | Zhang et al. |
| 2023/0126618 | A1 | 4/2023 | Mitra et al. |
| 2023/0221222 | A1 | 7/2023 | Mitra et al. |
| 2023/0228651 | A1 | 7/2023 | Yagci et al. |
| 2023/0359010 | A1 | 11/2023 | Chen et al. |
| 2024/0167917 | A1 | 5/2024 | Mitra et al. |

FOREIGN PATENT DOCUMENTS

| | | | |
|---|---|---|---|
| WO | WO 2019209743 | A1 | 10/2019 |
| WO | WO 2021168457 | A1 | 8/2021 |
| WO | WO 2022087443 | A1 | 4/2022 |
| WO | WO 2022241261 | A1 | 11/2022 |
| WO | WO 2022271732 | A1 | 12/2022 |
| WO | WO 2023092156 | A1 | 5/2023 |
| WO | WO 2023122620 | A1 | 6/2023 |

OTHER PUBLICATIONS

Woo, "Techniques for Sectioning and Staining Tissue Cultures of Western White Pine" Ogden, UT: U.S. Dept. of Agriculture, Forest Service, Intermountain Forest & Range Experiment Station, 1970.

* cited by examiner

FIG. 24B

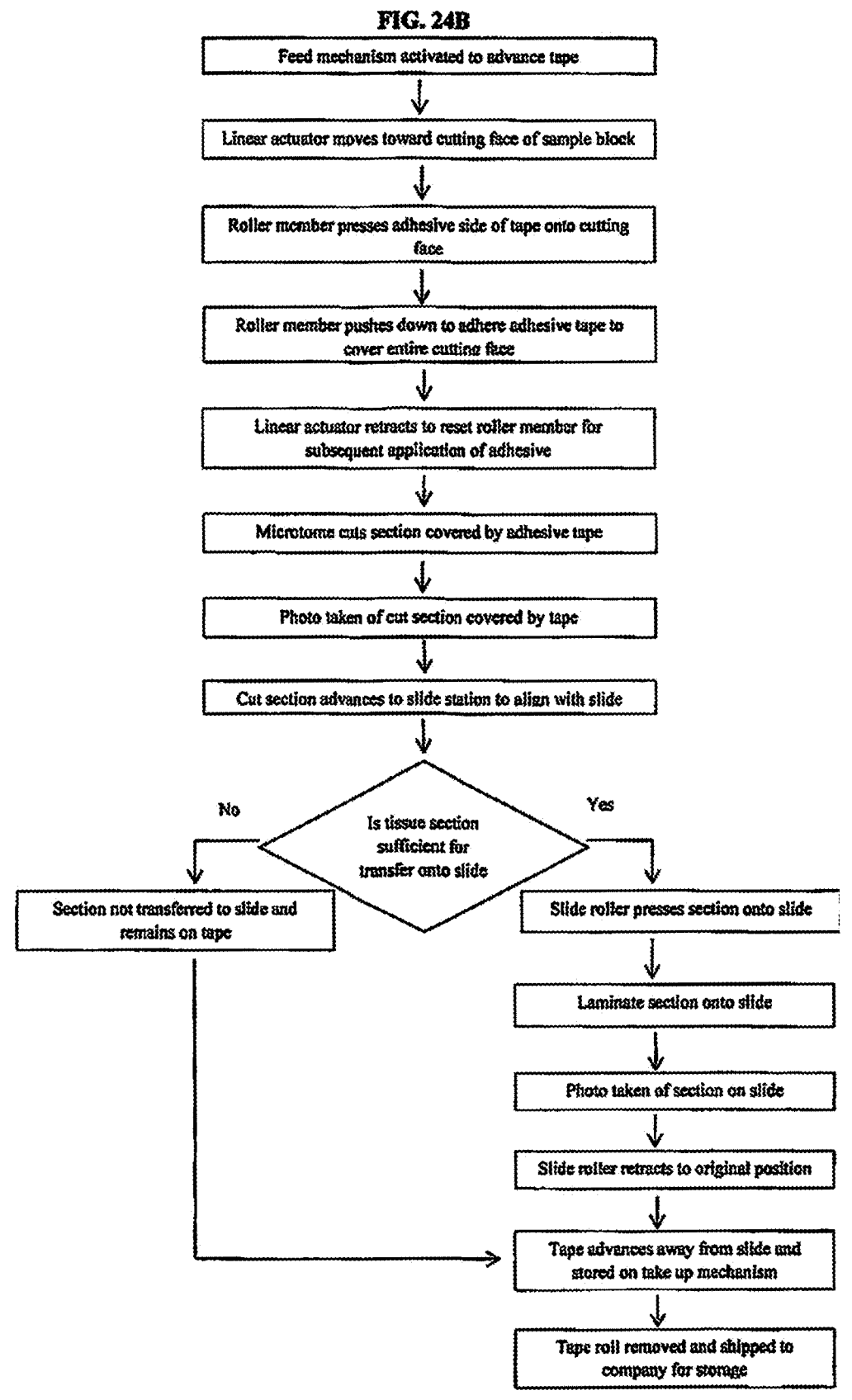

```
┌─────────────────────────────────────────────────┐
│      Feed mechanism activated to advance tape     │
└─────────────────────────────────────────────────┘
                        ↓
┌─────────────────────────────────────────────────┐
│ Linear actuator moves toward cutting face of     │
│ sample block                                      │
└─────────────────────────────────────────────────┘
                        ↓
┌─────────────────────────────────────────────────┐
│ Roller member presses adhesive side of tape onto │
│ cutting face                                      │
└─────────────────────────────────────────────────┘
                        ↓
┌─────────────────────────────────────────────────┐
│ Roller member pushes down to adhere adhesive tape│
│ to cover entire cutting face                      │
└─────────────────────────────────────────────────┘
                        ↓
┌─────────────────────────────────────────────────┐
│ Linear actuator retracts to reset roller member  │
│ for subsequent application of adhesive            │
└─────────────────────────────────────────────────┘
                        ↓
┌─────────────────────────────────────────────────┐
│  Microtome cuts section covered by adhesive tape │
└─────────────────────────────────────────────────┘
                        ↓
┌─────────────────────────────────────────────────┐
│    Photo taken of cut section covered by tape    │
└─────────────────────────────────────────────────┘
                        ↓
┌─────────────────────────────────────────────────┐
│ Cut section advances to slide station to align   │
│ with slide                                        │
└─────────────────────────────────────────────────┘
                        ↓
```

No ←          ◇ Is tissue section sufficient for transfer onto slide ◇          → Yes

```
┌────────────────────────────┐          ┌─────────────────────────────────┐
│ Section not transferred to │          │ Slide roller presses section onto│
│ slide and remains on tape  │          │ slide                            │
└────────────────────────────┘          └─────────────────────────────────┘
                                                        ↓
                                         ┌─────────────────────────────────┐
                                         │      Laminate section onto slide │
                                         └─────────────────────────────────┘
                                                        ↓
                                         ┌─────────────────────────────────┐
                                         │    Photo taken of section on slide│
                                         └─────────────────────────────────┘
                                                        ↓
                                         ┌─────────────────────────────────┐
                                         │ Slide roller retracts to original│
                                         │ position                         │
                                         └─────────────────────────────────┘
                                                        ↓
                                         ┌─────────────────────────────────┐
                                         │ Tape advances away from slide and│
                                         │ stored on take up mechanism      │
                                         └─────────────────────────────────┘
                                                        ↓
                                         ┌─────────────────────────────────┐
                                         │ Tape roll removed and shipped to │
                                         │ company for storage              │
                                         └─────────────────────────────────┘
```

FIG. 25B

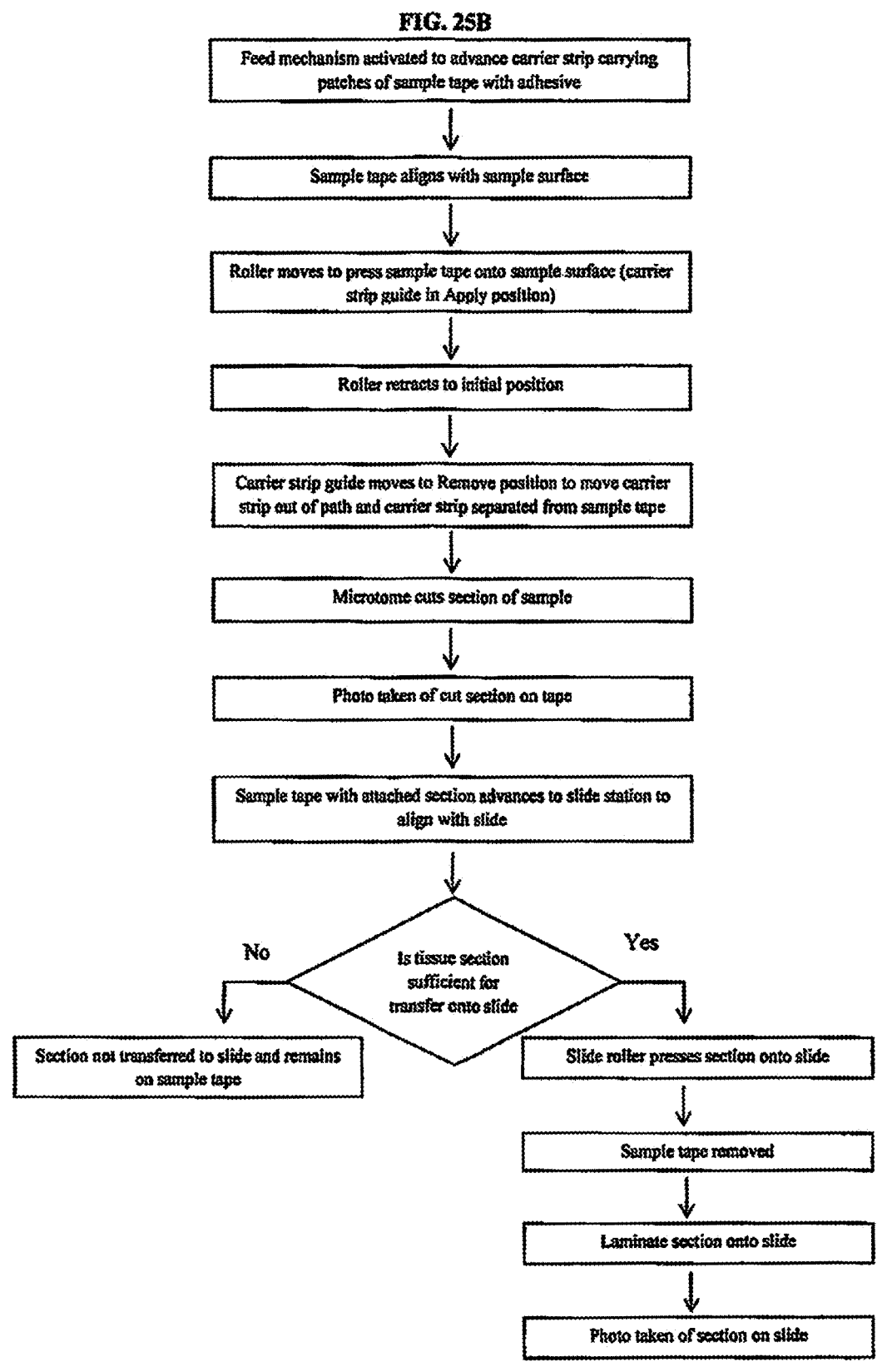

Feed mechanism activated to advance carrier strip carrying patches of sample tape with adhesive

↓

Sample tape aligns with sample surface

↓

Roller moves to press sample tape onto sample surface (carrier strip guide in Apply position)

↓

Roller retracts to initial position

↓

Carrier strip guide moves to Remove position to move carrier strip out of path and carrier strip separated from sample tape

↓

Microtome cuts section of sample

↓

Photo taken of cut section on tape

↓

Sample tape with attached section advances to slide station to align with slide

↓

No ← Is tissue section sufficient for transfer onto slide → Yes

Section not transferred to slide and remains on sample tape

Slide roller presses section onto slide

↓

Sample tape removed

↓

Laminate section onto slide

↓

Photo taken of section on slide

FIG. 26

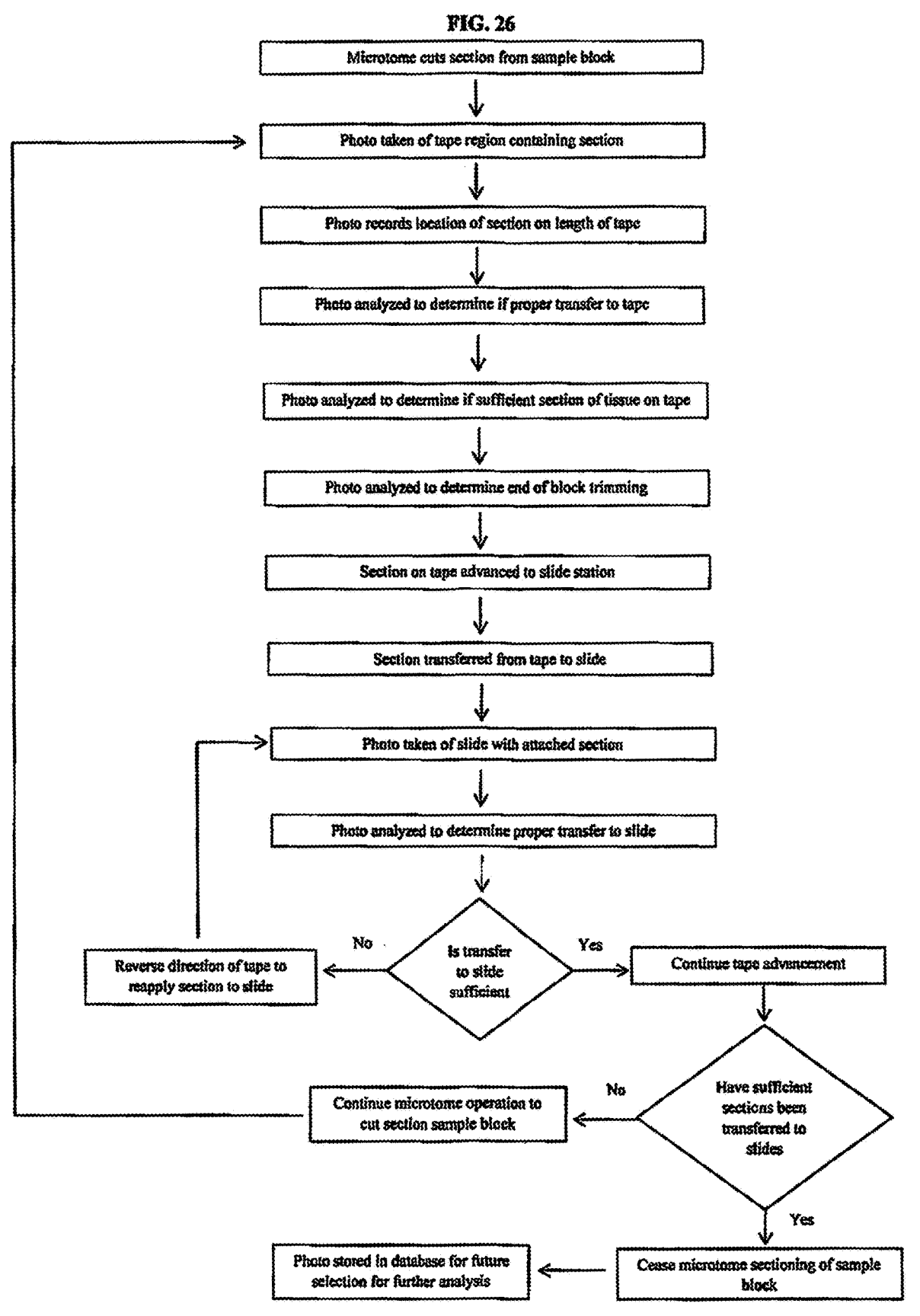

Microtome cuts section from sample block

↓

Photo taken of tape region containing section

↓

Photo records location of section on length of tape

↓

Photo analyzed to determine if proper transfer to tape

↓

Photo analyzed to determine if sufficient section of tissue on tape

↓

Photo analyzed to determine end of block trimming

↓

Section on tape advanced to slide station

↓

Section transferred from tape to slide

↓

Photo taken of slide with attached section

↓

Photo analyzed to determine proper transfer to slide

↓

Is transfer to slide sufficient

No → Reverse direction of tape to reapply section to slide

Yes → Continue tape advancement

↓

Have sufficient sections been transferred to slides

No → Continue microtome operation to cut section sample block

Yes ↓

Cease microtome sectioning of sample block

←

Photo stored in database for future selection for further analysis

FIG. 27B

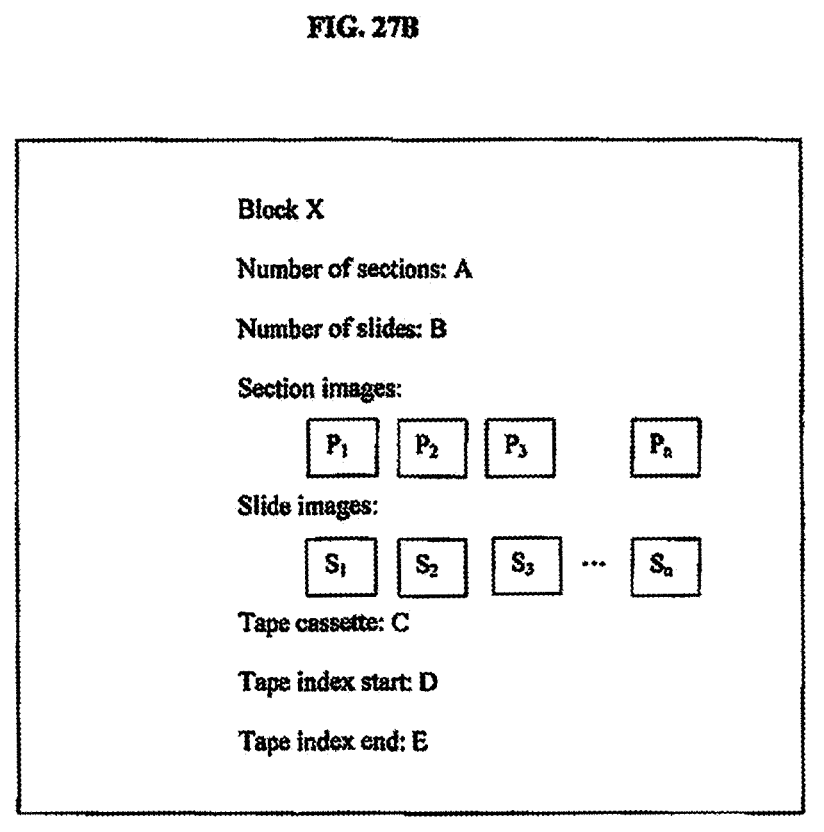

Block X

Number of sections: A

Number of slides: B

Section images:

$P_1$   $P_2$   $P_3$   $P_n$

Slide images:

$S_1$   $S_2$   $S_3$   ···   $S_n$

Tape cassette: C

Tape index start: D

Tape index end: E

Block 456                                    Block 457

FIG. 28B

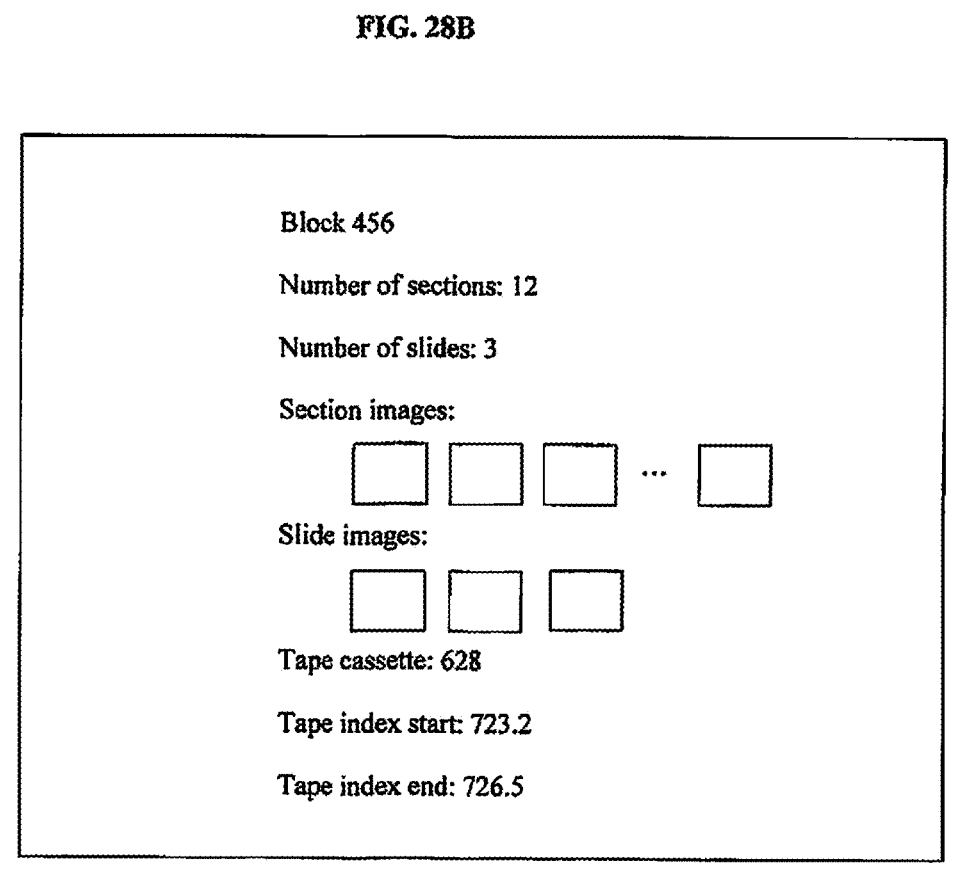

Block 456

Number of sections: 12

Number of slides: 3

Section images:

Slide images:

Tape cassette: 628

Tape index start: 723.2

Tape index end: 726.5

AUTOMATED TISSUE SECTIONING AND STORAGE SYSTEM

RELATED APPLICATIONS

This application is a continuation patent application of U.S. application Ser. No. 17/505,182, filed Oct. 19, 2021, which is a continuation patent application of U.S. application Ser. No. 16/940,176, filed Jul. 27, 2020, now U.S. Pat. No. 11,169,056, which is a continuation patent application of U.S. application Ser. No. 15/588,636, filed May 6, 2017, now U.S. Pat. No. 10,724,929, which claims priority to and the benefit of U.S. Provisional Application No. 62/336,521, filed May 13, 2016 and U.S. Provisional Application No. 62/336,523, filed May 13, 2016. The entire contents of each of these applications are incorporated herein by reference.

FIELD

The present invention relates to automated systems for transferring tissue sections to tape and slides and to storage systems.

Traditional microtomy, the production of postage-stamp sized, micron-thin tissue sections for microscope viewing, is a delicate, time consuming manual task. In the process, a microtome cuts a tissue block consisting of tissue sample, enclosed in a supporting block of embedding material such as paraffin wax. The microtome holds a blade aligned for cutting slices from one face of tissue block—the block cutting face. A common type, the rotary microtome, linearly oscillates a chuck holding the block with the cutting face in the blade-cutting plane. Combined with incremental advancement of the block cutting face into the cutting plane, the microtome successively shaves thin tissue sections off the block cutting face. For sections with paraffin wax embedding medium, an operator carefully picks up these tissue sections and floats them on warm water. The water gently de-wrinkles and reduces deformation from cutting. Finally, an operator moves the sections from water onto microscope slides for further processing.

In addition, recent advancements in the digital imaging of tissue sample sections have made it desirable to slice blocks of specimen very quickly. By way of example, where tissues are sectioned as part of clinical care, time is an important variable in improving patient care. Every minute that can be saved during sectioning of tissue for intra-operative applications of anatomic pathology, for example in examining margins of lung cancers to determine whether enough tissue has been removed, is of clinical value. To create a large number of sample sections quickly, it is desirable to automate the process of cutting tissue sections from a specimen block by a microtome blade and facilitating the transfer of cut tissue sections to an adhesive tape without reducing section quality.

Additionally, the large number of tissue sample sections cut from the block need to be transferred to slides for evaluation. As can be appreciated, if the process of cutting the samples is automated, but the transfer to slides is performed manually, then not all of the advantages of automation are achieved.

Therefore, it would be advantageous to automate one or more of these transfer functions. That is, in addition to an automated system of transferring the cut tissue sections to a continuously fed tape, an automated system that also transfers tissue sections to slides would even further enhance sample integrity and improve consistency. Additionally, such automation could decrease the need for dedicated technician time and less training time for technicians, therefore reducing costs and allowing a greater number of samples to be transferred to the slides than if performed manually. It would also be advantageous to provide a system for analyzing in real time the transfer of the cut tissue sections to the tape and to the slides to enhance quality control.

After the transfer to tape and slides has been completed, the sample collection for pathology is typically complete. However, in certain instances it might be beneficial at a later date to conduct follow-on diagnostic tests. Currently, follow-on tests require either 1) creating additional glass slides at the time of sample block sectioning to anticipate possible need or 2) recalling the original sample block and ordering more sections cut. However, additional glass slides are rarely done because of the high cost of storing and retrieving the slides. Thus, it would be advantageous to provide a simplified and cost effective system to provide for follow-on diagnostic tests, thereby improving clinical care.

Moreover being able to store both physical samples and data obtained during the tissue section transfer process would also be beneficial not only for clinical use but for training and research as well. No current systems provide such effective storage.

SUMMARY

In one aspect of the present disclosure, an automated tape transfer apparatus is provided having a feed mechanism that feeds a continuous length of an adhesive tape through the automated tape transfer apparatus and a tape applicator that applies the adhesive tape to a cutting face of a sample block, wherein the adhesive tape supports the cutting face for cutting a section of the sample block and wherein the section is adhered to the adhesive tape after the cutting and a slide station that transfers the section from the adhesive tape to a slide.

In another aspect of the present disclosure a method is provided including applying a first portion of a continuous length of an adhesive tape to a first cutting face of a sample block comprising moving the first portion of the adhesive tape away from the sample block after a first section has been cut from the sample block, wherein the first section is adhered to the first portion of the adhesive tape and the cutting exposes a second cutting face of the sample block, applying a second portion of the continuous length of the adhesive tape to the second cutting face of the sample block, moving the second portion of the adhesive tape away from the sample block after a second section has been cut from the sample block, wherein the second section is adhered to the second portion of the adhesive tape, moving the first and second portions of the continuous length of the adhesive tape that include the corresponding first and second sections to a slide station and transferring the first and second sections to a corresponding first and second slide.

A tape applicator apparatus can in some embodiments have a roller member that is in contact with an adhesive tape and a linear actuator member coupled to the roller member, wherein the linear actuator member extends a first distance in a first direction causing the roller member to contact a cutting face of a sample block, wherein the roller member applies the adhesive tape to the cutting face.

In accordance with another aspect of the present disclosure, an automated tape transfer system is provided comprising a tape feed mechanism feeding a length of tape through the automated tape transfer apparatus, a tape applicator applying regions of the tape to a cutting face of a sample block for transferring cut sections of the sample block to the regions of the tape to create a first set of cut sections adhered to the tape, and a slide station that selectively transfers a first subset of the first set of cut sections of the sample block from the tape to slides. The transfer of the first subset of cut sections leaves a second different subset of cut sections of the sample.

In some embodiments, a take up mechanism is provided taking up the tape containing the second subset of cut sections adhered thereto for access after removal of the tape from the tape transfer system. In some embodiments, the tape is part of a tape cartridge having first and second reels and can include an enclosure.

In some embodiments, the system can include a tracking system on the tape to track the location on the tape of the second subset of cut sections.

In some embodiments, a first group of sections on slides are stained and a second group of sections on slides are not stained, and at least one unstained section is adjacent a stained section.

In some embodiments, the system includes an imaging device(s) for taking photos of the cut sections after adherence to the tape and or for taking photos of the slides after the cut sections have been transferred thereto, the photos stored in a database.

In some embodiments, the cut sections are not transferred from the tape to the slide if they do not contain a sufficient amount of tissue.

In some embodiments, the tape includes an identification system including markers on the tape to indicate an absolute distance on the tape markings to track the location on the tape of the cut sections.

In some embodiments, the database includes an identification of the sample block, a number of cut sections transferred to the tape, a number of cut sections transferred to slides, and an indicator to indicate where on the tape the cut sections are contained.

In some embodiments, the system includes a control system to determine automatic cessation of cutting sections from the sample block when sufficient sections of tissue from the sample block have been transferred to slides.

In some embodiments, the system includes a quality control system evaluating transfer of the cut sections to the tape and evaluating transfer of the cut sections to the slide.

In accordance with another aspect of the present disclosure, an automated tape transfer system is provided comprising a feed mechanism for a length of tape feeding the tape through the automated tape transfer system, a tape applicator applying the section receiving portion of the tape to a sample block of tissue, a cutting mechanism cutting a section of the sample block for transfer of the cut section to the section receiving portion, a slide station downstream of the cutting mechanism for transferring the cut section of the sample block from the section receiving portion to a slide, and an imaging device for imaging the cut section.

In accordance with another aspect of the present disclosure, an automated tape transfer system is provided comprising a feed mechanism for a length of tape, the feed mechanism feeding the tape through the automated tape transfer system. A tape applicator applies the section receiving portion of the tape to a sample block of tissue and a cutting mechanism cuts a section of the sample block for transfer of the cut section to the section receiving portion. A control system determines cessation of cutting sections when sufficient sections of the sample block have been transferred to slides.

In accordance with another aspect of the present disclosure, an automated tape transfer system is provided comprising a feed mechanism for a length of tape which feeds the tape through the automated tape transfer system, the tape having a section receiving portion, a tape applicator applying the section receiving portion of the tape to a sample block of tissue, a cutting mechanism cutting a section of the sample block for transfer of the cut section to the section receiving portion, and a quality control system evaluating transfer of the cut sections to the tape.

In some embodiments, a slide station is provided for transferring the cut section from the tape to the slide, wherein the quality control system evaluates transfer of the cut section to the slide.

In accordance with another aspect of the present disclosure, a storage system for tissue samples obtained during an automated process of transferring cut sections of tissue from a sample block to a tape is provided. The system comprises a length of tape passed through an apparatus that transfers cut sections from the sample block to the tape, the tape supporting the cut sections thereon during winding up of the tape and retaining the cut sections for storage thereon after removal of the tape from the apparatus and transport of the tape to a storage site. The tape includes a tracking system to identify the location of the cut sections on the tape to correlate with the sample block from which the sections were cut. The tacking system can include an indexing system.

In some embodiments, after transport of the tape to the storage site, cut sections can be transferred from the tape to slides for follow on tests.

In some embodiments, a data storage system is provided with the tissue storage system. The data storage system includes a first set of photos taken as the length of tape is passed through the automated apparatus, the photos taken of the cut sections retained on the tape, and a photo identification system to correlate the first set of photos with the sample block from which the sections were cut. The data storage system can be used with the tissue storage system or can be utilized without the tissue storage system.

In some embodiments, the data storage system further comprises a second set of photos taken after transfer of the cut sections from the tape to slides as the tape is passed through the automated apparatus, and the photo identification system correlates the second set of photos with the sample block from which the sections were cut.

In some embodiments, a data repository is provided. The data repository contains data obtained during the automated process of transferring cut sections to the tape. The data repository can include in some embodiments, an identification of the sample block, a number of cut sections transferred to the tape, a number of cut sections transferred to slides, and an indicator to indicate where on the tape the cut sections are contained.

In some embodiments, the tissue storage system includes a tissue repository containing the wound tape which contains cut sections from the sample block that were not transferred to slides during the automated process of transfer of the cut sections to slides.

In accordance with another aspect of the present disclosure, a data storage system created during an automated process of transferring samples of tissue from a sample block to a tape is provided. The storage system comprises a first set of photos taken as the tape is passed through an apparatus that transfers cut sections from the sample block to the tape, the photos taken of the cut sections retained on the tape. A photo identification system correlates the photos with the sample block from which the sections were cut.

In some embodiments, the data storage system includes a second set of photos of the cut sections taken after their transfer to slides as the tape is passed through the apparatus, and the photo identification system correlates the photos with the sample block from which the sections were cut. Photos can also in some embodiments be taken of the sections remaining on the tape and not transferred to slides.

In some embodiments, a tissue storage system is provided along with the data storage system for storing the sections on the tape after removal from the apparatus. The tissue storage system can include a tissue repository containing the wound tape which contains cut sections of tissue from the sample block that were not transferred to slides during the auto-mated process of transfer of cut sections to slides.

In accordance with another aspect of the present disclo-sure, a storage system created during an automated process of transferring samples of tissue from a sample block to a tape is provided. The system comprises a data repository containing data obtained during the automated process of transferring samples of tissue to a tape and a tissue reposi-tory containing the tape with samples of tissue that were not transferred to slides during the automated process of transfer of sections of tissue from the tape to slides.

In accordance with another aspect of the present disclo-sure, a tape cartridge for use with an automated apparatus for transferring sections cut from a sample block to a tape is provided including an enclosure, a first reel containing an unused roll of tape and a second reel, the first reel unwinding the tape to be taken up by the second reel, the tape includes an identification system for location of sections cut from a sample block and retained on the tape for correlation with the sample block.

In some embodiments, the tape includes an adhesive portion on a first side to retain the sections cut from the sample block. In some embodiments, a second side of the tape opposite the first side or the backing layer is semi-transparent to enable passage of light through the second side to enhance imaging. In some embodiments, the second side of the tape has a surface which does not stick to the adhesive portion of the first side of the tape. In some embodiments, the adherence strength of the section to the slide exceeds the adherence strength of the section to the tape. In some embodiments, the adhesive strength of the tape is reduced prior to transfer from the tape to the slide.

In some embodiments, the identification system includes distance markers on the tape to indicate an absolute distance on the tape. In some embodiments the tape has a label thereon for remote identification. In some embodiments, the identification system includes radiofrequency identification tags embedded in the tape. In some embodiments, the tape cartridge includes a radiofrequency identification tag for tracking.

In some embodiments, the enclosure includes a cooling agent contained therein.

In some embodiments the tape cartridge is sealed to prevent entry of contaminants.

In accordance with another aspect of the present disclo-sure a method for storing tissue samples in an automated tape transfer system is provided comprising a) advancing a tape in an automated tape advancing system; b) applying a first portion of the tape (e.g., an adhesive portion) to a first cutting face of a sample block; c) moving the first portion away from the sample block after a first section from the sample block is cut and adhered to the first portion, wherein the cutting exposes a next cutting face of the sample block;

d) continuing to advance the tape to sequentially apply additional portions of the tape to sequentially exposed cutting faces of the sample block as sections are cut; e) moving the additional portions of tape away from the sample block after adherence of the cut sections to the tape; f) moving the portions of the tape carrying the cut sections to a slide station; g) transferring select cut sections from the portions to slides; and h) retaining the cut sections not transferred to the slides on the tape for storage.

In some embodiments, the method further comprises the step of digitally storing data collected during advancement of the tape through the apparatus, the step of digitally storing data including the step of taking a photo after one or both of a) transfer of the section from the sample block to the tape or b) transfer of the section from the tape to the slide.

In some embodiments, the method further comprises the step of retaining the portions with cut sections not trans-ferred to the slides on the tape for storage for access after removal of the tape from the tape transfer apparatus, the tape stored on a tape cartridge and the tape including an identi-fication system.

In accordance with another aspect of the present disclo-sure, a method for digitally storing information in an auto-mated tape transfer system is provided comprising a) advancing a tape in an automated tape advancing apparatus; b) applying a first portion of the tape (e.g., an adhesive portion) to a first cutting face of a sample block; c) moving the first portion away from the sample block after a first section from the sample block is cut and adhered to the first portion, wherein the cutting exposes a next cutting face of the sample block; d) continuing to advance the tape to sequentially apply additional portions of the tape to sequen-tially exposed cutting faces of the sample block as portions are cut; e) moving the additional portions of tape away from the sample block after adherence of the sample to the portion; f) moving the portions of the tape carrying the sections to a slide station; g) transferring select sections from the sections to slides; and h) digitally storing data collected during advancement of the tape through the appa-ratus.

DESCRIPTION OF THE DRAWINGS

FIG. 24B is a flow chart illustrating the automated steps of the apparatus (system) of FIG. 24A.

FIG. 25B is a flow chart illustrating the automated steps of the apparatus (system) of FIG. 25A.

FIG. 26 is a flow chart illustrating the steps of the digital photo taking and analysis in accordance with the embodiment of FIGS. 24A and 24B.

FIG. 27B illustrates information collected and stored from a sample block in accordance with the apparatus of FIG. 24A.

FIG. 28B is a schematic view similar to FIG. 27B showing an example of information collected and stored from a specific sample block.

DETAILED DESCRIPTION

Figure 1:
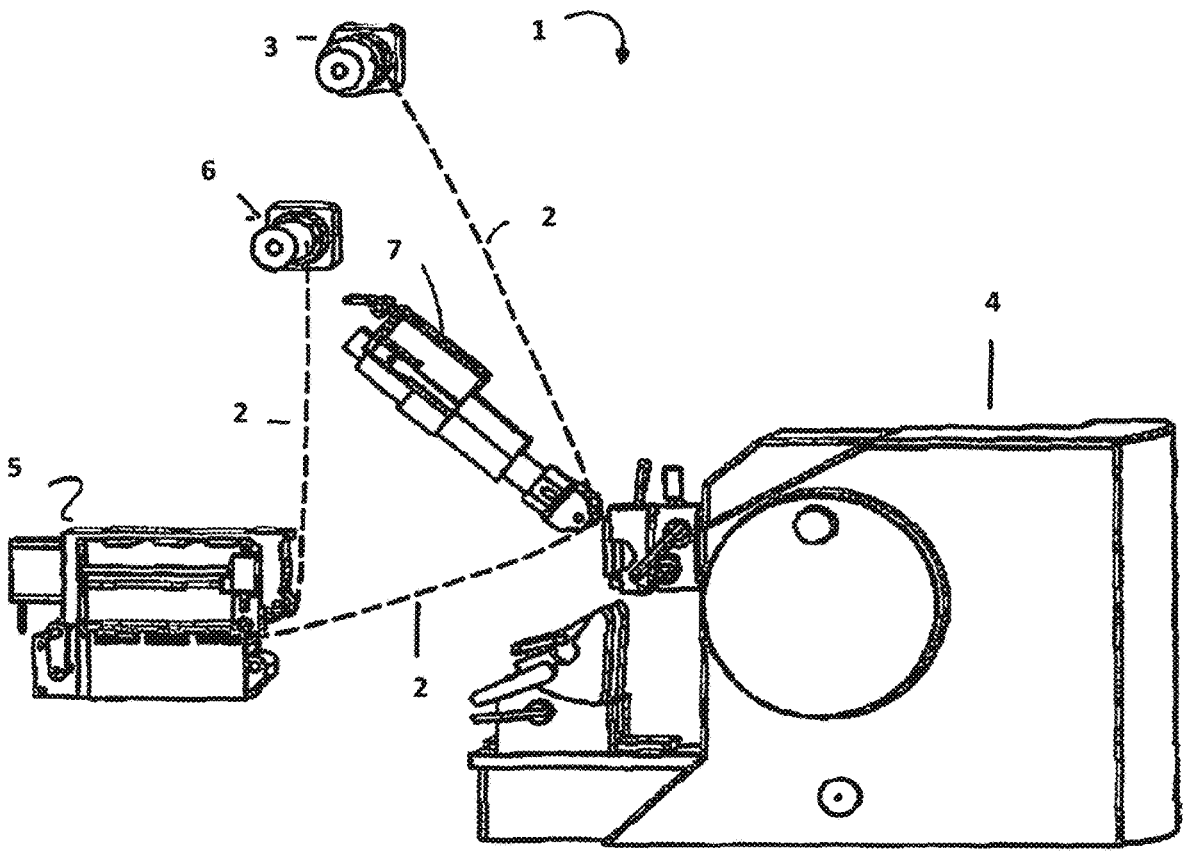
FIG. 1 is a schematic view of one embodiment of an automated tape transfer apparatus of the present invention, illustrating the path of the continuous tape.

The systems and methods of the disclosure may be further understood with reference to the following description and the appended drawings, wherein like elements throughout the views are referred to with the same reference numerals. The systems, methods and devices disclosed herein improve upon traditional microtomy. Specifically, they provide for using a continuous adhesive tape to support samples from tissue block cutting. The systems and methods also provide for subsequent transfer of the samples from the adhesive tape to slides.

A continuous strip of adhesive tape adheres to the cutting face of the sample block prior to sectioning. Subsequent to the adhesive tape adhering to the cutting face, the microtome begins a cutting action. The adhering of the adhesive tape to the cutting face supports the section that is being cut by the microtome. Once the microtome completes the cut, the section that has been cut remains adhered to the adhesive tape.

Motorized reels can be utilized to move the adhesive tape such that the adhesive tape does not interfere with the operation of the microtome. The motorized reels advance the adhesive tape so that the portion of the adhesive tape that includes the cut section moves away from the microtome and sample block and a new portion of the adhesive tape is positioned and adhered to the cutting face for the next section to be cut by the microtome and transferred to the adhesive tape. In the embodiments described below, the motorized reels are referred to as a feed mechanism and a take-up mechanism.

In some embodiments, the portions of the adhesive tape that include the cut sections are moved by the motorized reels towards a slide station where the section that is adhered to the adhesive tape may be automatically transferred to a slide. In one exemplary embodiment, the adhesive tape including the section is positioned over a slide that is coated with an ultraviolet ("UV") curable adhesive. A roller may then press the section on the adhesive tape onto the slide. A UV light source activates the UV adhesive on the slide, thereby bonding the section to the slide. Finally, the motorized reels advance the adhesive tape away from the slide and the section is no longer adhered to the adhesive tape, but is now bonded to the slide.

The systems and methods of the present invention will now be described in greater detail. It should be understood that the term "adhesive tape" as used above and used below throughout this specification refers to any type of bonding, including molecular bonding, mechanical bonding, etc., and also can include dry adhesive tapes such as Setex-dA produced by nanoGriptech which provides bonding via van der Waals force (molecular bonding) and whose tape peel force varies greatly on peel angle which minimizes section damage during peeling. It should also be noted that the term "continuous strip of adhesive tape" or "continuous" is used above and used throughout the specification. It would be understood by one of ordinary skill in the art that this term does not mean that the strip of adhesive tape is infinitely continuous. Rather, continuous means that the tape is longer than the amount of adhesive tape used for a single section (a single sample of tissue cut from the tissue block). For example, the tape could have a relative short length or could have a length that could be used for hundreds or thousands of sections. One example of a length of adhesive tape will be described below.

It should also be noted that the term "section" or "sections" is used extensively throughout this description. As described above and as will be described in more detail below, a microtome cuts sections from a sample block of tissue. Thus, the term "section" refers to the thin sample that has been or will be cut from the sample block and is adhered to the adhesive tape. Finally, as described above, the section is cut from the sample block by a microtome. This process is interchangeably referred to in this description as "cutting" or "sectioning" and should be understood to refer to the same process.

FIG. 1 is a schematic view of one embodiment of an automated tape transfer apparatus (system) 1, illustrating the path of the continuous adhesive tape 2. FIG. 1 shows a microtome 4 that is used to hold the sample blocks and cut the sections. As described above, the microtome 4 holds a sample block comprising a tissue sample that is enclosed in a supporting block of embedding material such as paraffin wax. The microtome 4 includes a blade (not shown) aligned for cutting slices (or sections) from one face of tissue block. This face from which the section will be cut will be referred to herein as the cutting face and will be described in greater detail below. The blade of the microtome 4 cuts the sample block to create sections. The sections are very thin (e.g. 41.im), although other dimensions are contemplated, thus, a single sample block, for example a sample block having a thickness of 12 mm, may be cut into many sections (e.g., hundreds of sections).

In some embodiments, the paraffin block face could be cooled down and humidified. Cooling down the paraffin block helps increase the hardness of the medium. Harder paraffin blocks can be cut at a given thickness more consistently. Humidification of the tissue and the paraffin blocks helps to avoid tissue crumbling.

It should be noted that the microtome 4 may not be a portion of the automated tape transfer apparatus 1. In one exemplary embodiment, the automated tape transfer apparatus 1 is an apparatus that may be attached to any standard microtome as an add-on component. However, in other embodiments, the microtome 4 may include an integrally attached automated tape transfer apparatus 1. That is, the automated tape transfer apparatus 1 may include the microtome 4 or may be a separate component that is attached or coupled to any microtome to provide the functionality described herein. In addition, the microtome 4 may be any type of microtome 4 including a rotary microtome, a lathe microtome, a sledge type microtome, a vibrating microtome, a laser microtome, etc. In any embodiment, (e.g., where the microtome is a component of the automated tape transfer apparatus or where the microtome is a separate component), the microtome may be a commercially available microtome or a specially designed microtome for use with the automated tape transfer apparatus.

In addition to the adhesive tape 2 and the microtome 4, the automated tape transfer apparatus 1 of FIG. 1 also includes a feed mechanism 3, a tape applicator 7, a slide station 5 and a take-up mechanism. Each of these components and their functionality will be described in greater detail below. It should be appreciated that although slide station 5 is shown as part of system (apparatus) 1, it is also contemplated that the automated transfer system (apparatus) does not include a slide station. The flow chart of FIG. 23 depicts such system.

In the embodiment of FIG. 1, the path of the adhesive tape 2 starts at the feed mechanism 3 and travels toward the microtome 4 and an applicator end of the tape applicator 7. The adhesive tape 2 then travels away from the microtome and toward the slide station 5 and finally is stored on the take-up mechanism 6.

In one embodiment, the adhesive tape 2 comprises a flexible carrier film that has an adhesive material deposited thereon. The flexible carrier film has properties that resist tearing or stretching while remaining flexible as the adhesive tape moves through the automated tape transfer apparatus 1. In one embodiment by way of example, the adhesive tape 2 comprises a 1-inch (25.4 mm) wide, 1.5 mil (0.0381 mm) thick polyimide film coated with 1.0 mil (0.0254 mm) thick silicone adhesive. However, it should be noted that this is only one example and other materials, widths, and thicknesses may be used depending on the particular implementation, e.g., type of microtome, type of sample, etc. In some embodiments, the adhesive layer remains laminated to the flexible carrier film throughout the entire process, while in other embodiments, the adhesive layer may be dissolved or removed at the slide station to allow the transfer of the section to the slide. These various embodiments will be described below. The adhesive region of the adhesive tape 2 is preferably large enough to fully cover the cutting face of the sample block, i.e., to hold a complete section when it is sliced from the sample block.

In another embodiment, the adhesive layer on the adhesive tape 2 is a thermoplastic layer commonly and functionally known as a hot melt adhesive. The hot melt adhesive is a non-tacky solid at the ambient temperature within the automated tape transfer apparatus 1. After application to the cutting face, the hot melt adhesive is melted by heat. The adhesive tape 2 is bonded to the cutting face upon adhesive cooling in back to solid. The hot melt adhesive has a melting point below the temperature at which the embedding medium entirely melts. The exemplary bond strength should be the same as with the adhesive layer. Some examples of the hot melt adhesive may include polyester wax (having a melting point of 39 degrees C.) and DuPont Elvax 40 W (having a melting point of 47 degrees C.).

In one example, the adhesive tape 2 is provided on a tape carrier that includes a tape roll that is 36.0 yards (32.9 m) of tape wound on a hollow cylindrical core. In one example, a diameter of the hollow cylindrical core is 3.0 in. (76 mm). However, this is only one example and other sizes may be used. When the adhesive tape 2 is rolled on the tape roll, the adhesive layer faces inward. The tape carrier may have sprocket holes or other mechanical means that allow the tape carrier to be coupled to the feed mechanism 3 and allow the feed mechanism 3 to feed the adhesive tape 2 through the automated tape transfer apparatus 1. In one embodiment, the adhesive tape 2 further includes an optional peel-able, non-adhesive liner covering the adhesive material that is to be removed before use. For example, when on the tape carrier, the non-adhesive liner may cover the adhesive, but as the adhesive tape 2 moves away from the feed mechanism 3, the non-adhesive liner may be removed to expose the adhesive region of the adhesive tape 2. In this example, if it were to be assumed that each section had a section length of 28 mm and the automated tape transfer apparatus 1 was controlled such that there was a 10 mm spacing between each successive section, the exemplary length of adhesive tape 2 (e.g., a tape roll having a length of 36.0 yards (32.9 m)) would allow for the transfer of 865 sections per roll. Again, this is only one example of a length of a tape roll and other lengths may be used. In addition, the section length and section is spacing is provided by way of example and other section lengths and spacing's could also be utilized.

Figure 2:
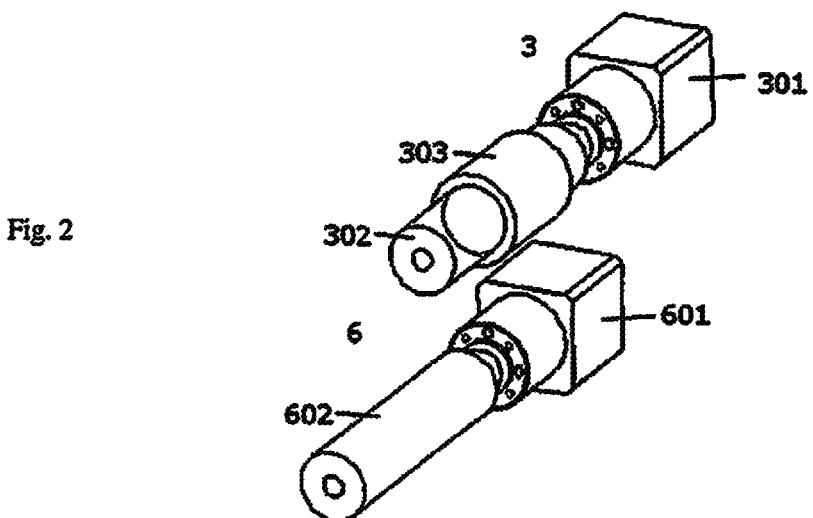
FIG. 2 shows a feed mechanism and a take-up mechanism of the automated tape transfer apparatus of FIG. 1 in more detail.

FIG. 2 shows the feed mechanism 3 and the take-up mechanism 6 of the automated tape transfer apparatus 1 in more detail. The feed mechanism 3 includes a coupling 303 that allows the tape carrier to be coupled to the feed mechanism 3. As described above, the tape carrier may include mechanical structure that allows for the coupling, e.g., sprocket holes, such that the coupling 303 may have a corresponding coupling structure. In other exemplary embodiments, the coupling 303 may be sized such that the tape carrier is pressure fit over the coupling 303. From these examples it should be seen that other structure/methods of coupling the tape roll to the feed mechanism 3 may be used. The feed mechanism 3 also includes a drive shaft 302 that is coupled to a motor 301. The motor 301 may be programmable or controlled by an external controller such that the motor 301 drives the drive shaft 302 so that the adhesive tape 2 is advanced through the automated tape transfer apparatus 1 at a speed that allows for the sections to be transferred to the adhesive tape 2 and then transferred to the slides (in the embodiments including the slide station). As will be described in greater detail below, the motors of the feed mechanism 3 and the take-up mechanism 6 may be controlled to account for various motions of the adhesive tape 2 along its path, including the speed for the correct distance between sections, slack that may occur during adhesive tape 2 movement, etc.

Similar to the feed mechanism 3, the take-up mechanism 6 also includes a drive shaft 602 and a motor 601. The motor 601 may also be programmable or controlled such that it is synched with the motor 301 allowing the adhesive tape to move through the automated tape transfer apparatus 1. The adhesive tape 2 that has been used (e.g., has moved through the slide station 5) may be rolled up onto the drive shaft 602. In an alternative embodiment, there may be a tape carrier that is coupled to the take-up mechanism 6 such that the used adhesive tape 2 is rolled onto the tape carrier coupled to the take-up mechanism 6.

Figure 3:
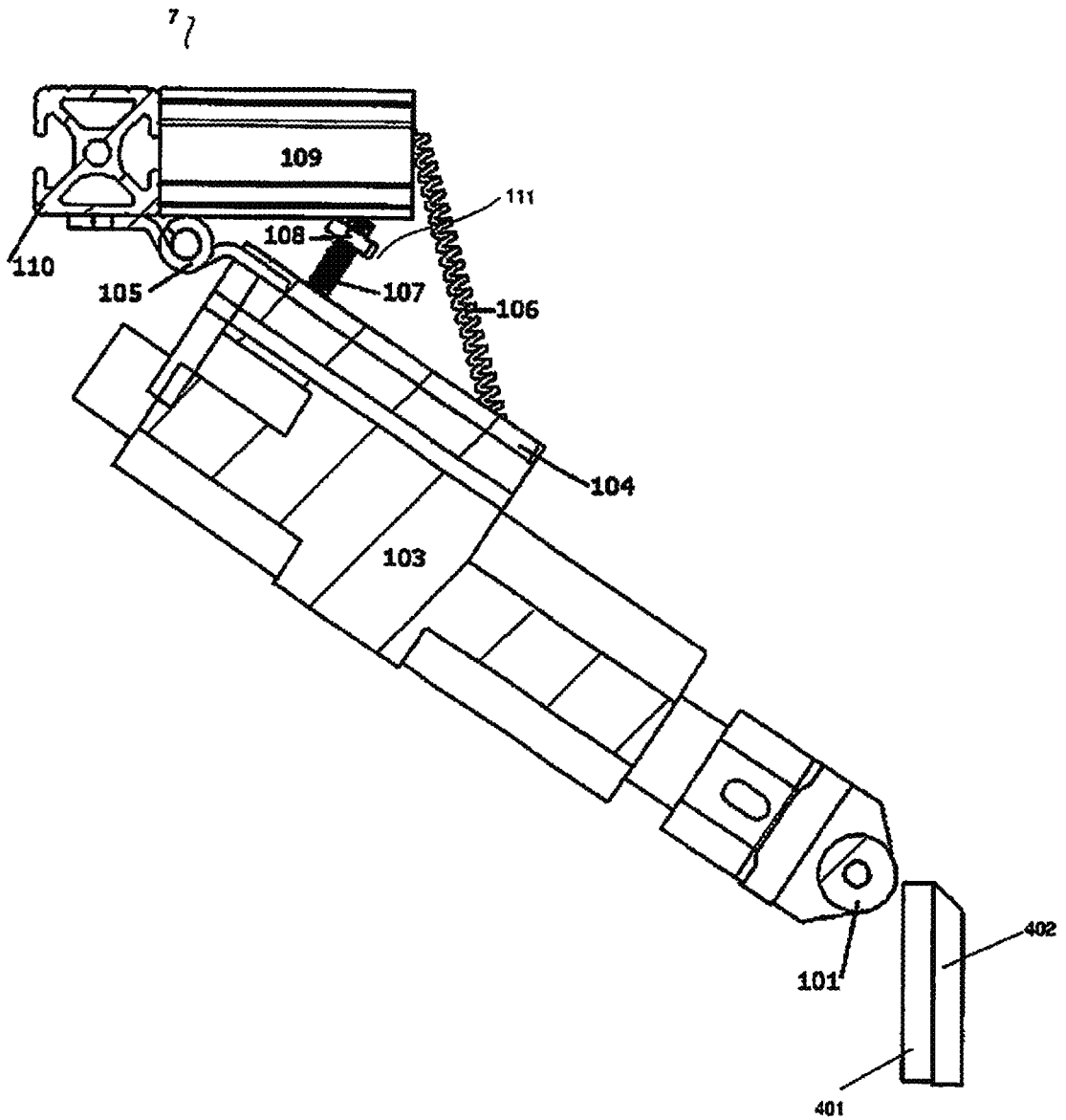
FIG. 3 shows a tape applicator of the automated tape transfer apparatus of FIG. 1 in more detail.

FIG. 3 shows the tape applicator 7 of the automated tape transfer apparatus 1 in more detail. FIG. 3 also shows a cutting face 401 of the sample block 402 from which the tissue section is to be cut. As described above, the sample block 402 is held by the microtome 4, which is not shown in FIG. 3 for ease of illustration. The interaction between the cutting face 401 and the tape applicator 7 will be described in greater detail below. The tape applicator 7 includes a roller member 101, or alternatively a cam, that extends from a linear actuator member 103 that pivots on a hinge member 105. The hinge member 105 is coupled to a linear actuator holder 104 and a fixed structural member 110. The hinge member 105 may be any type of hinge, e.g., butt hinge, t-hinge, strap hinge, etc. The fixed structural member 110 may be, for example, a subsection of the supporting structural framing of the automated tape transfer apparatus 1. The fixed structural member 110 and the hinge member 105 limit the range of motion of the roller member 101 to one degree of rotational freedom around the pivot of the hinge member 105 and one degree of translational freedom along the linear actuator holder 104 as will be described in greater detail below (e.g., as shown by arrow 120 in FIGS. 5 and 7).

The tape applicator 7 maintains an initial position via force from a spring member 106 that connects the linear actuator holder 104 to a second fixed structural member 109. Again, the second fixed structural member 109 also may be, for example, a subsection of the supporting structural framing of the automated tape transfer apparatus 1. A motion limiting member 111 maintains this initial position. In one embodiment, the motion limiting member 111 includes a nut 108 on a bolt 107, wherein the nut 108 acts as an adjustable limiter. However, other arrangements may be used to implement the motion limiting member 111.

Figure 4:
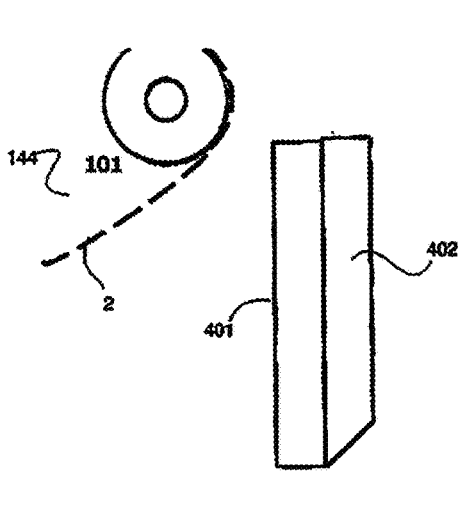
FIG. 4 shows a view of a roller member of the tape applicator of FIG. 1 and its relation to a cutting face prior to the beginning of an adhesive tape application cycle.

The operation of the tape applicator 7 will be described with reference to an adhesive tape application cycle. The adhesive tape application cycle is the process by which the adhesive tape 2 is adhered to the cutting face 401. Prior to the beginning of each adhesive tape application cycle (e.g., when the next portion of adhesive tape 2 is to be applied to the cutting face 401), the linear actuator member 103 begins in a retracted position such that the roller member 101 clears the cutting face 401 as shown in FIG. 3. FIG. 4 shows another view of the roller member 101 of the tape applicator 7 and its relation to the cutting face 401 prior to the beginning of the adhesive tape application cycle. FIG. 4 also shows the adhesive tape 2 and its relation to the roller member 101 prior to the beginning of the adhesive tape application cycle.

Figure 5:
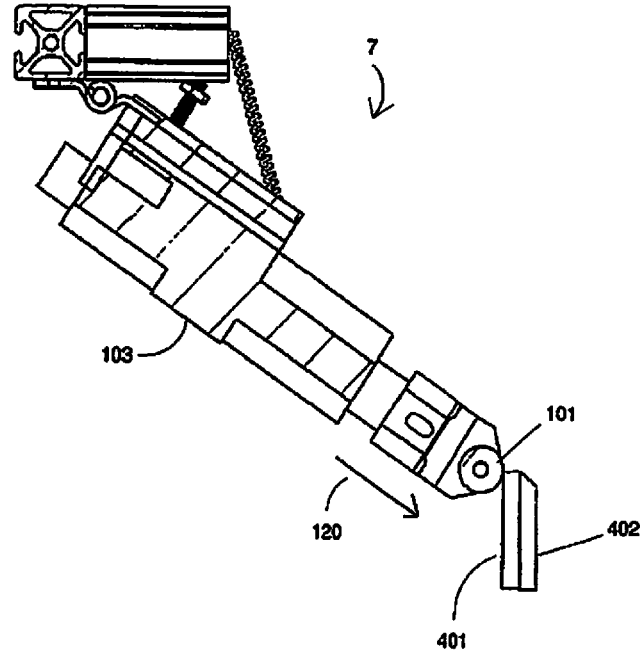
FIG. 5 shows the operation of the tape applicator of FIG. 1 as the adhesive tape application cycle begins.
Figure 6:
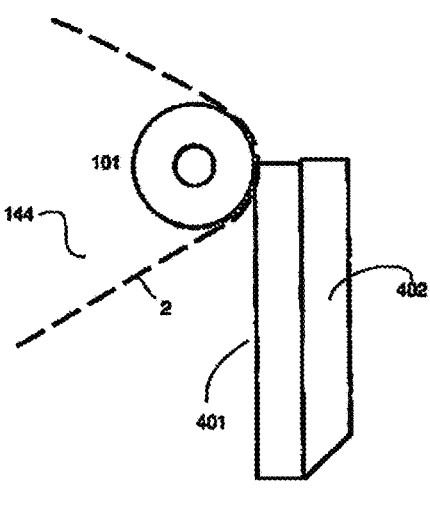
FIG. 6 shows a view of the roller member of the tape applicator of FIG. 1 and its relation to the cutting face of the sample block at the beginning of the adhesive tape applica-tion cycle.

FIG. 5 shows the operation of the tape applicator 7 as the adhesive tape application cycle begins. As the adhesive tape application cycle begins, the linear actuator member 103 elongates in the direction of arrow 120 towards the cutting face 401. This causes the roller member 101 to press the adhesive side of the adhesive tape 2 onto the cutting face 401. FIG. 6 shows another view of the roller member 101 of the tape applicator 7 and its relation to the cutting face 401 at the beginning of the adhesive tape application cycle. As can be seen in FIG. 6, the adhesive side of the adhesive tape 2 is now in contact with the cutting face 401. Also seen in FIG. 6, adhesive tape 2 below the roller member 101 in the area 144 becomes taut to prevent air pockets between the adhesive tape 2 and the cutting face 401 when the adhesive tape 2 is applied to the cutting face 401. The function of causing the adhesive tape 2 to become taut may be performed by the take-up mechanism 6. It should be noted that in FIG. 4, the adhesive tape 2 may not be as taut in the area 144 as it is in FIG. 6.

Figure 7:
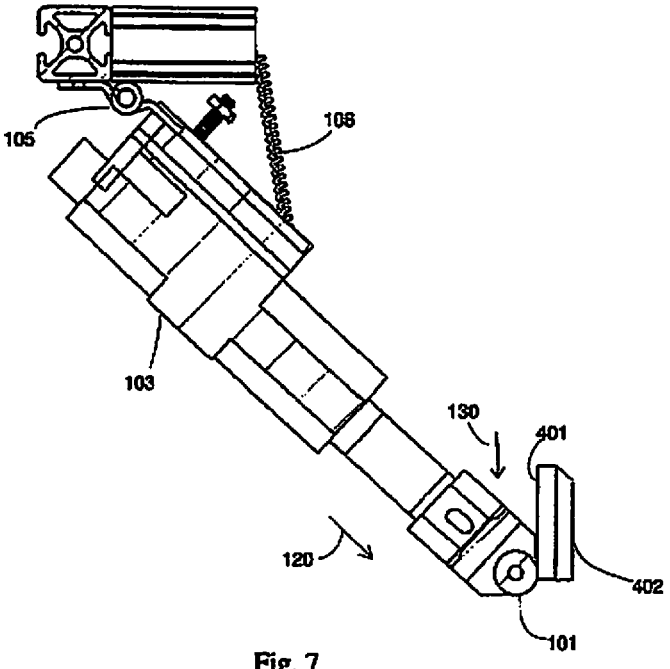
FIG. 7 is a view similar to FIG. 5 showing the operation of the tape applicator of FIG. 1 through the adhesive tape application cycle.
Figure 8:
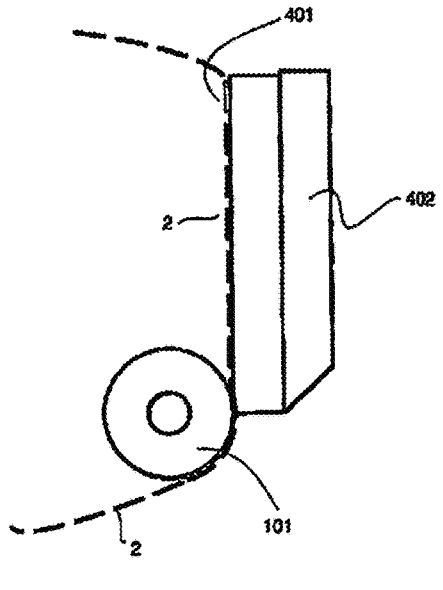
FIG. 8 shows a view of the roller member of the tape applicator of FIG. 1 and its relation to the cutting face of the sample block near the end of the adhesive tape application cycle.

FIG. 7 shows the operation of the tape applicator 7 through the adhesive tape application cycle. With the sample block 402 firmly held in the microtome 4, further elongation of the linear actuator member 103 in the direction 120 forces the tape applicator 7 to pivot on the hinge member 105 and elongate the spring member 106. The force from the extending linear actuator member 103 pushes the roller member 101 down in the direction of arrow 130, while maintaining the pressure against the cutting face 401, e.g., there is a force applied by the roller member 101 that is normal to the cutting face 401. This movement by the roller member 101 against and down the cutting face 401 causes the adhesive tape 2 to adhere and cover the entire cutting face 401 with adhesive tape 2. FIG. 8 shows a view of the roller member 101 of the tape applicator 7 and its relation to the cutting face 401 when the linear actuator member 103 has extended fully such that the roller member 101 has contacted and moved along the entirety of the cutting face 401. Thus, the adhesive tape 2 is now adhered to the entirety of the cutting face 401.

The linear actuator member 103 is then retracted in the opposite direction of arrow 120 of FIGS. 5 and 7. This retraction causes the roller member 101 to reset to the original position as shown in FIG. 3 where the roller member 101 is clear of the cutting face 401. It should be understood that as the linear actuator member 103 is retracted, the spring force of the spring member 106 causes the hinge member 105 to rotate back to its original position. The hinge is stopped from moving at its original position based on the setting of the motion limiting member 111. In this embodiment, the strength and initial length of the spring member 106 may be adjusted to provide the correct amount of force that the roller member 101 exerts against the cutting face 401. In addition, in the retracted position, the spring force serves to maintain the tension of the adhesive tape 2 within the automated tape transfer apparatus 1.

Figure 9:
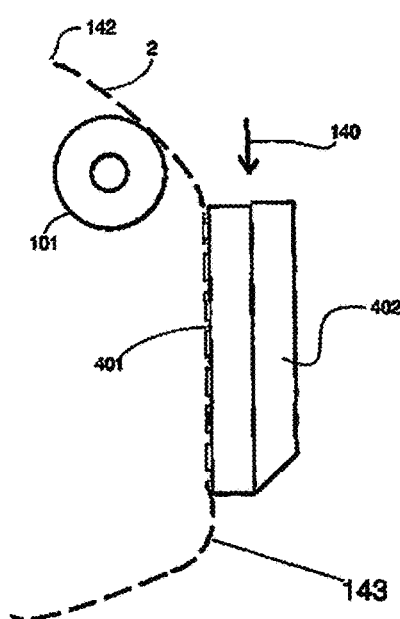
FIG. 9 shows a view of the roller member of the tape applicator pf Fog. 1 and its relation to the cutting face when a linear actuator member of the tape applicator has been retracted at the end of the adhesive tape application cycle.

FIG. 9 shows a view of the roller member 101 of the tape applicator 7 and its relation to the cutting face 401 when the linear actuator member 103 has been retracted at the end of the adhesive tape application cycle. Comparing FIG. 4 to FIG. 9 it may be seen that the roller member 101 is in the same relative position. However, the difference is that in FIG. 9, the adhesive tape 2 is adhered to the cutting face 401, while in FIG. 4, the adhesive tape 2 is not adhered to the cutting block 401. It should be understood that the adhesive tape application cycle will progress from that as shown in FIG. 9 back to that shown in FIG. 4 when the microtome 4 cuts the section. That is, the microtome blade will cut the section from the sample block 402 and the section will remain adhered to the adhesive tape 2. The adhesive tape 2 will then pull away from the sample block 402 resulting in the adhesive tape 2 returning to the location as shown in FIG. 4. The automated tape transfer apparatus 1 may also include a controller (not shown) that communicates with the microtome 4 to indicate that the adhesive tape 2 has been adhered to the cutting face 401, e.g., as shown in FIG. 9. This will indicate to the microtome 4 that the section may be cut. It should be noted that the microtome 4 may have a limited logic input and programmability such that it may only receive a simple binary signal to begin cutting a section. In another example, the microtome 4 may have a more sophisticated controller that allows the microtome 4 and the controller of the automated tape transfer apparatus 1 to exchange more signals and data.

The microtome 4 will then advance the sample block 402 forward and this will define a new cutting face 401. The adhesive tape application process will then begin again for the next section. The section that has been previously cut from the sample block 402 and is now adhered to the adhesive tape 2 will then advance away from the microtome 4 toward the slide station 5. However, prior to describing the functionalities carried out by the slide station 5, a further description of the cutting of the section after the cutting face 401 has been adhered to the adhesive tape 2 will be described.

It should be noted that as the microtome 4 cuts the section, slack or other movement of the adhesive tape 2 may occur. For example, if the microtome 4 is a rotary type microtome, the cutting occurs by the sample block 402 being moved, rather than the blade moving. Thus, the automated tape transfer apparatus 1 may compensate for any movement of the adhesive tape 2 during the cutting process. For example, in the rotary type microtome, the sample block 402 will descend (e.g., move down in the direction of arrow 140 of FIG. 9), and the feed mechanism 3 may unwind slack stored on the tape roll above the cutting face 401 to prevent the adhesive tape 2 from peeling off the cutting face 401. Concurrently, the take-up mechanism 6 may wind excess adhesive tape 2 between the cutting face 401 and the microtome blade that may otherwise lead to jams, misalignments, and tape cuts by the microtome blade. As described above, the motors 301 and 601 of the feed mechanism 3 and take-up mechanism 6, respectively, may be a controllable motor that may be programmed with the functionality to account for the movement of the adhesive tape 2 during the cutting process. It should be noted that the example provided above includes the movement caused by a rotary microtome, but other types of microtomes may also be used and also cause movement of the adhesive tape 2 during the cutting process. Those skilled in the art will understand that this movement may also be compensated for using the principles described herein.

It should be noted that when the chuck of the microtome moves the sample block in the direction of arrow 140 of FIG. 9, there should be some slack in the adhesive tape 2 in the area 142 (e.g., above the roller member 101) because without slack, the adhesive tape 2 may peel from the cutting face 401 during the sectioning process. This slack also prevents the tape from stretching and breaking. In one exemplary embodiment, the slack buffer is about half the circumference of the reel of the feed mechanism 3 or approximately 135 mm. In another example, there should also be some slack in the area 143 shown in FIG. 9 for the same reasons as described above. This slack in the area 143 may be controlled by the take-up mechanism 6 and its corresponding components (e.g., motor 601). This slack in area 143 may be controlled such that the adhesive tape 2 does not peel during the sectioning process, but also so the adhesive tape 2 does not break or get tangled within the automated tape transfer apparatus 1.

Some properties of the adhesive tape 2 were described above, however, some additional properties of the adhesive tape 2 will also be described. In addition to the functionality of automatically moving the section from the cutting face 401 to the slide station 5, the adhesive tape 2 also provides support to the section and cutting face 401 as the section is being cut by the microtome 4. Thus, the adhesive properties of the adhesive tape 2 should withstand the sectioning process without delamination, yet, later release the section without damage during following transfer to a slide at the slide station 5. Proper adhesion between the adhesive tape 2 and the cutting face 401 is based on a clean, flat cutting face 401 and complete penetration of the support medium (e.g., the paraffin) into the tissue. For tissue with solid regions devoid of a support medium, a minimum adhesive strength should also extend to the tissue. In one embodiment, an adhesion force of 10 ozf.-in. (0.071 N m) between adhesive tape 2 and the cutting face 401 is a minimum adhesive strength for reliable, uniform adhesive tape 2 support. The maximum adhesive strength of the tape during the peel (at the slide station 5) should not exceed the tissue-dependent elastic limit of the section, defined as the minimum force that permanently deforms the section. There may be instances where the tissue elastic limit may dictate a maximum tape adhesive strength limit lower than the minimum tape adhesive strength required for sectioning. A solution to this issue will be described in greater detail below in the context of section transfer to a slide. It should be noted that while the above describes an example of a minimum adhesive strength for the adhesive tape 2, this example of minimum adhesive strength is based on tests that have been performed using various sample blocks and microtomes. There may be situations where the minimum adhesive strength is greater or less than the exemplary minimum adhesive strength described above.

In addition, the adhesive material used for the tape should be sufficiently viscous to limit section translation on the tape, e.g., when the section is subject to transverse friction force against the cutting blade during sectioning. Furthermore, viscous adhesive reduces residue on the section after the adhesive tape 2 is peeled during transfer to a slide.

In another embodiment, the microtome blade may be heated to aid in sectioning. A heating element, such as a heating pad, placed in close proximity to the blade may be used to for heating. In traditional sectioning without the adhesive tape 2, heating of the blade may result in undesirable curing or softening of the embedding medium (e.g., the paraffin). However, the support provided by the adhesive tape 2 at the cutting face 401 counters these issues. In cases where the embedding medium comprises a polymer such as paraffin, a hot blade locally melts a fraction of the supporting medium with lower melting points. For example, the paraffin may completely melt at 57 degrees C. However, when heated to 45 degrees C., the paraffin "sweats" as a fraction of polymers melt. At 45 degrees C., the paraffin will still generally behave as a solid, but be much softer than cool paraffin. This melted material lubricates the blade during the cut, reducing mechanical damage to the section. The remaining softer solid fraction also sections easier. The range of blade temperatures will depend on the melting point and heat capacity of the embedding medium, as well as the cutting speed. For an exemplary paraffin embedded block that completely melts at 57 degrees Celsius sectioned at 1 in/s (2.54 cm/s) for 41 μm thick sections, an exemplary blade temperature is approximately 42-48 degrees Celsius.

Those skilled in the art will understand that the above discussion is related to a situation when the embedding medium is paraffin and relates to the plastic properties of paraffin. Specifically, the plastic properties of solid paraffin change throughout a thermal range. For example, when paraffin is subjected to some specific compressive, tensile, or shearing force at different temperatures, a different type of response occurs above or below some critical temperature that may be termed the "plastic point." However, it will be recognized that other embedding mediums may also be used and these other embedding mediums may also have various thermal characteristics, e.g., plastic points. The heating of the blade may be modified to account for the plastic properties of these other types of embedding mediums.

Figure 10:
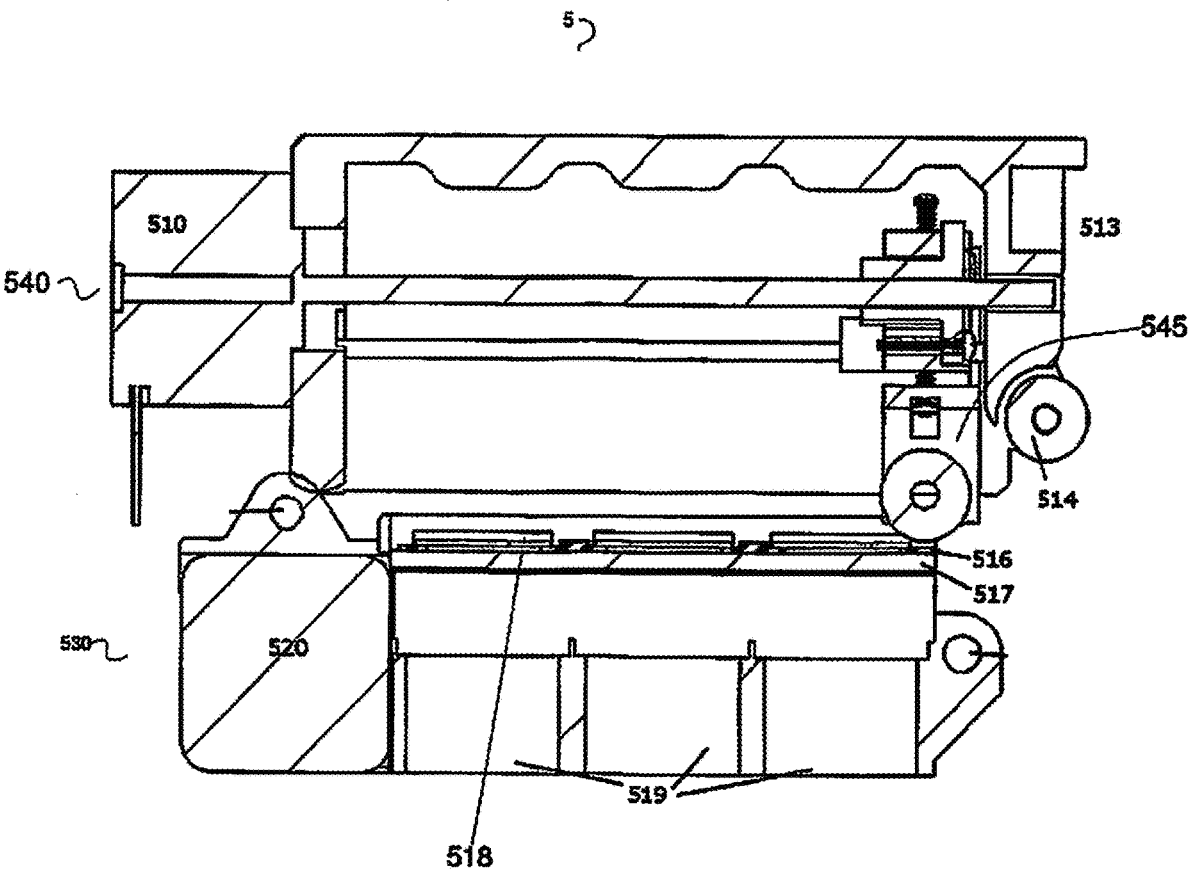
FIG. 10 shows one embodiment of a slide station of the exemplary automated tape transfer apparatus in more detail.

FIG. 10 shows the slide station 5 of the automated tape transfer apparatus 1 in more detail. In the exemplary embodiment, the slide station 5 will be described as a UV station, but those skilled in the art will understand that it is not required that the slide station 5 be a UV station. The slide station 5 transfers the sections that are on the adhesive tape 2 to microscope slides 515 that are pre-coated with UV-curable adhesive. It should be appreciated that although the system of FIG. 1 includes a slide station for transfer to slides, the system in some embodiments does not include a slide station and after transfer of the cut sections to the adhesive tape and movement of the tape from the microtome area, the sections can be transferred from the adhesive tape to the slides in accordance with other methods, e.g., manual transfer. This is depicted in the flow chart of FIG. 23.

Figure 14:
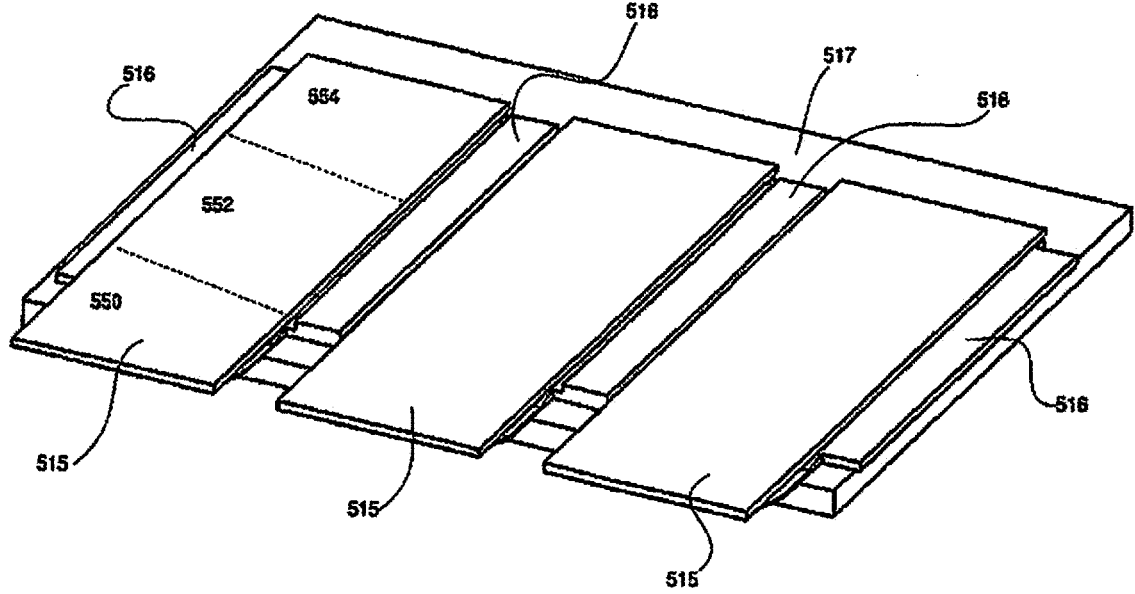
FIG. 14 shows a view of slides in the lower portion of the slide station of FIG. 1.

Turning now to the slide station 5 in more detail, a lower portion 530 of the slide station 5 includes spacers 516 that create the slide slots, a support section 517, a UV source 519 and a motor 520. The slide slots created by the spacers 516 and the support section 517 hold the slides 515. The spacers 516 may also limit contact with slides 515 by only contacting the sides and a tiny lip around the bottom of slides 515. In case the slides 515 have stray UV curable adhesive on the bottom/sides, the slides 515 may still be easily removed after UV exposure. The support section may be, for example, a glass plate that protects the UV source 519. In the present example, there are three slide slots with each slide slot holding a single slide 515. However, other exemplary embodiments may include more or less slide slots. It can be seen that the spacing between the sections on the adhesive tape 2 may be controlled based on the distances between the multiple slides 515 within the slide slots, e.g., the spacing should be such that in this example, a section may be simultaneously deposited on each of the slides 515. FIG. 14 shows a larger view of slides 515 in the lower portion 530 of the slide station 5. The slides 515 are shown as being held by the spacers 516 which are supported by the support section 517.

The UV source 519 is located below the slides 515 and as will be described in greater detail below, the UV source 519 is used to cure the UV adhesive, laminating the sections onto the slides 515. In one example, the UV source is an LED array. The motor 520 is used to translate or move the lower portion 530 of the slide station 5 to adjust the section location on a slide 515. That is, the exact location of where the sample section from the tape is deposited on the slide 515 may be controlled by the motor 520 moving the lower portion 530 to the desired location with respect to an upper portion 540 of the slide station 5.

In a normal situation, the sections from the adhesive tape may be deposited on the middle of the slide 515 (each section deposited on a sample slide). However, there may be situations where it is desired to deposit the section on a different portion of the slide that is not in the middle. For example, the user may desire to have multiple non-serial sections be collected onto a single slide 515. Thus, the motor 520 may adjust the location of the slide slots 516 such that a first section is deposited on the right portion (554 as shown in FIG. 14) of the three slides 515 in the slide slots 516. These deposited sections may then be cured using selective UV exposure by the UV source to only the area (e.g., the right portion of the slides) where the section has been deposited. The motor 520 may then move the lower portion 530 to a location where the next set of sections will be deposited in the middle (552 as shown in FIG. 14) of the slides 515. Thus, the same slides will be used for the next set of sections, but these sections will be deposited in the middle of the slides 515. The motor 520 may then move the lower portion 530 to a location where the next set of sections will be deposited on the left side (550 as shown in FIG. 4) of the slides 515. Thus, at the end of such a process, each of the three slides will have three non-serial sections deposited on each of the slides, e.g., one on the right side, one in the middle and one on the left side. In an alternative embodiment, the lower portion 530 may remain stationary and the upper portion 540 may be programmed to move and adjust position to deposit the sections in the manner described above. As can be appreciated, to adjust the position for multiple sections on a single slide, either the lower portion 530 or upper portion (or both relative to one another) can be moved in a direction transverse to the lengthwise dimension of the tape.

The upper portion 540 of the slide station 5 includes a translation portion 545, a track 509, a drive shaft 508 and a motor 520. As will be described in greater detail below, the motor 510 drives the drive shaft 508 such that the translation portion 545 moves along the track 509. The drive shaft 508 may be, for example, a screw drive that allows the translation portion 545 to move in either linear direction with respect to the lower portion 530.

Figure 11:
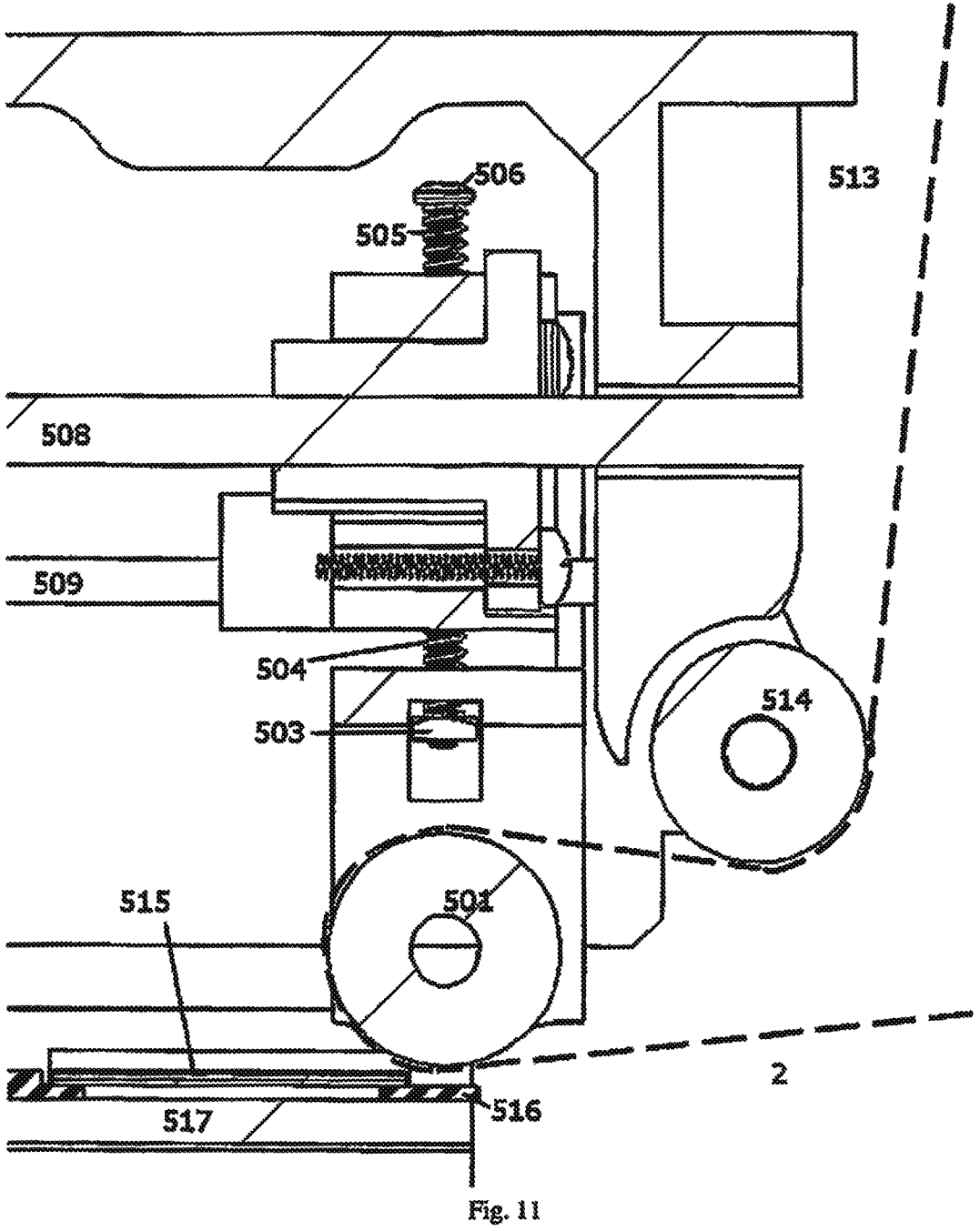
FIG. 11 shows a translation portion of the slide station of FIG. 10 in more detail.

FIG. 11 shows the translation portion 545 of the exemplary slide station 5 in more detail. The translation portion 545 includes a slide application roller 501. At the start of each cycle, the translation portion 545 is positioned on the end of track 509 closest to microtome such that the slide application roller 501 is in the location as shown in FIGS. 10 and 11. In this position, the slide application roller 501 is not in contact with the slides 515 allowing the adhesive tape 2 to advance. The adhesive tape 2 wraps around the slide application roller 501 with the non-adhesive film side of the adhesive tape 2 contacting the slide application roller 501. The adhesive film side can face toward the slide when positioned to be transferred. When the sections on the adhesive tape 2 are properly aligned with the receiving slides 515, the motor 510 may then drive the translation portion 545 to advance along the track 509. As the translation portion 545 advances along the track 509, the slide application roller 501 presses the sections that are adhered to the adhesive tape 2 onto the slides 515. The translation portion 545 may include springs 504 and 505 that work in conjunction with the slide application roller 501. The springs 504 and 505 may provide constant force onto adhesive tape 2 when applying sections to slides 515. The springs 504 and 505 may have their spring strength adjusted using screw 506 and nut 503. Alternatively, the slide application roller 501 may be made of a pliable material such as rubber foam that provides the constant force in lieu of the springs 504 and 505. In addition, a non-stick coating may be applied to the slide application roller 501 to prevent stray adhesive buildup and adhesive tape cling.

Figure 12:
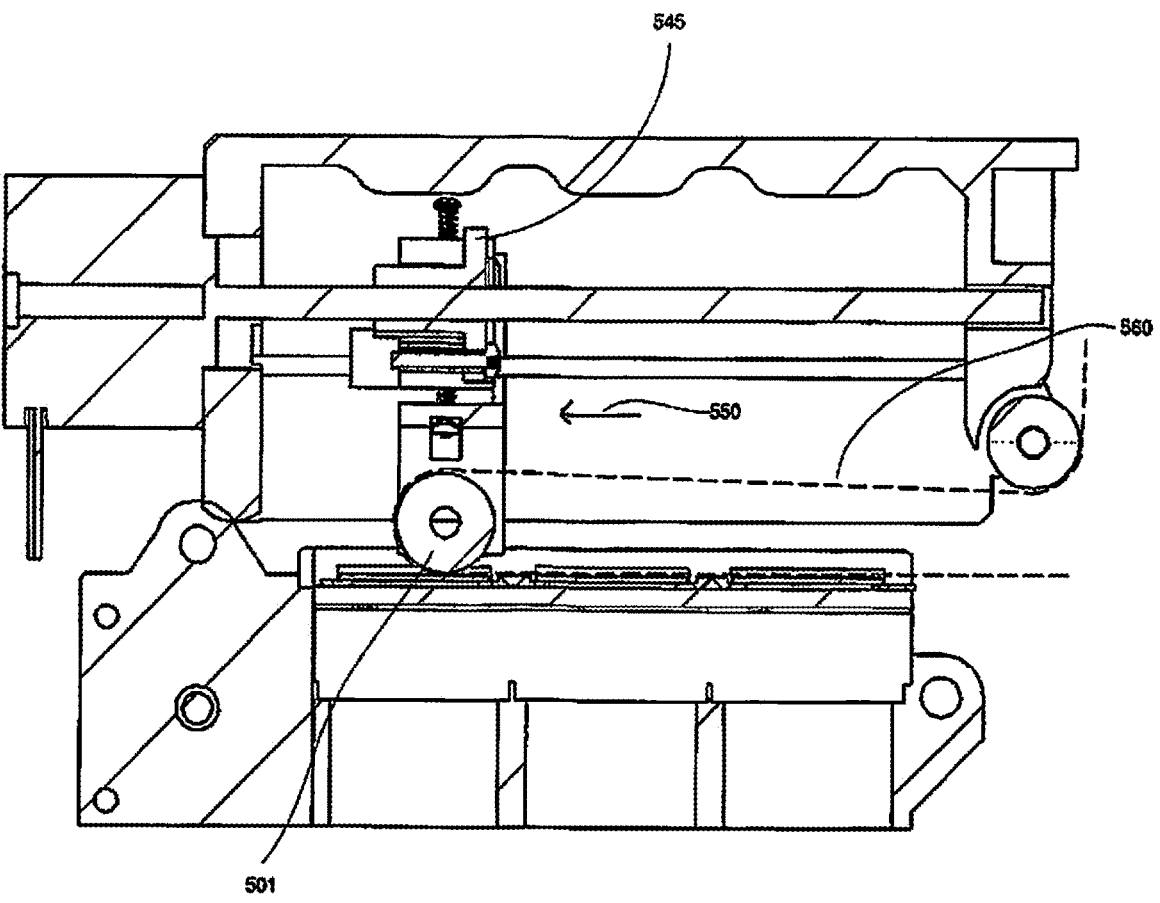
FIG. 12 shows the slide station of FIG. 10 when the translation portion has moved along a track and has applied sections to the slides.

FIG. 12 shows the slide station 5 when the translation portion 545 has moved along the track 509 in the direction of arrow 550, i.e., in a longitudinal direction and has applied sections to the slides 515. As the translation portion 545, including the slide application roller 501, is advancing in the direction of arrow 550, slack is applied from the take-up mechanism 6. For example, the section of adhesive tape 2 in the area 560 above the slide application roller 501 may be slack from the take-up mechanism 6. As the slide application roller 501 moves in the direction of arrow 550, this motion may laminate multiple regularly spaced sections and slides 515 in one pass. When the translation section 545 reaches the end of the track 509 near the motor 510, the adhesive tape 2 and therefore, the sections on the adhesive tape 2 have been deposited onto the slides 515. After slide section application, the UV source member 519 below the slides 515 cures the UV adhesive, laminating the deposited sections onto the slides 515. The translation portion 545 may then move back to its original position as shown in FIGS. 10 and 11. As the translation portion 545 moves back to its original position, the adhesive tape 2 is peeled away from the slide 515. As described above, the adhesive strength of the adhesive tape 2 should be such that when the peeling occurs, there is no damage to the section that has now been laminated on the slide 515. Finally, the expended adhesive tape collects on the take-up mechanism 6.

It should be understood that the slide transfer system can be used with other systems than those disclosed herein to transfer cut sections from a tape onto slides. Such independent slide system is depicted in the flow chart of FIG. 24.

Returning to the curing process, in one embodiment, the UV source 519 has a peak wavelength of 375 nm and a UV dose of 30 mJ/mm$^2$ is used to cure the adhesive. In one example, an exposure of 15 seconds at 4.3 W was applied evenly over a 3.0 in$^2$ (1940 mm$^2$) profile of each slide 515. In one example, the slides 515 are prepared with a custom UV curable adhesive coating. First, the slides 515 are treated with a transparent, uniform electrically charged coating to promote adhesion with cured UV adhesive. This may be accomplished by coating clean borosilicate microscope slides with a solution of cyanoacrylate diluted in acetone and drying. Next, a uniform 15 μm to 20 μm layer of UV adhesive is applied to the slide surface. If a viscous, non-self-leveling UV adhesive is used, the UV adhesive should be leveled. Again, this is just one example of a slide and a UV adhesive and UV exposure, there may be other manners of laminating the sections onto the slides.

These other manners of laminating the section onto the slide may include other types of adhesives that may be cured using other spectrums of light. In addition, the other types of adhesives may include adhesives that cure in other manners. An example of such an adhesive being used on the slide is provided below. Some exemplary characteristics of the exemplary adhesives that may be used to laminate the section to the slide is that the adhesive should be reasonably optically transparent (when cured if applicable), should match the refractive index of the slide glass (when cured if applicable) and should not react or interfere in later slide processing steps.

Figure 13:
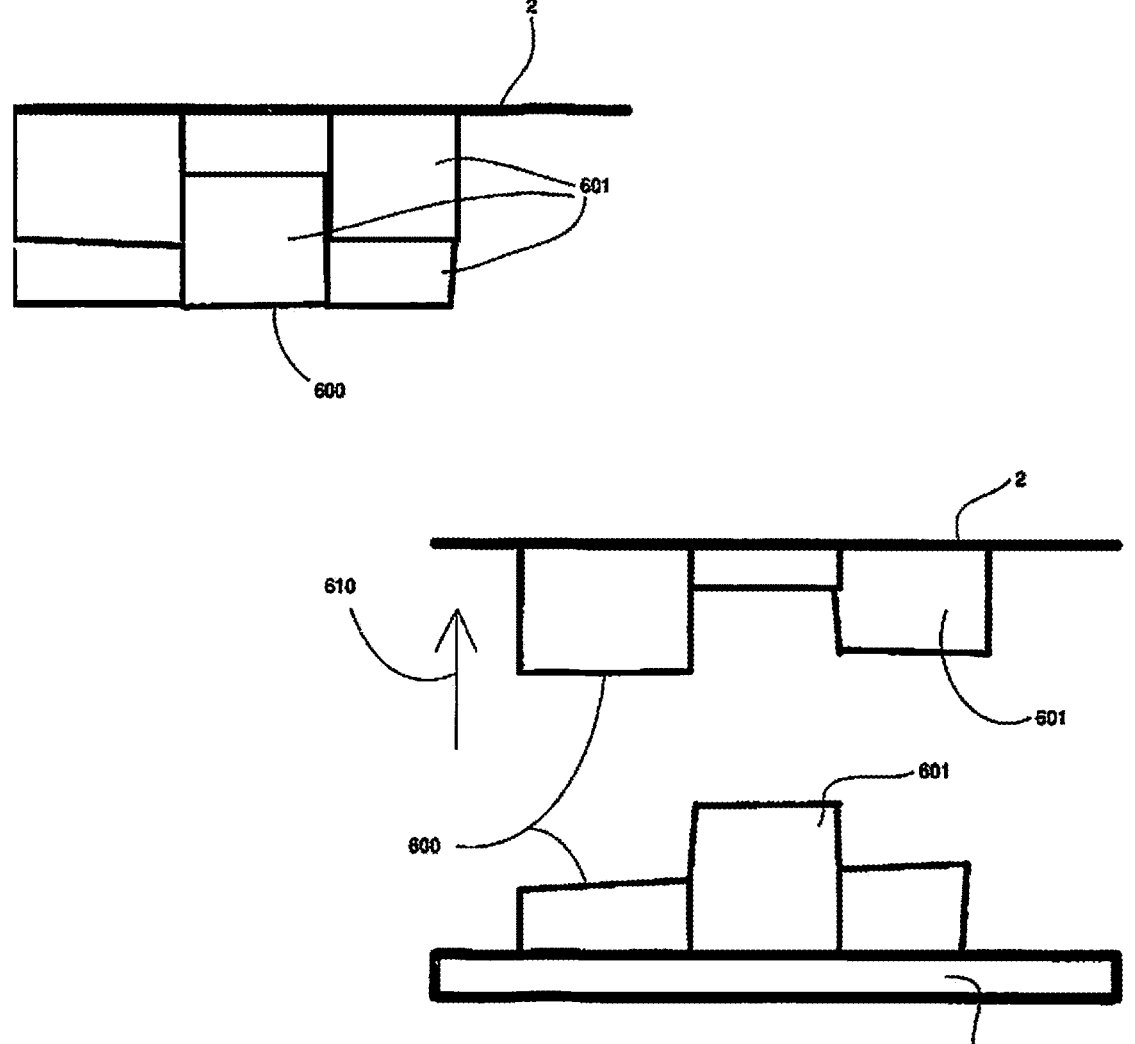
FIG. 13 is a schematic view showing an example of an incomplete section transfer from the adhesive tape to a slide.

FIG. 13 shows an example of an incomplete section transfer from the adhesive tape 2 to the slide 515. The left portion of FIG. 13 shows a section 600 that has been adhered to the adhesive tape 2. The section is shown as including a series of cells 601. Those skilled in the art will understand that the cells 601 may represent any material having internal cleavage planes/bonds that may be weaker than the bond with the adhesive tape 2. The right hand portion of FIG. 13 shows the section 600 being transferred from the adhesive tape 2 to the slide 515. In the right hand portion of FIG. 13, it may be considered that the section 600 has been deposited on the slide 515 and that the UV adhesive of the slide 515 has been cured. Thus, this is the time when the adhesive tape 2 is being peeled in the direction of arrow 610 from the slide 515 and section 600. In this example, the adhesive strength of the adhesive tape is greater than the adhesive strength of the UV adhesive of the slide 515, resulting in the section 600 being not completely transferred to the slide 515, e.g., the peeling of the adhesive tape 2 from the slide resulted in some of the cells 601 of the section 600 remaining on the adhesive tape 2. This is an incomplete transfer and an undesirable result. Thus, as described above, the maximum adhesive strength of the adhesive tape 2 should be such that it does not result in the incomplete transfer as shown in FIG. 13. However, as described above, there may be situations where the tissue elastic limit may dictate a maximum tape adhesive strength limit lower than the minimum tape adhesive strength required for sectioning. The following exemplary embodiments provide a solution for this issue.

In various embodiments, the adhesive strength of the adhesive tape 2 may be varied to expand the range of tissues transferable via the adhesive tape 2. In these embodiments, the tape adhesive strength is lowered immediately prior to peeling the adhesive tape 2 from the section so as not to exceed the section elastic limit. The tape adhesive strength may be reduced via heating, cooling, or UV exposure. That is, the particular adhesive that is used for the adhesive tape 2 may have properties that can be changed under certain conditions. Heating the adhesive tape 2 that has been laminated to the slide 515 may be done, for example, via radiative heating element, by a convective heating element for the enclosed slide transfer compartment, or by a conductive heating element. The radiative source may be incorporated into the UV adhesive curing light source 519. Heating the adhesive tape may also introduce issues with the sections such as melting the section embedding medium such as paraffin as was described above with respect to the heating of the microtome blade. Thus, the amount of heat should be controlled to reduce the adhesive strength of the tape, but not cause damage to the section.

For some tape adhesives such as silicone, cooling the adhesive leads to the desired weakened adhesive strength. Unlike the heating method, cooling will not promote melting of an embedding medium. In one example, a pressurized freezing spray may be used to reduce the adhesive temperature. In another example, the temperature of the slide application compartment within the slide station 5 may be lowered. Whether cooling or heating, the varying expansion or contraction between the section on slide 515 and adhesive tape 2 may also aid in delamination of the section from the adhesive tape 2. An adhesive tape 2, such as a UV dicing tape, which becomes less adhesive after UV exposure, may also be used. The UV source for reducing the tape adhesive strength may be a separate UV source or may be incorporated into the UV source 519 used for curing the slide UV adhesive. After the adhesive strength is lowered, the adhesive tape 2 may be more easily peeled from the sections, leaving the sections on the slides.

In the example of the adhesive tape 2 being a hot melt adhesive type tape, the regions of the hot melt adhesive supporting sections on the adhesive tape 2 may be melted prior to section transfer to the slides or alternatively during transfer to the slides. This procedure allows the sections to expand on the liquid layer akin to a water bath to reverse tissue compression caused during tissue processing and embedding prior to sectioning. Allowing the hot melt layer to cool fixes the expanded section in place. Transferring the section to the slide 515 may be with a UV curable adhesive. Alternatively as in the embodiment with UV release adhesive, heating the hot melt layer lowers the adhesion between section and adhesive tape 2 during tape peel. Cooling the tape-section-slide laminate post UV cure may likewise release the adhesive tape 2 from the section via differential thermal contraction. This method may allow a weaker viscous solution to replace the UV cure adhesive.

In another exemplary embodiment, the adhesive tape 2 may comprise a hot melt adhesive layer on a binding layer on a carrier layer. The binding layer more firmly adheres to a solid hot melt adhesive and carrier than the two layers to each other. The binding layer may be the aforementioned UV release adhesive. If so, UV exposure prior to tape peel may improve on-slide section retention.

Figure 18:
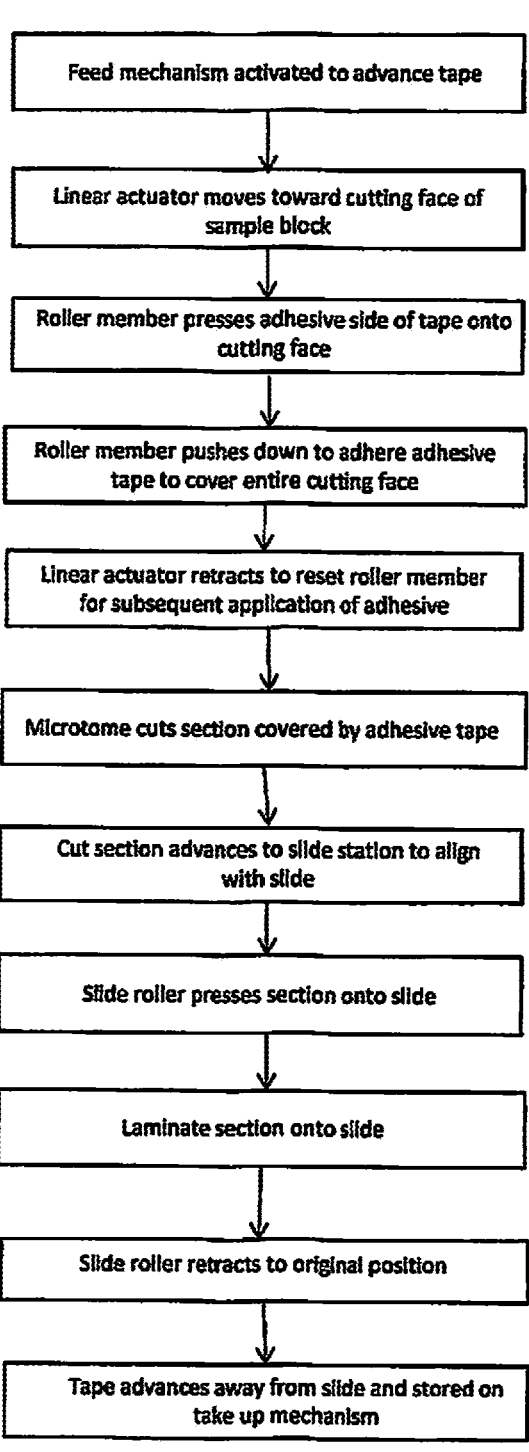
FIG. 18 is a flow chart illustrating the automated steps of the system of FIG. 1
Figure 19:
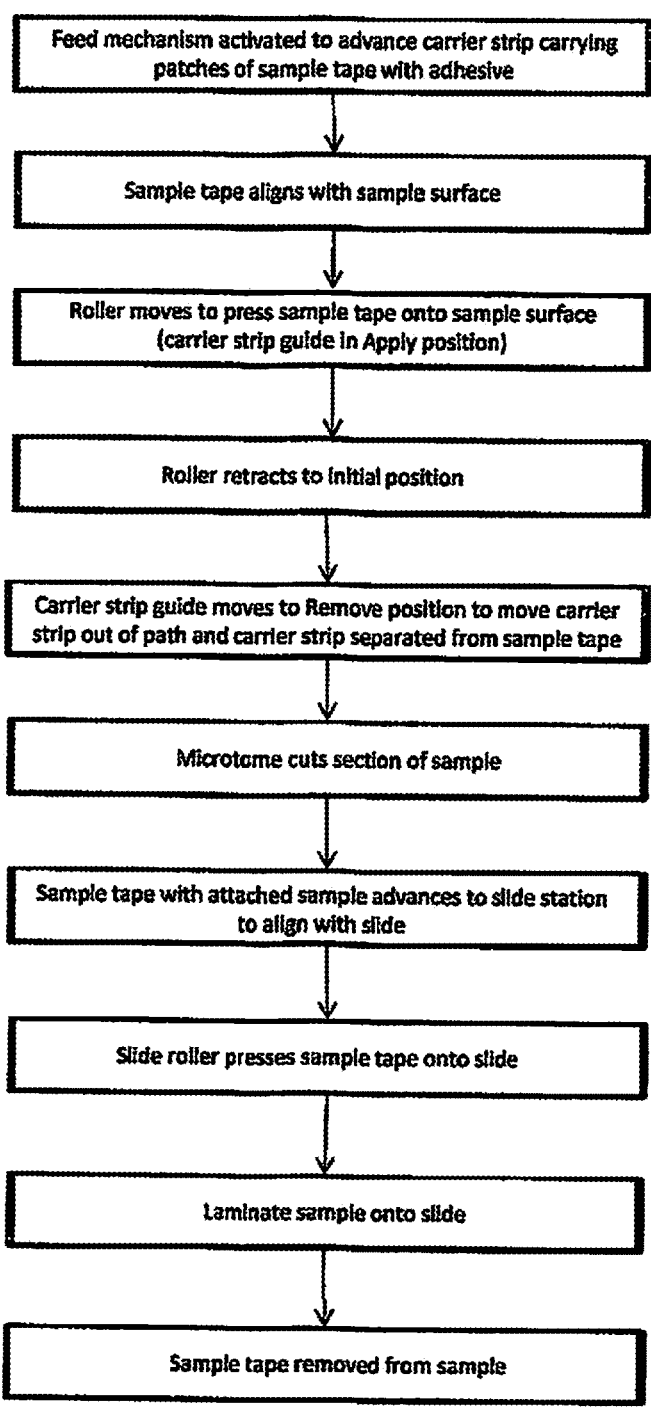
FIG. 19 is a flow chart illustrating the automated steps of an alternate system of the present invention.

The flow charts of FIGS. 18 and 19 illustrate the steps of the motor controlled automated systems for transferring a sample to tape cut by a microtome and further transferring the sample to a slide. In the flow chart of FIG. 18, the continuous tape system of FIG. 1 is depicted; in the flow chart of FIG. 19, the discrete adhesive sections system of FIGS. 20A-20C is depicted.

Figure 21:
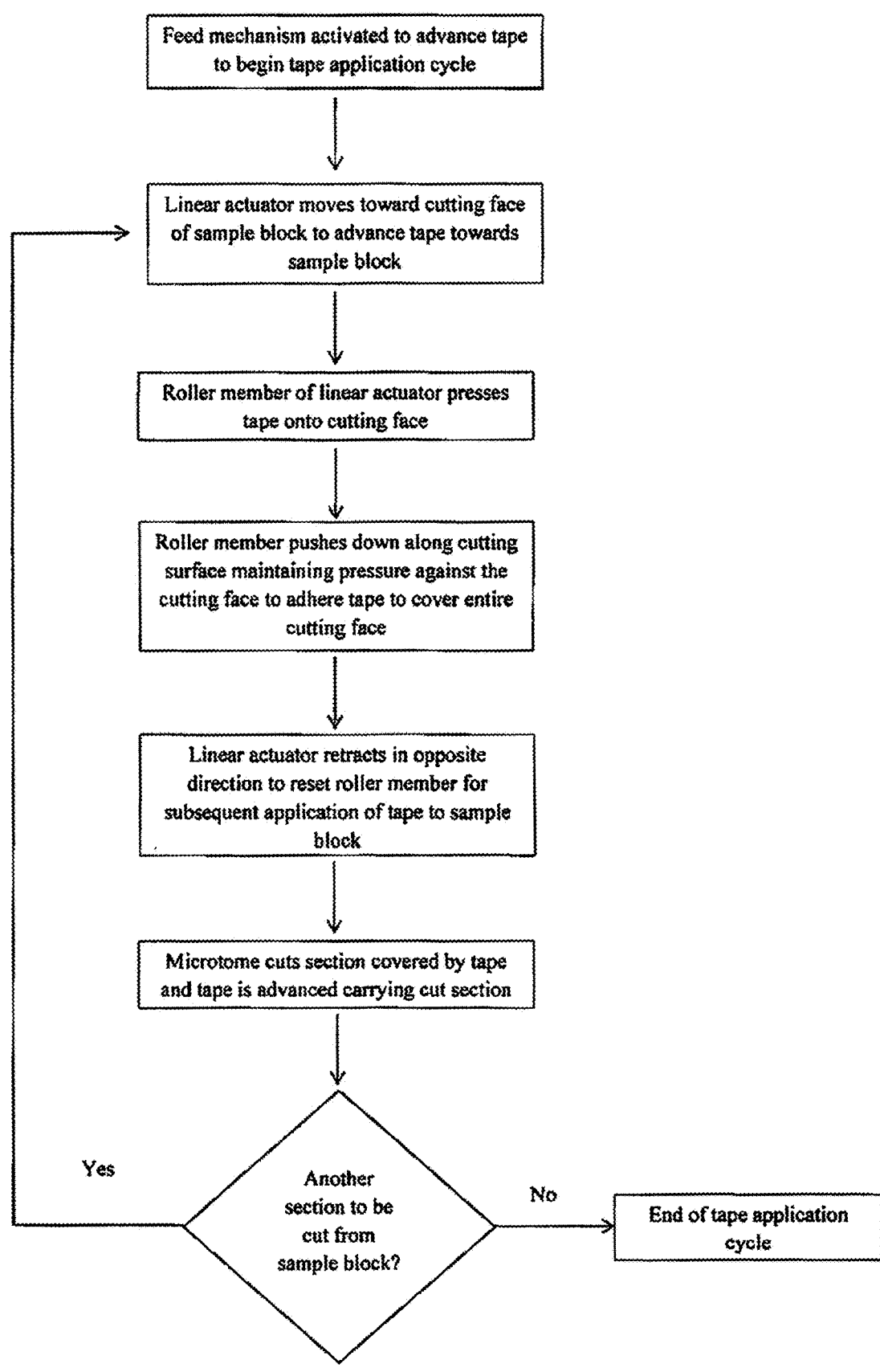
FIG. 21 is a flow chart illustrating the steps of an automated system for applying a sample to a tape in accordance with one embodiment of the present invention.
Figure 22:
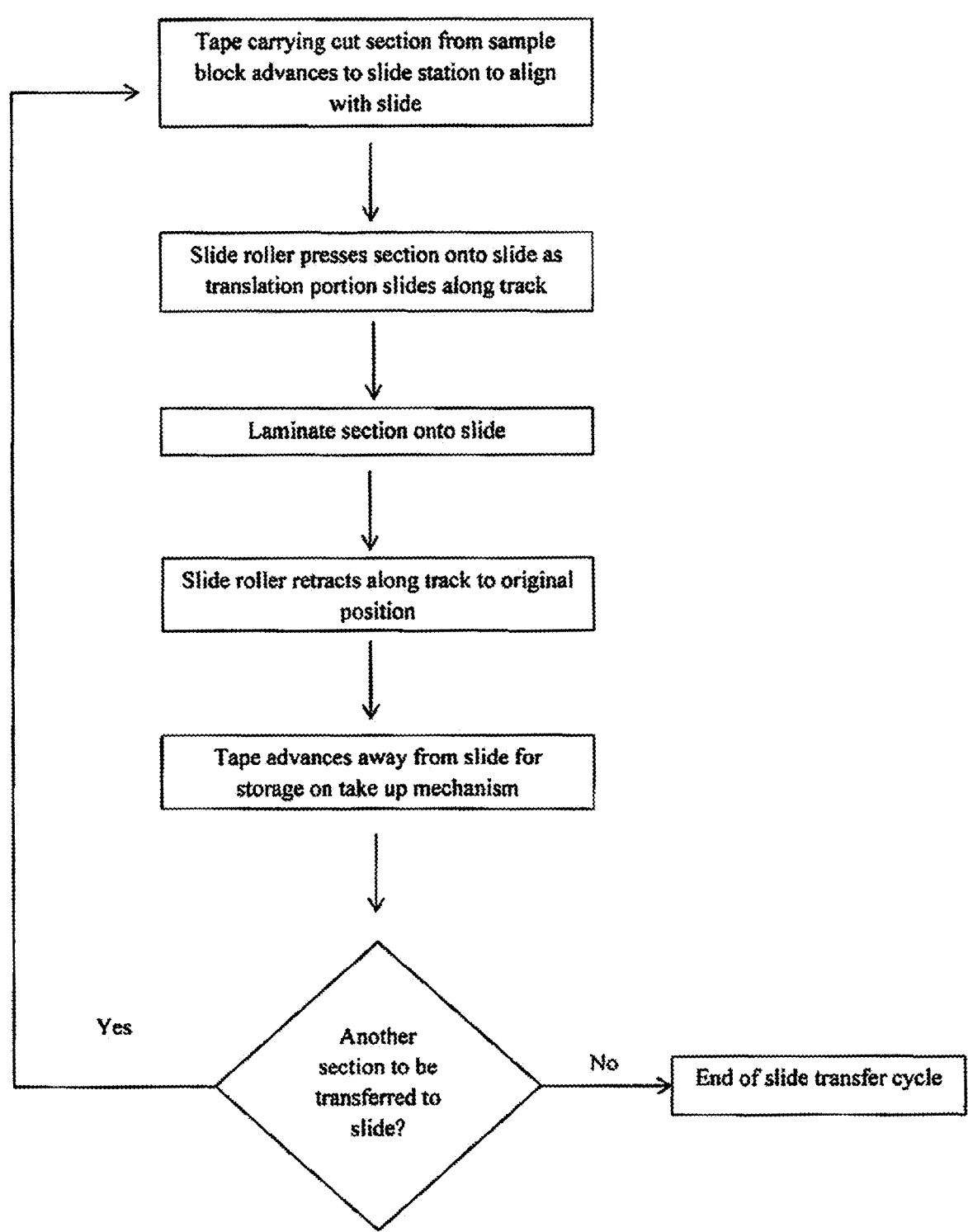
FIG. 22 is a flow chart illustrating the automated steps for transferring a sample from tape to a slide in accordance with one embodiment of the present invention.

Turning first to FIG. 18, as shown, the feed mechanism is activated to advance the tape, i.e., a continuous length of adhesive tape. The tape is advanced from a feed mechanism such as feed mechanism 3 described above. The linear actuator member, e.g., linear actuator member 10, is moved toward the cutting face of the sample block as described above. Next, the roller, e.g., roller member 101, presses the adhesive side of the tape onto the cutting face. The roller is then pushed down to adhere the adhesive tape to cover the entire cutting face. The linear actuator is retracted to its original position to reset the roller for subsequent application of adhesive tape to another sample. The microtome then cuts the section covered by the adhesive tape (along a plane parallel or substantially parallel to the cutting face). The cut section carried by the tape is advanced to the slide station, e.g., slide station 5, to align with the slide. The slide roller presses the section on the tape onto the slide, and the section is laminated onto the slide by the various methods described above. The slide roller is retracted to its original position and the tape is advanced away from the slide, leaving the section on the slide, and stored in the take up mechanism, e.g., take up mechanism 6, described above. These steps of FIG. 18 repeat until a desired number of sample sections have been transferred to the tape, cut by the microtome and transferred to slides. These steps from activation of the feed mechanism to the end of the tape application cycle are shown in the flow chart of FIG. 21. The steps of application of the samples to slides to the end of the slide transfer cycle is shown in the flow chart of FIG. 22

In the alternate system depicted in FIG. 19, instead of a continuous adhesive tape, discrete (spaced apart) sections of the tape are provided with adhesive and applied to the sample. More specifically, the flow chart of FIG. 19 sets forth the specific steps of the system of FIGS. 20A-20C.

Figure 20A:
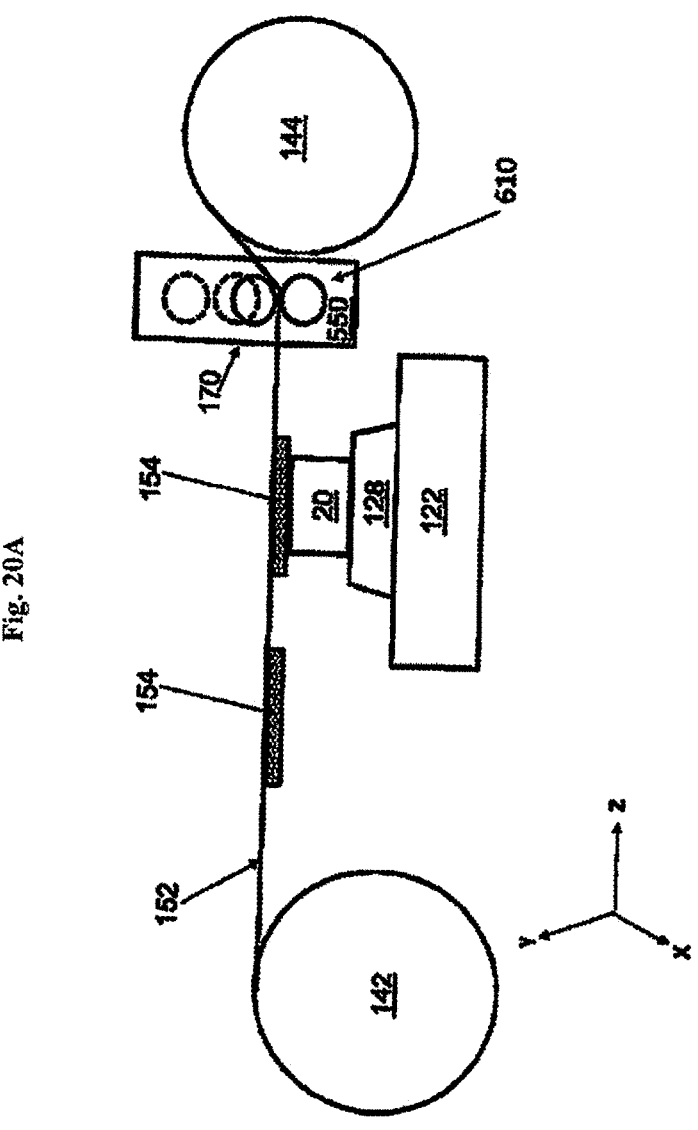
FIGS. 20A-20C are partial elevated views of an alternate embodiment of system corresponding to the system depicted in the flow chart of FIG. 19 showing the steps of transfer to the tape and movement to the slide station . . . .
Figure 20B:
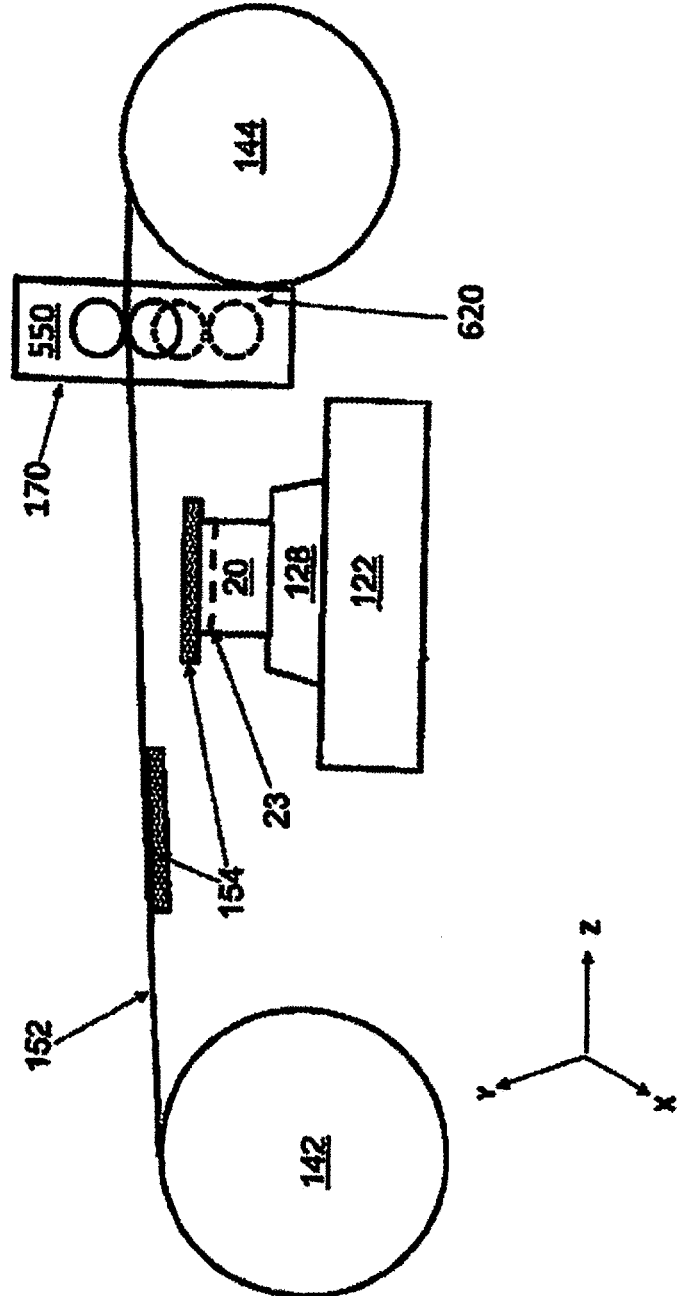
Figure 20C:
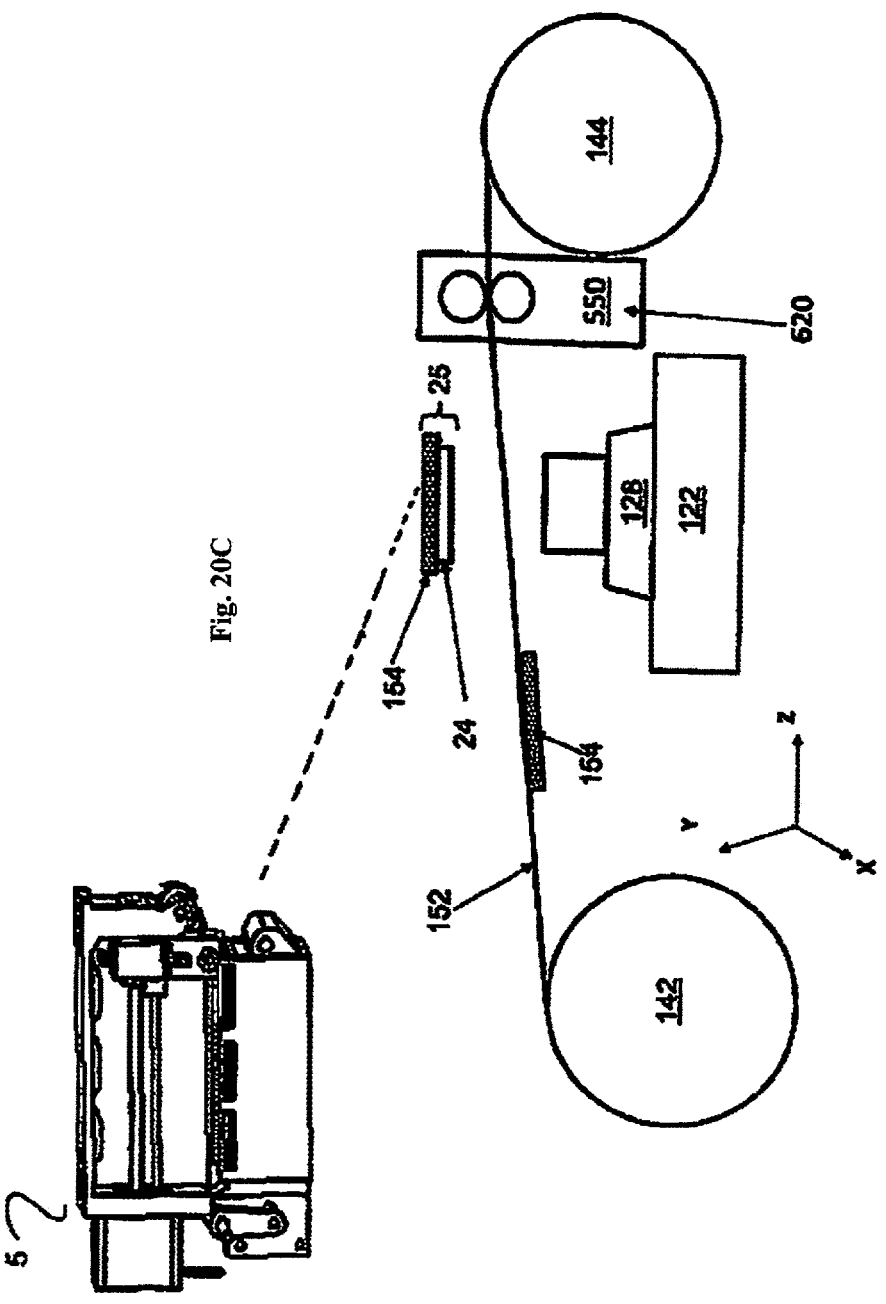

In FIG. 20, the chuck head 122 and chuck adapter 128 have advanced to a microtome-ready position, with the sample block of tissue 20 advanced to a position ready for cutting and a patch of sample tape 154, carried on the carrier strip 152 advanced from the supply spool 142, is aligned with the sample 20, i.e., disposed parallel (or substantially parallel) to and facing the surface of sample. As shown in FIG. 20A, the carrier strip guide 170 is in the "Apply" position 610 so that the carrier strip 152, upon which is adhered the patch of sample tape 154, is parallel (or substantially parallel) to the surface of the sample block 20 to be cut by the microtome. The patch of sample tape 154 is applied to the surface of sample block 20 and adheres to the surface of the sample block 20, such as by an adhesive, as the carrier strip 152 is pressed onto the sample block 20.

Next, the carrier strip 152 is separated from the sample tape 154 (FIG. 20B) for sectioning the sample block 20 at dotted line 23. The carrier strip guide 170 (within block 550) moves from the "Apply" position 610 of FIG. 20A to the "Remove" position 620 of FIG. 20B, thus changing the angle of the carrier strip 152 relative to the sample block 20 so it is no longer parallel (or substantially parallel) to the sample block 20, and forcing the carrier strip 152 into a new path that is disposed at an angle from the sample block 20. As shown, this new path further spaces the carrier strip from the sample block 20.

Next, the sample block 20 is prepared to be sectioned. The carrier strip 152 has been separated from the sample tape 154, which is firmly adhered to the cutting face of the sample block 20, preferably covering the entire cutting face. The knife blade of the microtome makes a single cut through the sample block 20 at cut line 23 to create a specimen segment 24 (also referred to herein as a cut section) as shown in FIG. 20C. Thus, FIG. 20C shows a stage of the tape application process in which the microtome operation has been completed and the specimen segment 24 is stuck to the patch of sample tape 154 (hereinafter together referred to as the tape-sample segment 25). Note the tape-sample segment 25, which includes the tape patch and cut section adhered thereto, has been removed from the knife-block and is now out of the way of the chuck head assembly. The tape sample segment 25 is then transported to the slide station 5, such as by adherence to another carrier or strip of tape (not shown) or by another conveying or transport method which carries the segment 25 to the slide station for transfer to a slide in the manner described above in conjunction with the embodiments of FIGS. 1-17.

The microtome is then again ready for a cutting operation. The advancement mechanism automatically moves the chuck head 122 forward a selected amount such that the sample block (specimen) 20 is in position for the next cut of a chosen thickness. Thus, the sample block 20 is again advanced by the chuck head 122 to a microtome-ready position. The tape transport unit advances and aligns a new patch of sample tape 154 above and parallel (or substantially parallel) to the surface of the sample block 20, and the actuator system returns the carrier strip guide 170 to the "Apply" position 610. The section is cut, removed from the carrier strip and transferred to the slide station 5. This is repeated until the desired number of samples have been cut and transferred to slides.

Note that further details of the system of FIGS. 20A-20C for transferring the sample onto the patch of sample tape are described in application Ser. No. 15/179,916, filed Jun. 10, 2016, the entire contents of which are incorporated herein by reference.

The flow chart of FIG. 19 summarizes the steps in the system of FIGS. 20A-20C. The feed mechanism is activated to advance the carrier strip carrying patches of sample tape with adhesive until the sample tape is aligned with the cutting face (surface) of the sample block. The roller moves to press the sample tape onto the sample surface with the carrier strip guide in the Apply position. The roller is then retracted to the initial position. The carrier strip guide moves to the Remove position to move the carrier strip out of the path and the carrier strip is separated from the sample tape. Next the microtome cuts a section of the sample. The sample tape with attached sample (tape segment) advances to the slide station, e.g., station 5 of FIG. 1, to align with a slide. The slide roller presses the sample tape onto the slide, and the sample (cut section) is laminated onto the slide by the various methods described above. The slide roller is retracted to its original position and the sample tape is removed from the cut section (sample) and slide. These steps repeat until a desired number of sample sections have been transferred to the tape, cut by the microtome and transferred to slides. Note that FIGS. 20A-20C illustrate a system where the sample tape is separated from the carrier strip after being cut before transport to the slide station for transfer to slides. It is also contemplated in an alternate embodiment some of the discrete sections are maintained on the carrier strip (film) for slide transfer while other discrete sections released for direct on tape analysis or storage. Thus, in this alternate embodiment, although discrete adhesive sections are provided along the tape for individual adherence of sample tape to the sample, the sample tapes with attached sample (cut section) do not separate from the carrier strip but continue to be carried by advancement of the carrier strip into the slide station for transfer of the samples to the slides.

It should be noted that there are several other components of the slide station 5 that have not been described. For example, the slide station 5 may include an enclosure 513 (FIGS. 10 and 11) that shields the slides 5 from dust and light from the environment that can negatively affect the transfer. Likewise, the enclosure 513 also shields the operator from the UV source during operation. The interior of the enclosure 513 may be reflective to reflect UV light back towards slides for improved efficiency. The slide station 5 may also include a secondary roller 514 that is used to allow the adhesive tape 2 to travel to the take-up mechanism 6 without causing the adhesive tape 2 to become jammed or otherwise caught up in the slide station 5.

As described above, the automated tape transfer apparatus 1 may include a programmable digital controller, a processor or other type of application specific integrated circuit (ASIC) that is used to control the motion of the automated tape transfer apparatus 1, communicate with users of the automated tape transfer apparatus 1 and/or communicate with the microtome 4 to which the automated tape transfer apparatus 1 is connected. As described in detail above, there are many motions that can be controlled within the automated tape transfer apparatus 1. Examples of these motions include the movement of the feed mechanism 3 and the take-up mechanism 6, movement of the lower portion 530 and the translation portion 545 of the slide station 5, movement of the linear actuator member 103, etc. The controller may also provide information to users of the functions or conditions of the automated tape transfer apparatus 1 such as the number of slides that have been prepared, the number of sections that have been transferred, the amount of tape remaining on the roll, etc. The controller is capable of receiving any types of input (e.g., mechanical, visual, electrical, etc.) to perform its control functions.

In another exemplary embodiment, the automated tape transfer apparatus 1 further includes an optical device to inspect the sample block. For example, the microtome 4 may store multiple sample blocks for sectioning. The optical device may be used to assess the condition of the cutting face or determine the location of the tissue within the embedding medium. In one example, a macro image of the cutting face may enable more precise placement of the adhesive tape 2 on the cutting face 401. Analysis of the cutting face 401 may facilitate automatic trimming of the cutting face 401 to expose the desired tissue for sectioning.

In another example, one or more optical sensors may be used to provide feedback to the controller on the position and quality of the section on the adhesive tape 2. For example, a brightness sensor in close proximity to a backlit section of the adhesive tape 2 may distinguish between an empty portion of the adhesive tape 2 and a portion that is carrying a section. This may provide an approximate location of the section on the adhesive tape 2 that may be used as an input to the controller for various purposes, such as motion control. A CCD imager or similar device may be used to image the section to provide feedback on the quality of the transfer. These images may be used to check for errors in the process, such as incomplete transfer of a section, misalignment of a section on the adhesive tape 2, presence of section trimming waste on tape, etc. In these error cases, additional sections may be taken to replace defective sections.

This visual analysis may also be employed during the block trimming process, where the microtome 4 cuts superficial or incomplete sections from the cutting face 401 to expose the sample region of interest. Visual analysis of trends in parameters such as tissue size and location during the trimming process will determine when the desired cutting face 401 is sufficiently exposed. In such cases where waste sections containing tissue are discarded, the sections may instead be acquired and stored on tape. These sections may be transferred to slides if required. A similar optical method of inspecting the section on a slide 515 may also be used. A sensor system may provide feedback of the quality of the section transfer to a slide 515 and alert the controller to errors in the process. The same or different optical sensors may be used for both tape and slide inspection.

In another exemplary embodiment, the slide station 5 may include a mechanism for the automated manipulation of slides 515. The mechanism may include a compartment for housing standard unused, clean microscope slides. When using the UV cure adhesive, slides 515 with an electrically charged surface may be prepared to promote bonding to the glass. An automatic method of dispensing and leveling adhesive onto slides may be employed. Alternatively, a mechanical arm or belt system may be employed to transfer slides. A conveyor, such as a conveyor belt, with outward facing ridges for holding slides may transfer slides to and from an unused slide storage, the slide tape applicator section (as described above with reference to FIGS. 10-12), and a section-on-slide storage location that may be included within or exterior to the housing 13 of the slide station 5. Spacing of ridges provides a method match slide spacing to section spacing on tape during section transfer.

Figure 15:
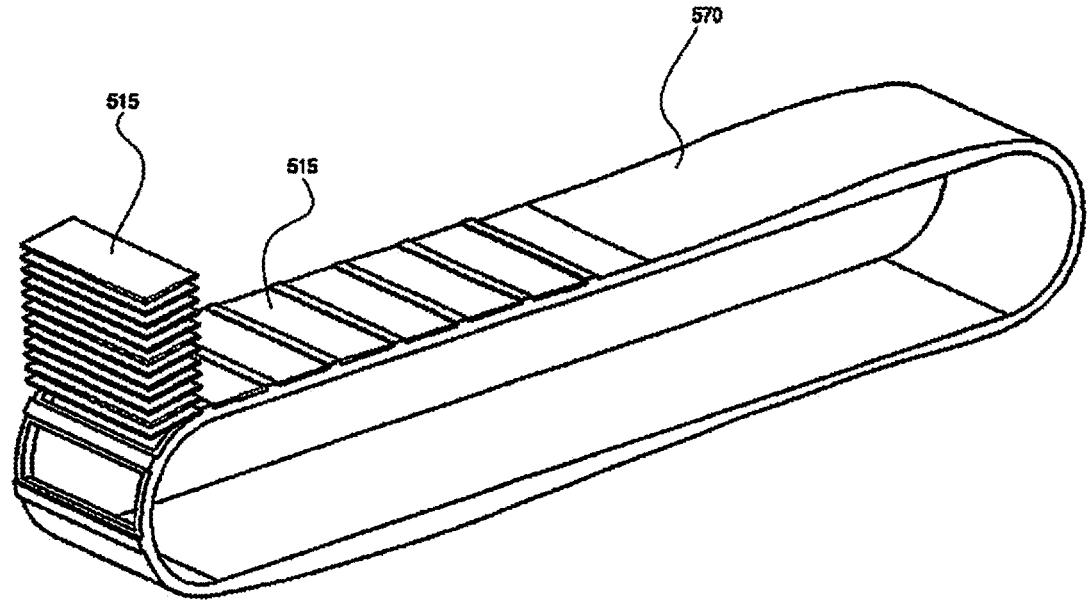
FIG. 15 shows an embodiment of a conveyor belt of the present invention for moving the slides from storage to the slide station.

FIG. 15 shows an example of a conveyor belt 570 for moving the slides 515 from storage to the slide station 5. The conveyor belt is an example of how slides can be transferred to slide station 5, it being understood that other ways to transfer the slides are also contemplated. The stack of slides 515 on the left side of FIG. 15 may be considered the slide storage. The slide storage may be included within the slide station 5 or it may be a separate component such that a portion of the conveyor belt 570 is within the slide station 5 and a portion of the conveyor belt is outside the slide station. The slides can be stored in an enclosure. The conveyor belt 570 may move the slides 515 from the storage area to the working area of the slide station 5. By allowing multiple slides to be stored within the storage area and moved automatically to the working area of the slide station, a user of the automated tape transfer apparatus 1 does not need to constantly reload the working area with new slides. The entire process of transferring the sections to the slides may then not require any user interaction, except to reload the storage area with new slides and change the adhesive tape on an occasional basis. It should also be noted that while FIG. 15 shows the loading of the new slides into the working area of the slide station 5, the conveyor belt 570 may also move the slides from the working area of the slide station 5 to another storage area for slides that have applied and adhered sections. That is, there may be a corresponding storage area at the opposite end of the conveyor belt 570 where slides having applied sections are offloaded and stored.

It should also be noted that when it is described above that the conveyor belt 570 moves the slides into the working area of the slide station 5, this does not require that the conveyor belt 570 moves directly into the area where the section and the adhesive is applied to the slide. For example, referring to the arrangement in FIG. 10, the conveyor belt 570 (not shown) may not move the slides 515 directly to the area of the support section 517. Referring to FIG. 10, the slide station 5 may also include an opening 518 through which slides 515 may move. Thus, the conveyor belt 570 may move the slides to a location near the opening 518 and a mechanism such as an arm may move the slides 515 from the conveyor belt 570 through the opening 518 to the support section 517 where the sections and adhesive is applied to the slides 515. The mechanism may then move the slides 515 back to the conveyor belt 570 for moving back to the storage area for completed slides.

It should be noted that the above is only an example and there may be other manners of moving the slides 515 from the conveyor belt 570 to the support section 517. In addition, the conveyor belt 570 may also move directly to the support section 517 such that the slides 515 do not have to be moved from the conveyor belt 570. In such an arrangement, the conveyor belt 570 may be made of a transparent material if the adhesive is a UV curable adhesive so that the UV light is able to illuminate the adhesive for the slides 515 on the conveyor belt 570. In another exemplary arrangement, mirrors or other reflectors may be used such that the UV light is guaranteed to illuminate the UV adhesive if the conveyor belt 570 is not a transparent material.

Figure 16:
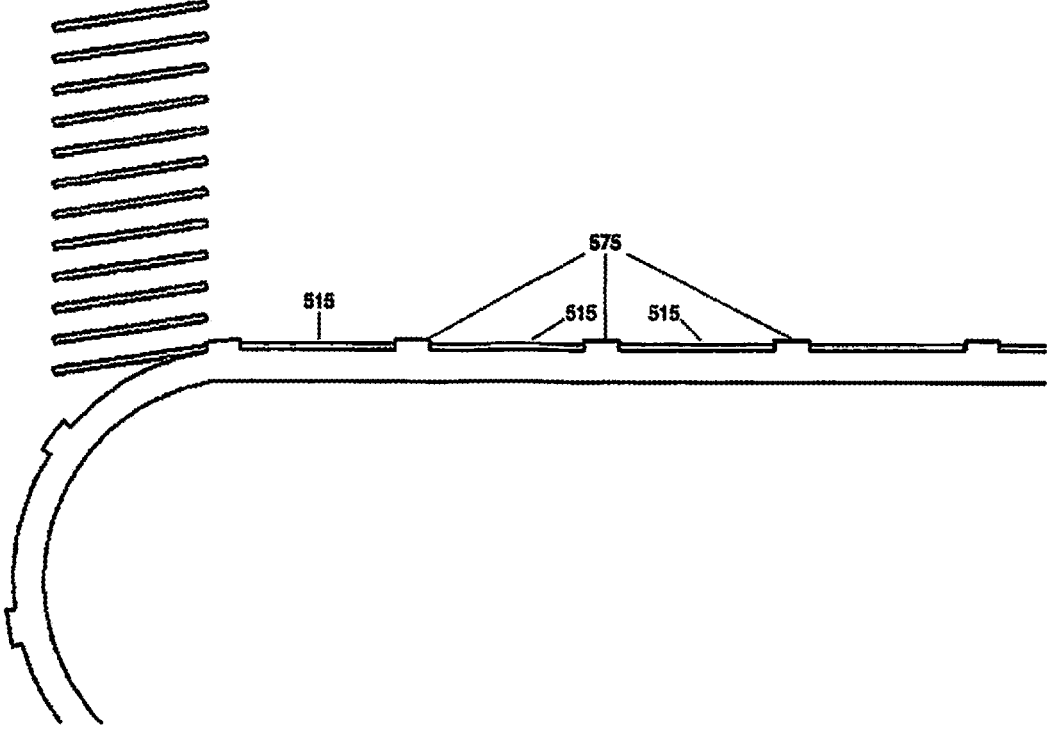
FIG. 16 shows a side view of the conveyor belt of FIG. 15.

FIG. 16 shows a further view of the exemplary conveyor belt 570. In this side view, it can be seen that the conveyor belt 570 includes a series of ridges 575 between which the slides 515 may be lodged to move the slides to the working area of the slide station 5. Specifically, the slide storage area may have a stack of slides 515 that may be gravity fed as shown in FIG. 16 (or automatically fed). As a slide 515 moves down the slide storage stack, the slide 515 may contact the conveyor belt 570 with an edge of the slide 515 contacting a ridge 575. As the conveyor belt 570 continues to move, a second edge of the slide 515 contacts the trailing ridge 575, thereby causing the slide to be lodged between the ridges 575 so that it may be moved to the working area of the slide station 5.

It should be noted that FIGS. 15 and 16 provide one example of a conveyor belt mechanism for moving the slides 515 from a storage area to a working area. The systems are not limited to such a moving mechanism. For example, other movement mechanisms may be used such as robotic arms that grasp the slides 515 and move the slides 515 from the storage area to the working area, suction type mechanisms that adhere to a portion of the slides 515 so that the slides may be moved to the working area, etc.

The automated tape transfer apparatus 1 may also include in some embodiments automated system to label slides and sample blocks with a barcode or other moniker for identification. Viable slide labeling methods include attaching an adhesive printed label, etching a label into the material or printing a label onto a dedicated location. The label may link a slide to relevant information such as the originating tissue block and sectioning date. Sample blocks may be similarly labeled. To accommodate pre-labeled blocks, an optical reader, such a barcode reader may be used to read block label to produce the relevant slide labels.

As described above, the automated tape transfer apparatus 1 may include the microtome 4 or may be a separate device that is coupled to a microtome 4. In either case, an enclosure may be provided around the microtome 4 and automated tape transfer apparatus 1 to allow for the control of ambient operating conditions such as temperature, humidity, and exposure to light.

In another embodiment, the automated tape transfer apparatus 1 may include a mechanism for automatically loading tissue sample blocks into the chuck of the microtome 4. As described above, the chuck of the microtome 4 securely holds the sample block when the microtome is sectioning the sample block. The mechanism may include a supporting platform for securing the microtome 4. The supporting platform allows for a height and distance adjustment of the microtome chuck with respect to the automated tape transfer apparatus 1 in addition to the primary methods of adjusting block height via chuck resting position and distance via tape applicator linear actuator member 3. During operation, the support platform may lock the microtome 4 position. In one example, the microtome 4 is affixed to a horizontal platform extending from the bottom of the mechanism. The platform may include a turntable allowing the microtome 4 to swivel away from automated tape transfer apparatus 1 to facilitate servicing the sample chuck and blade holder area unimpeded by the automated tape transfer apparatus 1.

In another embodiment, the automated tape transfer apparatus 1 may include an active position adjustment with respect to the position of the sample block held in the microtome 4. For example, the automated tape transfer apparatus 1 may rest upon a horizontal linear track capable of advancing or retreating the tape applicator 7 from the sample block as needed. This would facilitate consistent tape application motion regardless of sample block thickness. Furthermore, in a maximally retracted position away from the microtome 4, the tape applicator 7 may allow space to service the microtome chuck area otherwise blocked by the tape applicator 7.

Figure 17:
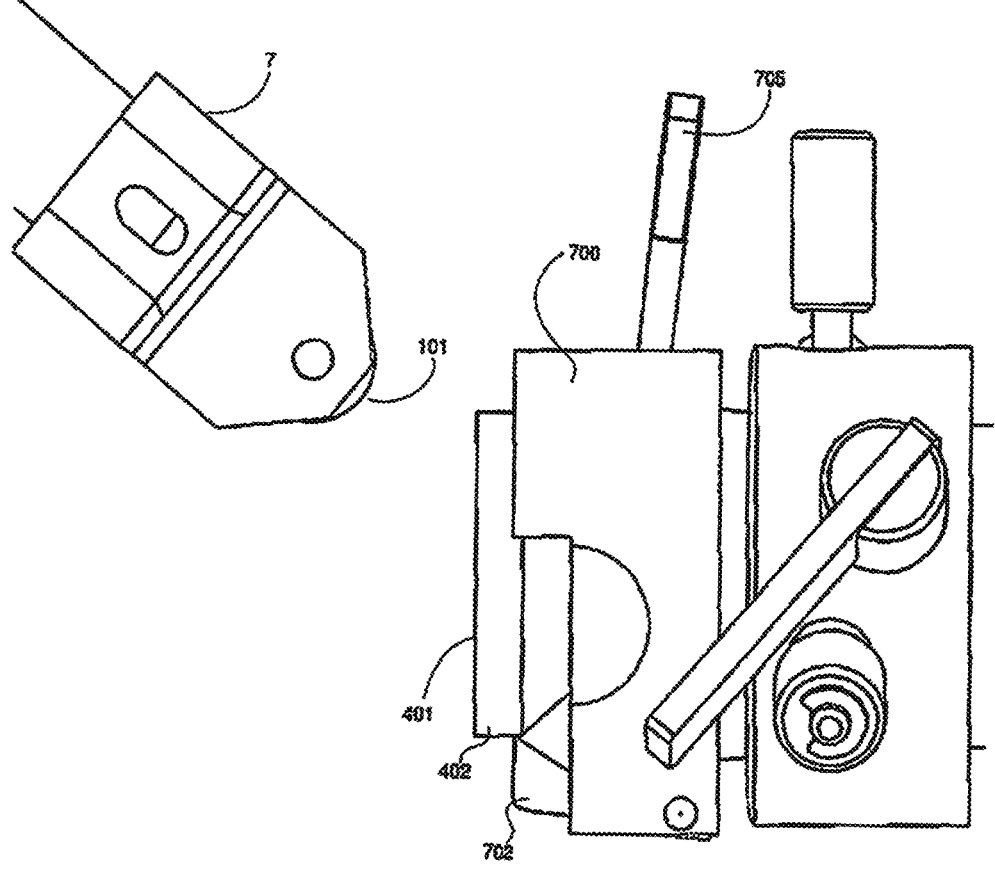
FIG. 17 shows a close-up view of the tape applicator of FIG. 1 in the region of the roller member and the cutting face.

FIG. 17 shows a close-up view of the tape applicator 7 in the region of the roller member 101 and the cutting face 401. In one exemplary operation with the tape applicator 7 in the retracted position as shown in FIG. 17, a paraffin cassette 402 may be removed from the microtome 4 chuck 700. The automated tape transfer apparatus 1 may include a system for automatically loading sample blocks into microtome chuck. While tissue cassette blocks exist in a common form factor, the chuck for holding them on the microtome naturally varies with brand and model. The exemplary automated tape transfer apparatus 1 may include a chuck 700 with a bottom clamping jaw 702 with a forward-releasing lever 705 on top seen in FIG. 17. A modular, exchangeable block loading system may allow for the automated tape transfer apparatus 1 to accommodate various microtome models. A mechanical arm may be employed to grasp the cassette without damaging the sample such as by holding the plastic base of a paraffin cassette exposed in the chuck. The mechanical arm may then engage the block release lever on top of the chuck to release it. The arm then transports the block from the microtome chuck to device block storage.

In another embodiment, the tape adhesive layer of the adhesive tape 2 is separable from the carrier film. In all the bonds that have been described above of the slide-section-tape laminate post UV cure, e.g., between slide and section, between section and tape adhesive, and between the tape adhesive and the flexible carrier film, the bond strength between the tape adhesive and the flexible carrier film is typically the weakest bond. The bond strength between the tape adhesive and the flexible carrier film exceeds the minimum strength requirement while sectioning as described above. However, while peeling the adhesive tape 2 from the section during transfer to the slide, the tape adhesive layer may remain bonded to tissue section on the slide while the flexible carrier film is removed. That is, the tape adhesive layer remains on the slide 115 as the flexible carrier film of the adhesive tape 2 is peeled from the slide 115. The adhesive layer of the adhesive tape 2 that remains on the slide 115 may be dissolved during subsequent processing of the slide 115.

In a further embodiment, the flexible carrier film may be a reflective material such as metalized Mylar. During the UV curing process, the flexible carrier film reflects light back through the UV adhesive towards the UV source 119 for more efficient UV curing. The UV adhesive may not absorb 100% of the UV light. Reflecting the UV light gives the UV adhesive another chance to absorb the UV light to catalyze the adhesive cure. In a further embodiment, a solvent applied to the slide-section-tape laminate may weaken the tape adhesive prior to peeling the adhesive tape 2 off of the section.

In implementations where an adhesive tape 2 with a UV release adhesive is used, an alternate tape-to-slide transfer process may be used. For example, due to the decrease in the adhesive strength of the adhesive tape 2 after UV irradiation, the UV-curable slide adhesive may be substituted with a weaker adhesive solution not requiring the UV cure process. The viscosity and adhesion between the slide, non-UV adhesive solution, and section should be sufficient to retain the section on the slide when peeling the adhesive tape. Subsequently, the section may expand on the slide solution akin to the water bath in the traditional process. The slide may be heated to aid in section expansion. Finally, excess solution may be removed such as by evaporation to affix the section to slide.

In another embodiment, the tape adhesive layer may exhibit viscoelastic characteristics allowing sections on the adhesive tape 2 to expand. In the "traditional" manual sectioning process, expanding the tissue sections is accomplished via floating the sections on warm water. Section expansion is desirable to restore tissue from tissue compression caused during the prior embedding process for creating sample blocks. The adhesive tape 2 will still function in supporting the section during the cutting process because the cut occurs quickly enough such that the adhesive response is functionally elastic. On the other hand, the expansion of section on tape occurs slowly enough such that the adhesive response is primarily viscous. Heat may then be applied to the section on adhesive tape 2 to facilitate thermal expansion of tissue section.

In another embodiment, the adhesive tape 2 may include an additional release layer between the tape adhesive layer and the flexible carrier film. The release layer may be a thermoplastic layer, which, when melted, has the additional advantage of allowing sections to expand on tape. Bond strength between the adhesive layer and the carrier layers (e.g., the additional release layer and the flexible carrier film) may then be weakened in lieu of weakening the bond between the adhesive layer of the adhesive tape 2 and the section prior to peeling the adhesive tape 2 off of the section cured to the slide via modifying this release layer. The aforementioned methods of solvents, heating, cooling, or UV radiation may be used to weaken the additional release layer.

In another embodiment, not all the sections that have been adhered to the adhesive tape 2 are transferred to the slides 115. For example, the adhesive tape 2 may advance through the slide station 5 without transferring the sections to the slides 115. This may occur because the user of the slides may not need to see every section that has been sectioned from the section block. However, the user may desire to go back and look at these sections at a later time. Thus, in this exemplary embodiment, the adhesive tape 2 that still includes some sections that have not been transferred to slides 115 may be taken up on a take-up reel that is coupled to the take-up mechanism 6. The take-up reel may then be stored (e.g., in frozen storage or cooled storage) so that the sections that are adhered to the adhesive tape 2, but not transferred to slides 115 may be transferred at a later date. The take-up reels may be labeled as described above with section identifiers and/or sample block identifiers such that the correct take-up reels may be later retrieved.

Figure 23A:
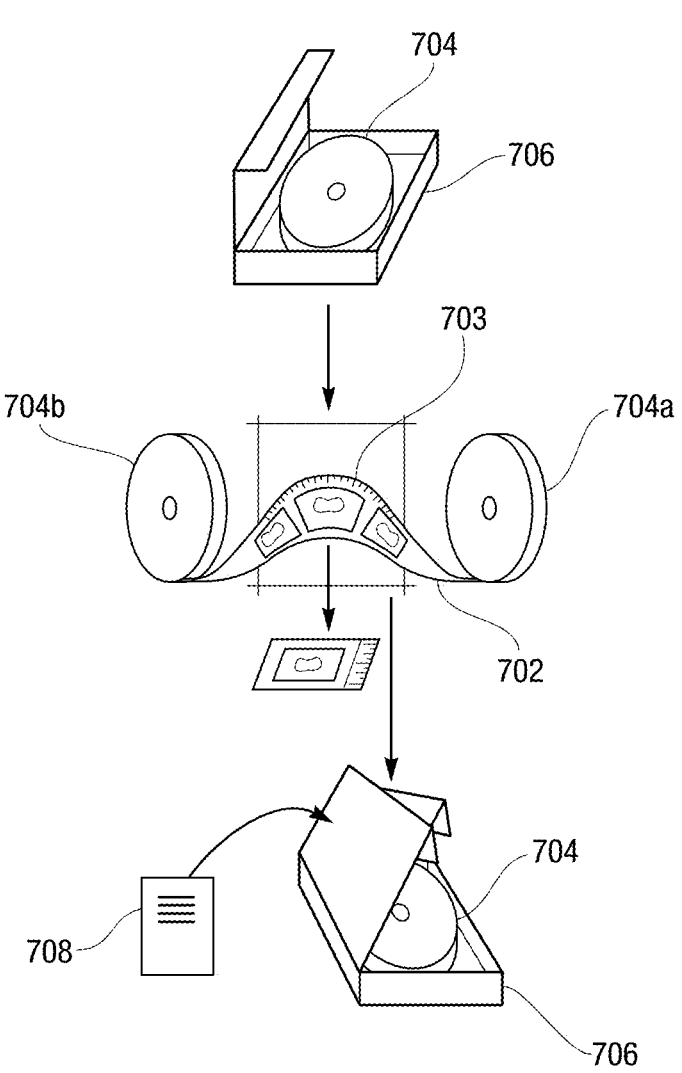
FIG. 23A is a diagram showing a tissue storage system of the present disclosure.
Figure 23B:
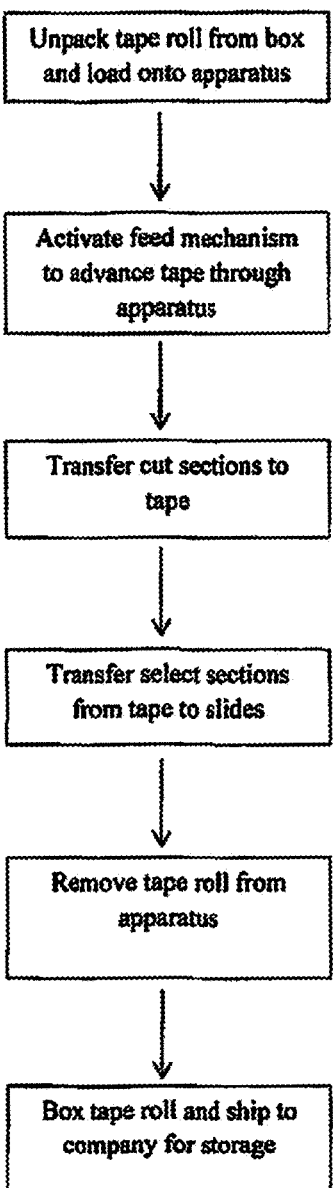
FIG. 23B is a flow chart illustrating the steps in accordance with the tissue storage system of FIG. 23A.
Figure 23C:
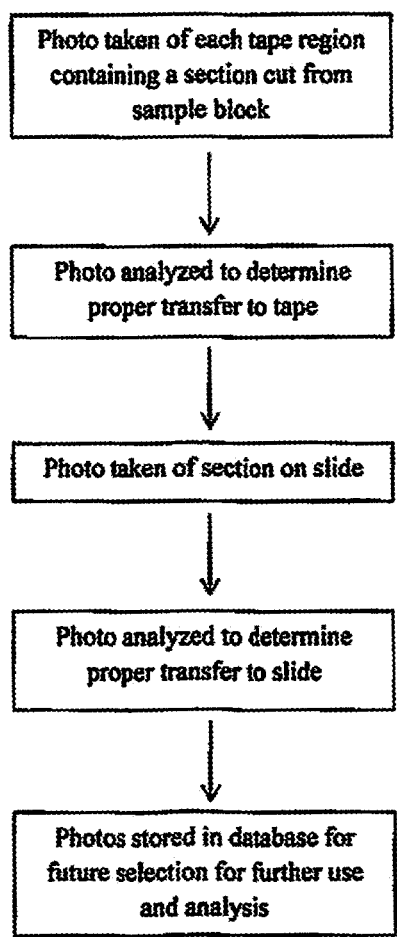
FIG. 23C is a flow chart illustrating the steps of a data storage system of the present invention.
Figure 29:
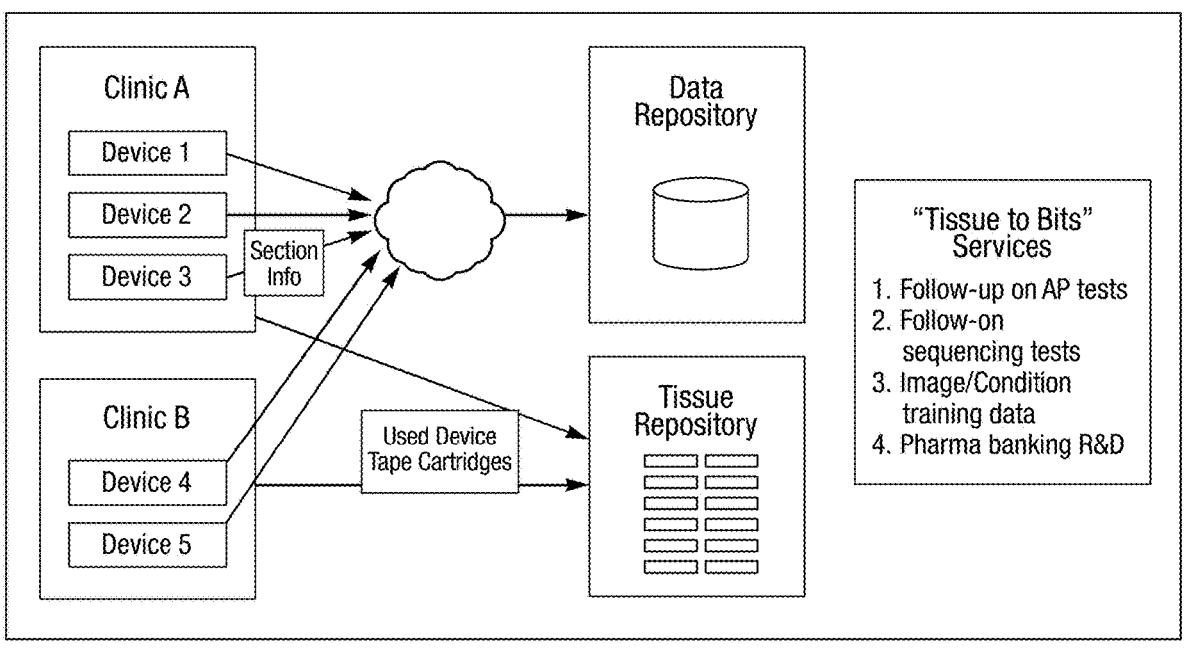
FIG. 29 is a diagram showing the transfer to the tissue repository and the data repository.

In alternate embodiments, the foregoing automated tape transfer apparatus (systems) include a tissue storage system for tissue samples and/or a data storage system. FIG. 23A provides a schematic view of the system for storing tissue samples and FIG. 23B provides a flow chart summarizing such system, hereinafter referred to as the "tape cartridge system" or the "tissue storage system." In this tissue storage system, sections cut from the sample blocks are stored on the tape that is fed through the aforedescribed tape transfer apparatus. FIG. 23C provides a flow chart summarizing the system for taking and storing digital photos, hereinafter referred to as the "data collection system" or "data storage system." In this system, photos are taken at various stages of the tape advancement through the transfer apparatus and the photos are utilized for real time analysis as well as stored in a database for later retrieval and evaluation. Both of these storage systems are discussed in detail below, along with various tape section identifiers, sample block identifiers and other stored information to facilitate later access. Further, FIG. 29 shows a diagram illustrating uses of the Tissue Depository from the tissue storage system and uses of the photos from the Data Repository, both of which are also discussed in more detail below. Note both the tissue storage system and the data storage system can be used together, or alternatively, only one of the systems used.

Turning initially to the tissue storage system and with initial reference to FIG. 23A, storage of tissue samples is provided on tape roll 702. More specifically, tape roll 702 is housed in a cartridge 704 which protects the tape. The cartridge 704 is contained in a shipping box 706. Note the tape roll 702 can be a continuous adhesive tape as in the embodiment of FIG. 1 or a tape roll containing discrete adhesive sections as in the embodiment of FIG. 20. In either version, the tape has adhesive for adherence (retention) of the cut sections. However, as an alternative to a chemical or mechanical adhesive, other methods can be utilized to retain (adhere) the sections on the tape, including the section itself having properties that would secure it to the tape. In each of these methods, the end result is the tape retains the cut sections from the sample block for transport through the remainder of the apparatus and for storage after passing through the apparatus. The tape can therefore be considered as having "adherence portions" or "retention portions" or "section receiving portions" which retain/secure (hold) the cut sections of the sample block.

Referring back to FIG. 23A, the user unpacks the tape roll 702 and loads it onto the feed mechanism of the apparatus such as feed mechanism 3 of FIG. 1 or feed mechanism (supply spool 142) of FIG. 20. The tape roll 702 in preferred embodiments is provided in a cartridge or cassette 704 having a feed reel 704*a* and a take up reel 704*b* for winding of the tape 702 after passage through the tape transfer apparatus. The cartridge (enclosure) 704 is preferably sealed to keep contaminants, e.g. particles such as dust, from entering the cartridge and damaging the tape or sections and to prevent cross-contamination. The cassette 704 can also be configured to enable stacking of multiple cartridges to facilitate storage and access to select cartridges. The cartridge can also in addition or as an alternative to an identifying physical label have a RFID (radiofrequency identification), bar code, magnetic strip or other identification system(s) to function as a remote locator for a large number of cartridges stored at a site.

To maintain the cut sections on the tape after removal of the tape from the tape transfer apparatus after use, a cooling gel or other type of coolant can be included in the enclosure for the tape to keep the sections at the necessary cool temperatures to maintain the integrity of the cut sections. Such gel or other cooling methods can be provided in the cartridge itself and/or the shipping box.

Since the tape after passing through the apparatus and retaining the tissue sections is wound on the take up reel, the tape can be provided with a backing that does not stick to adhesive so it does not damage the rolled tape or prevent rewinding of the tape roll at a later date. It can also be provided with a protective layer that is placed over the tape after the sections adhere to the tape. For instance, a layer can be provided as it is rolled on the take up reel.

For ease of description, the tissue storage system will now be described for use with the embodiment FIG. 1, it being understood, however, it could also be used with the embodiment of FIG. 20. As the tape roll 702 is fed through the transfer apparatus 1 of FIG. 1, select tissue sections cut from the sample block and adhesively retained on the tape (a subset of the cut tissue sections) are transferred from the tape to slides within the slide station 5 while other tissue sections cut from the sample block and adhered to the tape, i.e., the non-selected tissue section (forming another subset of the cut tissue sections), are not transferred to the slides. The samples (sections) not transferred to the slides, which comprise a subset of the set of tissue sections originally on the tape, remain adhesively retained on the tape after the cycle of feeding the tape through the tape transfer apparatus is complete. The "used" tape, i.e., the tape with tissue sections contained thereon, is then removed from the take up mechanism of the transfer apparatus, such as take up mechanism 6 of FIG. 1, and placed in a shipping box, e.g., box 706, for returning to the designated addressee, hereinafter referred to as the "receiving company." Note the return shipping box can be the same as the box 706 in which the new tape was initially shipped. However, in alternate embodiments, a return shipping box can be provided that is different from the box in which the new tape was shipped. In either case, a pre paid shipping label 708 can also be provided to facilitate return of the used tape to the receiving company. The tape is stored by the receiving company, or a third party designated by the receiving company, and when necessary can be utilized to generate additional slides at a later date for the clinic for analysis as discussed in detail below. Note the receiving company as used herein is merely to describe a place of return shipment for ease of explanation herein. In preferred versions of the system, the supplier of the tape is the same company that receives and stores the used tape and can thereby also be referred to as the source company. However, it should be appreciated that alternatively, a different company can ship the new tape and/or receive the used tape and/or store the used tape.

As discussed in more detail below, the tape is provided with some type of marking or tracking system so that the sections on the tape can be correlated to the sample block. Such markers can include absolute distance markers, bar codes, indexing, pre-printed identifiers or imprinting or other identifiers placed on the tape in situ (during its movement through the apparatus). That is, the identification system can be provided on the tape at the manufacturing stage (or at a stage prior to being fed through the apparatus), as well as by a machine as the tape is passing through the apparatus. For example, once a sufficient number of sections have been taken from the sample block, the tape can be imprinted to correlate/identify the sample block. Less ideal, but still viable as an alternative, the sections on the tape can be later identified by a simple counting method as the tape is unwound. Markers could also be placed on the tape cartridges.

The identification system can also include tiny Radiofrequency Identification (RFID) tags affixed regularly (at spaced intervals) along the length of the tape for identifying sections of the tape. These embedded RFID chips would enable remote reading and identification, e.g., searching the tapes and specific cut sections on tape in the tissue repository. The RFID chips would also enable storage of additional information. Note the RFID tags could also be placed on the tape cartridge for identifying and tracking the stored tape cartridges. Also, the RFID tags could be placed on the slides and on the tissue blocks for identification.

The steps of use of the tape cartridge system are generalized in the flow chart of FIG. 23B wherein first the tape roll, contained in a cartridge, is unpacked by the user at the receiving end, e.g., a clinic, and then loaded onto the tape transfer apparatus (system), such as apparatus 1 of FIG. 1. Note the cartridge which protects the tape is preferably configured to be loaded onto the feed mechanism and take up mechanism of the apparatus for protection of the tape and sample sections on the tape as the tape is taken up. After loading, the feed mechanism of the automated apparatus is activated to advance the tape through the tape transfer apparatus. The tissue sections are cut from the sample block by the microtome and transferred to and retained on the adhesive tape. As discussed in above in detail, the tape with attached cut sections is then advanced to the slide station which is positioned downstream of the microtome, and select sections are transferred from the tape to the slides. Note the tape can be used not only to transfer a large number of tissue sections from a single sample block but to transfer a large number of sections from a large number of sample blocks from a large number of patients, with the tape provided with appropriate markers as described in detail below for accurate tracking. After transfer of select sections to slides, the tape is removed from the apparatus, e.g., removed from the take up mechanism 6, and placed in the box and shipped to the receiving company for storage. Note the use herein of the term tissue sections or cut sections contemplates that initial sections cut from the sample block may not contain much tissue as they could contain the overlying material, e.g., paraffin or other embedding medium. However, it is the sections of tissue, i.e., the tape regions containing sufficient tissue sections, that are critical for histopathology and these are preferably among those selected for transfer to the slides. A feature to ensure this can be provided in the manner described below.

Note this tape cartridge system provides a more conservative approach to tissue sectioning than traditional manual methods where tissue is discarded during trimming of the sample block. In the tape cartridge system of the present disclosure, in accordance with some embodiments, all the cut sections from the sample block are captured onto the tape while only the desired (select) sections are transferred to glass, i.e., a slide, and the remaining non-transferred sections remain stored on the tape for future use. Thus, with X sections cut from the sample block, X sections are transferred to the tape while only some of the sections (X-Y) are transferred to slides, leaving another group (X—(X-Y)) of non-selected sections on the tape stored for later retrieval. Stated another way, the sections transferred to slides is a first subset of the set of sections on the tape, and the remaining sections not transferred to slides is a second subset of the original set of sections on the tape, different from the first subset.

The tape cartridge system also facilitates taking sections from the sample block at different depths. More specifically, if the user wants a first section at depth a and a second section at depth b, currently the sections between depths a and b are discarded as the microtome cuts away the sections to reach the desired depth. However, with the tape cartridge system disclosed herein, the sections of tissue at the non-selected (undesired) depths, rather than being discarded, can be transferred and stored on the tape. This enables access at a later date, e.g., if a clinic later decides it is beneficial to evaluate tissue between depths a and b, since such sections are stored on the tape, retrievable from the tape and transferable to slides from the tape. Additionally, oftentimes in order to smooth out the surface of the cutting block for better quality samples in advancing to different depths to access the area of interest at the time, cut tissue from the sample block is discarded. The tape cartridge system can help avoid the potential pitfalls of discarding such cut tissue as it can transfer and store on the tape all cut sections for later access and evaluation so no region of the sample block is missed.

The tape transfer apparatus (system) of FIGS. 23A-29 also includes one or more automated imaging devices such as digital cameras for taking photos during various stages of the automated tape feed/advancement process. The photos can be taken at the time of the cut section transfer to the tape, at the time of transfer of the cut section to the slide, and/or at any other time during the process. Such photos provide a dual purpose-visual/quality control and data storage.

Photos can also be taken of the sample blocks (block face). For example, a mismatch between the block face image and section on tape image is a cue for an error during sectioning. A macro image can be useful in a thumbnail in a database listing section images. This can be useful for roughly figuring out when to start transferring sections to the tape when cutting. These are various ways to image the tissue within the system other than a digital camera. For example, MicroCT can be used to construct a 3D model of the tissue within the paraffin. If the system has a 3D model of the tissue in the block as input, it could use the information to determine when to stop trimming and sectioning.

With regard to visual/quality control, as the tape advances through the apparatus and sections are cut from the sample block by the microtome and adhered to the adhesive of the tape, a photo (or other imaging technique) is taken of each tape region containing a tissue sample (cut section) transferred to the adhesive tape thereby enabling real time analysis to make sure the section has been properly, i.e., completely, transferred to the tape. Utilizing the same camera, or alternatively, utilizing another camera or imaging device, as the tape with the adhered sections cut from the sample block advances to the slide station and the section is transferred to a slide, a photo (or other imaging technique) is taken of each slide containing the sample to enable real time analysis to make sure the section has been properly, i.e., completely, transferred to the slide. In this manner, the process can be monitored to ensure adequate sections of the sample block are cut and transferred to slides for pathology before cessation of the tape feed. In certain embodiments, if inadequate sections have been transferred, the system can be reversed and the tape unwound in the direction opposite the initial direction of advancement to collect and transfer more sections (samples) from the sample block. Also note that multiple photos of each tape region and each slide containing the cut section can be taken for evaluation.

The other purpose of the photos is data storage in accordance with the data storage system of the present disclosure. In this system, the photos of each tape region containing a section cut from the sample block are stored, e.g., in the cloud, creating a cloud based data repository. Other information from the photos is also stored to identify the sample block, sections, etc. as described below in conjunction with the description of the marking and tracking of the blocks and sections.

The flow chart of FIG. 23C provides a generalized depiction of the implementation of the visual control and data storage system. As depicted, a photo is taken of each tape region containing a section, e.g., tissue section, cut from the sample block by the microtome. The photo is then analyzed to determine whether the cut section is properly transferred to the tape. In a further analysis, the photo is evaluated to determine the end of the sample block trimming (described below). A photo is also taken of the slide once the tissue section has been transferred to the slide within the slide station (downstream of the microtome). This photo of the slide is analyzed to determine if the tissue section was properly transferred to the slide. The photos can also be analyzed to determine if sufficient tissue sections are contained on slides. The photos are stored in a database for future selection if further use and analysis is desired. The photos can be stored and tracked in the manner described below.

As mentioned above, the digital photos also can be utilized to initiate rewinding the tape during the tape transfer process if desired. Such system is shown in the flow chart of FIG. 26. The microtome cuts the section from the sample block and a photo is taken of the tape region containing the section adhered thereto. The photo records the location of the section on the length of tape (such as by the visual markers described below). The photo is analyzed to determine if the section was properly transferred to the tape and further analyzed to determine if a sufficient section of tissue cut and transferred from the sample block is on the tape. It can also be analyzed to determine end of block trimming. The section is then advanced on the tape to the slide station and the section transferred to the slide. A photo is taken of the slide with the attached section and the photo analyzed to determine if the section was properly transferred to the slide. If the transfer to the slide of this section is sufficient, i.e., the sample is properly (completely) positioned on the slide, then tape advancement continues. However, if the section has not been transferred to the slide, e.g., transfer of an important tissue section is bypassed, the system can reverse the direction of the tape, i.e., rewind the tape roll 702, to realign the missed section with the slide for application to the slide. After application of the section previously missed, a photo is taken of the slide with the attached section and evaluated for proper transfer. If slide transfer is satisfactory, the system will again reverse and return to the initial (normal) tape feed direction. Also, as part of the process, the photo analysis will determine if a sufficient number of tissue sections have been transferred to slides for analysis (histopathology). That is, as discussed above, the sample block is preserved in a material such as paraffin. Therefore, the initial sections cut from the sample block may contain larger sections of paraffin rather than sections of tissue of interest. The photos can therefore be utilized to determine that a sufficient number of sections containing a sufficient amount of tissue cut from the sample block are transferred to slides. Thus, in accordance with the system (depicted in the flow chart of FIG. 26), if a sufficient number of sections of tissue cut from the sample block have been transferred to slides, the microtome will cease sectioning of the sample block. On the other hand, if an insufficient number of tissue sections have been transferred to slides, the microtome operation to cut sections from the sample block continues until a sufficient number of slides are created whereupon cessation of sectioning occurs.

Note that reversal of the tape feed direction can be provided after slide analysis via imaging. It is also contemplated that the tape feed direction can be reversed at other points in the process such as after analysis of section transfer to the tape.

Figure 24A:
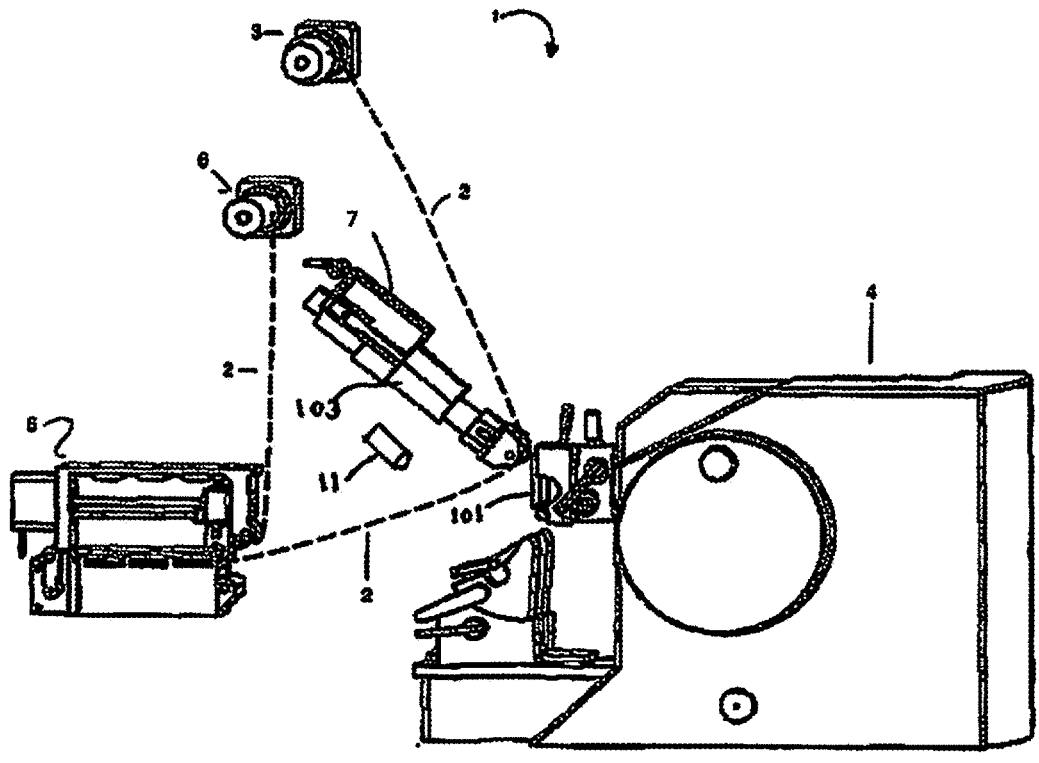
FIG. 24A is a schematic view of an automated tape transfer apparatus utilizing the tissue storage system and the digital storage system.
Figure 25A:
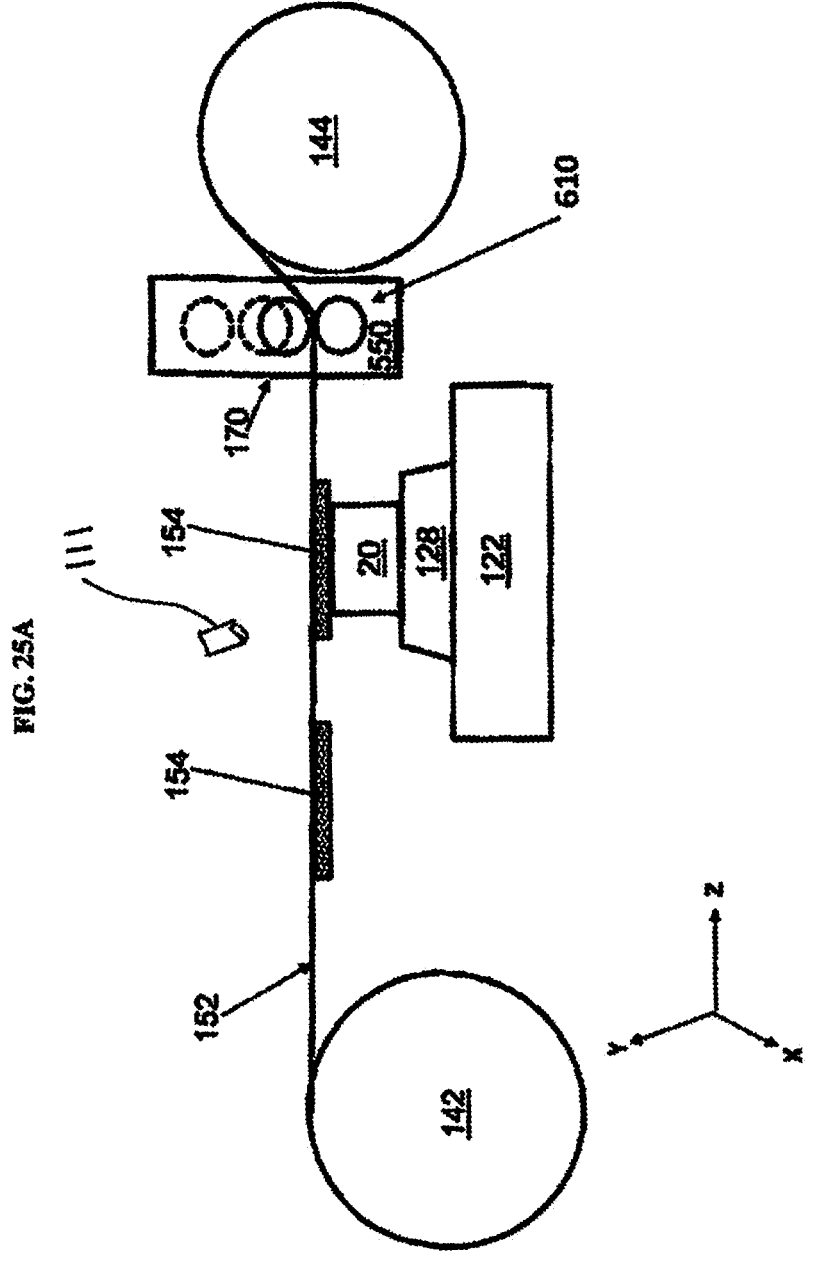
FIG. 25A is a schematic view of an alternate embodiment of the automated tape transfer apparatus utilizing the digital storage system of the present disclosure.

The tissue storage and data storage systems are shown in use with the tape transfer apparatus (system) of FIGS. 1 and 20 in FIGS. 24A and 25A, respectively. That is, FIG. 24A depicts the imaging device 11 adjacent the tape applicator 7, with the flow chart of FIG. 24B illustrating the steps of the automated tape transfer system. FIG. 25A depicts the imaging device 111 adjacent the adhesive portion 154 in contact with the sample block, with the flow chart of FIG. 25B illustrating the steps of the automated tape transfer system. Thus, the apparatus of FIG. 24A is identical to the apparatus of FIG. 1 except for the imaging device 11 and thus the description herein of the other aspects of the apparatus of FIG. 1 is fully applicable to the apparatus of FIG. 24A.

Likewise, the apparatus of FIG. 25A is identical to the apparatus of FIG. 20A except for the imaging device 111 and thus the description herein of the other aspects of the apparatus of FIG. 20 is fully applicable to the apparatus of FIG. 25A. Note a single imaging device, 11 and 111 e.g., a digital camera, is depicted in each of the systems. The cameras 11 and 111 are utilized to take photos adjacent the transfer of the cut section to the adhesive of the tape. The same cameras 11 and 111 can be repositioned during the automated operation adjacent the slide station to take photos of the slides after transfer of the section to the slide. Alternatively, a different imaging device can be provided within or adjacent the slide station 5 to take photos after transfer of the section to the slide. As noted above, the apparatus of FIGS. 24A and 25A can take photos of the cut sections after transfer of the cut sections to the tape and after transfer of the cut sections from the tape to the slides, or, alternatively, take photos only after transfer to the tape or only after transfer to the slide. Such photos can be taken at the time of transfer, right after transfer or downstream of the transfer (after the tape as advanced past the tape applicators or advanced past the slide station). The photos of the tape and/or cut sections of the tape can also be taken at other times during the tape feed cycle if desired.

Turning first to the embodiment of FIGS. 24A and 24B, as shown, after the tape, e.g., the tape cartridge 704 of FIG. 23A, is loaded onto the feed mechanism, the feed mechanism 3 is activated to advance the tape, i.e., a continuous length of adhesive tape. The linear actuator member 103 is moved toward the cutting face of the sample block. Next, the roller member 101 presses the adhesive side of the tape onto the cutting face. The roller member 101 is then pushed down to adhere the adhesive tape to cover the entire cutting face. The linear actuator 103 is retracted to its original position to reset the roller for subsequent application of adhesive tape to another sample. The microtome then cuts the section covered by the adhesive tape (along a plane parallel or substantially parallel to the cutting face). A photo is taken of the cut section by the digital camera 11, either at the time of transfer or right after the transfer. The photo is analyzed to confirm proper transfer to the tape. The cut section is advanced downstream to the slide station 5, to align with the slide. At this time the photo is analyzed to determine if a sufficient section of tissue has been cut from the sample block for transfer to the slide. If the section is not sufficient, e.g., it does not contain a sufficient tissue sample as a result for example of containing mostly paraffin, the section is not transferred to the slide and remains on the tape. If the tape region contains a sufficient tissue section, then it is ready for transfer to the slide and the slide roller presses the section onto the slide and the section is then laminated onto the slide by the various methods described above. A photo is taken of the cut section and slide at the time of transfer to the slide or right after the transfer. Note the photo can be taken before or after lamination onto the slide. Note the slides from the slide machine have a bar code or other identification system corresponding to the bar code or other identifier on the sample block. The slide roller is retracted to its original position and the tape is advanced away from the slide and stored on the take up reel of the tape cartridge 704 mounted on the take up mechanism 6. These steps of FIG. 24B repeat until a desired number of sections from the sample block have been cut by the microtome, transferred to the tape, and transferred to slides. Photos are taken of each of these sections when transferred to the tape and when transferred to the slide for analysis during the tape feed operation (quality control) and for data storage for future analysis after operation of the apparatus.

As noted above, in the various embodiments disclosed herein, it is contemplated that in certain applications multiple sections can be transferred to a single slide. It is also contemplated in some embodiments that not all of the sections (or slides) are stained. For genetic analysis, tumor specific sections of tissue are typically done on blank or unstained sections to preserve the DNA since the stain can ruin the DNA. However, the contrast between the regular tissue and tumor is very poor as the unstained section is mainly transparent under the microscope. In the systems disclosed herein, the slide station can include in some embodiments alternating stained and unstained slides. That is, by placing an unstained section (slide) next to a stained section (slide), and detecting the positioning of the sections on the tape and thus the slides due to the tracking methods disclosed herein, the unstained slides can be genetically analyzed. Thus, the stained slide which is nearly identical to the unstained slide will provide regions/coordinates to pick material from the unstained slides. This is achievable since typically a cut section is 5 microns thick which is about ½ the size of the cell.

It is also contemplated that staining and follow up histology tests can be done on the stored transfer tape, skipping the transfer to slides.

Turning now to the alternate embodiment of FIGS. 25A and 25B, as noted above, instead of a continuous adhesive tape, discrete (spaced apart) sections of the tape are provided with adhesive and applied to the sample.

In this apparatus (system). the chuck head 122 and chuck adapter 128 have advanced to a microtome-ready position, with the sample (sample block) 20 advanced to a position ready for cutting and a patch of sample tape 154, carried on the carrier strip 152 advanced from the supply spool 142, is aligned with the sample 20, i.e., disposed parallel (or substantially parallel) to and facing the surface of sample. As shown in FIG. 25B (as in FIG. 20A), the carrier strip guide 170 is in the "Apply" position 610 so that the carrier strip 152, upon which is adhered the patch of sample tape 154, is parallel (or substantially parallel) to the surface of the sample block 20 to be cut by the microtome. The patch of sample tape 154 is applied to the surface of sample block 20 and adheres to the surface of the sample block 20 as the carrier strip 152 is pressed onto the sample block 20.

Next, the carrier strip 152 is separated from the sample tape 154 (as in FIG. 20B) for sectioning the sample block 20 at dotted line 23. The carrier strip guide 170 (within block 550) moves from the "Apply" position 610 of FIG. 25B to the "Remove" position (as in position 620 of FIG. 20B), thus changing the angle of the carrier strip 152 relative to the sample block 20 so it is no longer parallel (or substantially parallel) to the sample block 20, and forcing the carrier strip 152 into a new path that is disposed at an angle from the sample block 20.

Next, the sample block 20 is prepared to be sectioned. The carrier strip 152 has been separated from the sample tape 154, which is firmly adhered to the sample block 20. The knife blade of the microtome makes a single cut through the sample block 20 at cut line 23 to create a cut section, i.e., a specimen segment (section) 24 (as in FIG. 20C which shows a stage of the tape application process in which the microtome operation has been completed and the specimen segment 24 is stuck to the patch of sample tape 154), and hereinafter together referred to as the tape-sample segment 25. Note the tape-sample segment 25 has been removed from the knife-block and is now out of the way of the chuck head assembly. A photo is taken of the cut section by digital camera 111, either at the time of transfer or right after the transfer to the tape. The photo is analyzed to confirm proper transfer to the sample tape 154.

The tape sample segment 25 is then transported downstream to the slide station 5 to align with the slide. At this time the photo is analyzed to determine if a sufficient section of tissue has been cut from the sample block and transferred to the sample tape 154. If the section is not sufficient, e.g., it does not contain a sufficient tissue sample as a result for example of containing mostly paraffin, the section is not transferred to the slide and remains on the sample tape. If the tape region does contain a sufficient tissue section, then it is ready for transfer to the slide and the slide roller presses the section onto the slide in the same manner as in FIGS. 10-12 and the sample tape is removed and the section is then laminated onto the slide by the various methods described above. A photo is taken of the cut section and slide at the time of transfer to the slide or right after the transfer. Note the photo can be taken before or after lamination onto the slide. The slide roller is retracted to its original position and the tape is advanced away from the slide and stored in the take up reel of the tape cartridge 704 mounted on the take up mechanism.

The microtome is then again ready for a microtome operation. The advancement mechanism automatically moves the chuck head 122 forward a selected amount such that the sample block (specimen) 20 is in position for the next cut of a chosen thickness. Thus, the sample block 20 is again advanced by the chuck head 122 to a microtome-ready position. The tape transport unit advances and aligns a new patch of sample tape 154 above and parallel (or substantially parallel) to the surface of the sample block 20, and the actuator system returns the carrier strip guide 170 to the "Apply" position 610. The section is cut, removed from the carrier strip, a photo is taken and stored and the section is transferred to the slide station 5. This is repeated until the desired number of sections from the sample block have been cut, transferred to the tape and transferred to the slides. Photos are taken of each of these sections when transferred to the tape and when transferred to the slide for analysis during the tape feed operation (quality control) and for data storage for future analysis after the operation of the apparatus.

As described herein, photos are taken at various stages of the tape feed cycle for real time analysis. Such photos can be utilized in addition to or as an alternative to the optical sensors discussed above for providing feedback of the quality of the section transferred to the tape and/or the quality of the section transferred to the slide.

The flow chart of FIG. 25B illustrates the system depicted in FIG. 25A. The feed mechanism is activated to advance the carrier strip carrying patches of sample tape with adhesive until the sample tape 154 with adhesive is aligned with the sample surface. The roller moves to press the sample tape onto the sample surface with the carrier strip guide 170 in the Apply position. The roller is then retracted to the initial position. The carrier strip guide 170 moves to the Remove position to move the carrier strip out of the path and the carrier strip is separated from the sample tape. Next, the microtome cuts a section from the sample block. A photo is taken of the cut section on the tape. The sample tape with attached section advances to the slide station, e.g., station 5 of FIG. 1, to align with a slide. The sample tape with attached section is analyzed to determine if there is a sufficient amount of tissue for transfer onto slide. If insufficient, it is not transferred and remains on the sample tape; if sufficient, it is transferred to the slide by the slide roller pressing the sample tape onto the slide, and the sample is laminated onto the slide by the various methods described above. A photo is taken of the slide containing the section. The slide roller is retracted to its original position and the tape is advanced away from the slide and stored on the cartridge take up reel on the take up mechanism. These steps repeat until a desired number of sections have been cut by the microtome, transferred to the tape, and transferred to slides.

Note that FIG. 25 like FIGS. 20A-20C illustrates a system where the sample tape is separated from the carrier strip after being cut before transport to the slide station for transfer to slides. It is also contemplated that in an alternate embodiment, the sample tape containing the cut sample is not removed from the carrier strip prior to transfer to the slide station. Thus, in this alternate embodiment, although discrete adhesive sections are provided along the tape for individual adherence of sample tape to the sample, the sample tapes with attached sample do not separate from the carrier strip but continue to be carried by advancement of the carrier strip into the slide station for transfer of the samples to the slides.

Figure 27A:
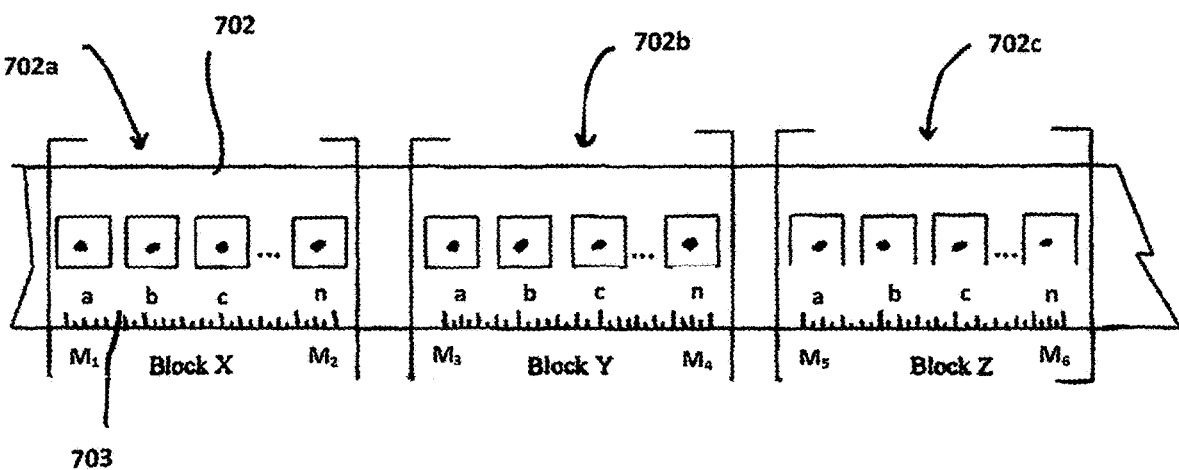
FIG. 27A is a schematic view of a region of the tape of FIG. 23A containing tissue sections cut from a sample block during operation of the apparatus of FIG. 24A.

Turning now to the system for tracking/marking of the tape and recordation of data from the tape, and with initial reference to FIG. 27A, the sequence of sections cut from the sample block and their association with the sample blocks from which they are cut are illustrated. The tape (tape roll) 702 includes markings 703 along its length (see also FIG. 23A) to provide a marker to track the location (actual positioning) of the sections from the sample block retained on the tape 702. This provides a physical locator on the tape itself, e.g., a measurement of absolute distance from the ends of the tape roll 702 for later reference and/or access for further analysis. Thus, for example, when sections are cut from Block X, these cut sections are positioned on the tape in the region 702a, beginning at distance (or marking) M1 and terminating at distance (or marking) M2. The cut sections from Block Y are in the region 702b of the tape beginning at distance (marking) M3 and terminating at distance (marking) M4. The cut sections from Block Z are in the region 702c of the tape 702 beginning at distance (marking) M5 and terminates at distance (marking) M6, etc. For illustrative purposes, three blocks are shown in FIG. 27A and identified generically as Blocks X, Y, Z with markings M1-M6 representative of the specific marker location on the tape, i.e., an absolute distance or absolute index, from an end of the tape, for each of the sections taken (cut) from the sample blocks. It should be understood that sections from additional (or fewer) blocks could be demarcated on regions of the tape 702 to correspond to the number of sample blocks cut and with sections stored on the tape 702. For example, in some operations of the tape transfer apparatus, as many as 80 sample blocks can be sectioned and transferred to a single roll of tape. Additionally, for ease of understanding, FIG. 27A illustrates within each tissue region, a series (set) of tissue sections from the sample block, each individually labeled as a, b c, etc. up to section labeled n, with each box a-n containing a cut section shown schematically. In some embodiments, the number n of tissue sections from each sample block can range for example between one and twelve sections, although it is also contemplated that more than twelve sections can be cut from a sample block and stored on the tape 702. The tape roll 702 can be of various lengths to enable storage of sections from a large number of sample blocks. In some embodiments, the tape roll 702 can have a length for example of between about 30 to about 40 meters, although tape rolls of other lengths are also contemplated.

Figure 28A:
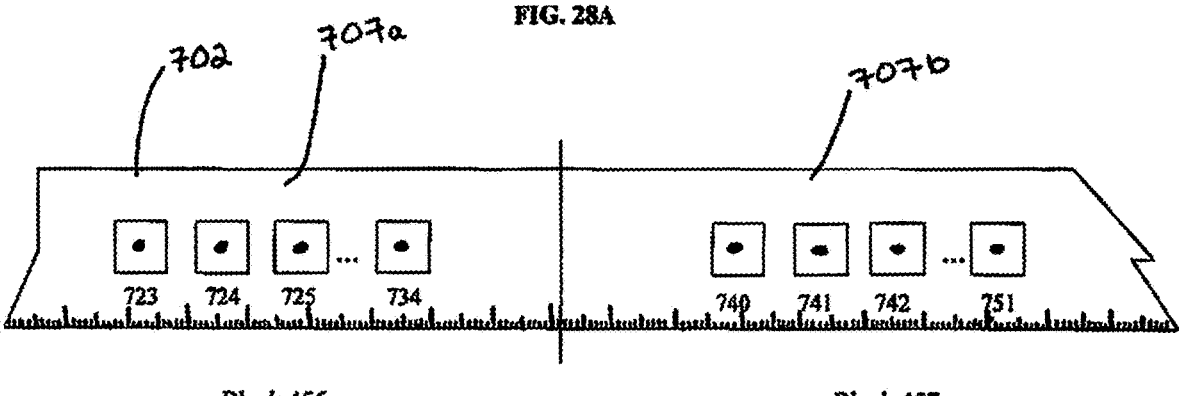
FIG. 28A is a schematic view similar to FIG. 27A showing an example of specific tape regions containing sections cut from the sample block.

FIG. 28A is a view of a region of the tape similar to FIG. 27A except showing for ease of understanding an example of tracking the actual positioning of cut sections from two different sample blocks. Sections from sample block 456 have been cut and transferred to the tape region 707a in the middle of the tape and the sections can be identified consecutively. The sections are at the measurement markers 723, 724, 725, up to 734, indicating several sections, e.g. twelve sections, have been cut from sample block 456 and positioned from the 723 to 734 distance marker. Adjacent tape region 707a is tape region 707b which contains sections from the next sample block 457. These cut sections can also be identified consecutively, and the sections are at the measurement markers 740, 741, 742, up to 751 indicating that a number of sections, e.g. twelve sections, have been cut from sample block 457 and positioned from the 740 to the 751 marker. Note that in FIG. 28A, the sections from the different blocks are separated by a distance with a line as a demarcation for ease of understanding since the absolute distance would be continuous. This distance marking of the cut sections associated with consecutive numbered sample blocks continues on the tape 702 to provide an indicator/marking for all sections on the tape 702. Thus, as can be appreciated, the sections which are not transferred to slides in the manner described above and therefore remain on the tape roll for shipment to the receiving company for storage can later be identified and accessed from the stored tape roll and transferred to slides or used for other purposes if needed.

Note the numbering of blocks 456, 457 and distances on the tape 723-745 FIG. 28A are provided by way of example to illustrate the sequence of sections on the tape 702 and their association with the blocks from which they are cut. Note other sample block and section identifiers can also be utilized. Also note that FIG. 28A shows a selected region of the tape and provides labels by way of example only. Also note that the labeling of the regions of the tape, e.g. 707a, and 707b, are for purposes of the application drawings to describe the tape of the present disclosure and in preferred embodiments are not part of the actual markings/indicators of the stored tape.

Figure 27C:
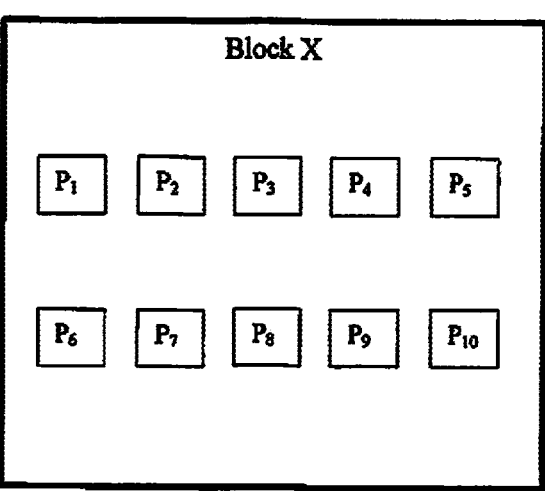
FIG. 27C is a schematic view of a collection of photos of sections cut from a sample block in accordance with the system of FIG. 24A.

As noted above, a digital photo is taken of each section transferred to the tape and stored. FIG. 27C illustrates an example of ten photos P1-P10, representing photos of the ten cut sections from block X by way of example. The tape can also include optical encoders so that photos of each section also record where on the tape the section is stored by performing OCR on the optical encoders of the tape. In this way, the tape can be advanced or rewound to the exact section. The tape can be composed of a material which provides properties for optimal imaging. It can also be semi-transparent to enable passage of light from the underside to enhance imaging.

FIG. 27B illustrates the information about each sample block that is saved in the cloud; FIG. 28B illustrates a specific example of sample block information. With initial reference to FIG. 27B, the stored information includes: Block "X" to identify which sample block has been cut to obtain tissue samples (sections); the number "A" of sections cut; the number "B" of slides created from the cut sections; the images "P1-Pn" of each section on the tape (before slide transfer); and the images S1-Sn of each cut section on the slide. Also identified are the tape cassette C, the tape index start "D" and the tape index end "E" to identify the location of the section on the tape. For ease of understanding, FIG.

28B provides one example of a specific sample block for explanatory purposes as clearly a different number of sections, images etc. are contemplated for the sample blocks. For example, information from block 456 is stored in the cloud which contains 12 sections, 3 slides, 12 section images, and three slide images. These are located on tape cassette 628, starting at tape marking 723.2 and ending at marking 726.5. Thus, for example, after the tape is stored and an additional slide is required from block 456, the tape can be unwound to the visual marking 723.2 to access a tissue section contained within the tape marking 723.2 and 726.5.

As discussed above, the aforedescribed system and method creates a tissue repository and a data repository shown schematically in FIG. 29. The tissue repository is created from the tape roll containing the sections from the sample block not transferred to the slides. The tape roll is boxed and shipped to the receiving company, e.g., storage site, as discussed above. The tissue repository enables the creation of additional slides at a later date, i.e., after the tape roll has been fed through and removed from the tape transfer/slide transfer apparatus. The advantages of creating additional slides include the enablement of follow up anatomic pathology tests requested by clinics, tissue, image and sequencing data to support R&D and follow up sequencing and targeted sequencing requested by clinics to evaluate whole sections or portions of the sections, e.g., cutting out the tumor section. The data depository, created by the digital photos taken during the feeding of the tape through the tape transfer/slide transfer apparatus are stored in the cloud. The advantages includes enabling customers to view data through a web browser, store de-identified patient information associated with the tissue and digitized whole slide images that the tissue repository scans, and slide digitization for creating a training data set for automated diagnostic algorithms.

Thus, as can be appreciated, this storage system simplifies and reduces costs, as well as improves clinical care. Without the storage systems disclosed herein, follow on diagnostic tests, e.g., special stain or sequencing, would require either 1) creating additional glass slides at the time of sample block sectioning to anticipate possible need (which is rarely done because of the high cost of storing and retrieving the slides) or 2) recalling the original sample block and ordering more sections cut. Thus, the storage and retrieval systems and methods of the present disclosure provide a beneficial and cost-effective way for clinics to order follow-on tests.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A system comprising:
one or more imaging devices;
a tape configured to transfer one or more tissue sections from a sample block to one or more slides; and
a controller configured to receive, from the one or more imaging devices, and compare one or more images of the one or more tissue sections on the tape with at least one of:
one or more images of the one or more tissue sections on a cutting face of the sample block; or
one or more images of the one or more tissue sections on the one or more slides.

2. The system of claim 1, wherein the controller is further configured to save the one or more images in a database, the database comprising an identification of the sample block, a number of the one or more tissue sections cut from the sample block, or a number of the one or more tissue sections transferred to the one or more slides.

3. The system of claim 1, wherein the one or more slides have a label corresponding to a label on the sample block.

4. The system of claim 1, wherein the controller is further configured to determine automatic cessation of cutting sections from the sample block when a sufficient number of a plurality of the one or more tissue sections from the sample block have been transferred to a plurality of the one or more slides.

5. The system of claim 1, wherein:
the one or more images of the one or more tissue sections on the cutting face of the sample block comprise:
an image of a first tissue section on a first cutting face of the sample block; and
an image of a second tissue section on a second cutting face of the sample block;
the one or more images of the one or more tissue sections on the one or more slides comprise:
an image of the first tissue section on a first slide; and
an image of the second tissue section on a second slide; and
the controller is further configured to:
compare the image of the first tissue section on the first cutting face of the sample block with the image of the first tissue section on the first slide; and
compare the image of the second tissue section on the second cutting face of the sample block with the image of the second tissue section on the second slide.

6. The system of claim 1, wherein the controller is configured to analyze the one or more images to determine if only a portion of a tissue sample in the one or more tissue sections on the cutting face or on the tape was transferred on the one or more slides.

7. A method, comprising:
capturing, with one or more imaging devices, one or more images of one or more tissue sections carried on an automated transfer mechanism, and at least one of:
one or more images of the one or more tissue sections on a cutting face of a sample block; or
one or more images of the one or more tissue sections on one or more slides;
receiving, with a controller, the one or more images of the one or more tissue sections on the automated transfer mechanism, and at least one of:
the one or more images of the one or more tissue sections on the cutting face of the sample block; or
the one or more images of the one or more tissue sections on the one or more slides; and
comparing, with the controller, the one or more images of the one or more tissue sections on the automated transfer mechanism with at least one of:
the one or more images of the one or more tissue sections on the cutting face of the sample block; or
the one or more images of the one or more tissue sections on the one or more slides,
wherein the automated transfer mechanism is configured to transfer the one or more tissue sections from the sample block to the one or more slides.

8. The method of claim 7, further comprising saving, with the controller, the one or more images in a database, the database comprising an identification of the sample block, a number of the one or more tissue sections cut from the sample block, or a number of the one or more tissue sections transferred to the one or more slides.

9. The method of claim 7, further comprising:

identifying, with the controller, a label on the one or more slides and a label on the sample block; and correlating, with the controller, the one or more slides with the sample block.

10. The method of claim 9, wherein the label on the one or more slides links the one or more slides to the sample block.

11. The method of claim 7, further comprising determining, with the controller, automatic cessation of cutting sections from the sample block when sufficient sections of tissue from the sample block have been transferred to the one or more slides.

12. The method of claim 7, wherein:

the one or more images of the one or more tissue sections on the cutting face of the sample block comprise:

an image of a first tissue section on a first cutting face of the sample block; and an image of a second tissue section on a second cutting face of the sample block;

the one or more images of the one or more tissue sections on the one or more slides comprise:

an image of the first tissue section on a first slide; and an image of the second tissue section on a second slide; and the method further comprises comparing, with the controller:

the image of the first tissue section on the first cutting face of the sample block with the image of the first tissue section on the first slide; and the image of the second tissue section on the second cutting face of the sample block with the image of the second tissue section on the second slide.

13. The method of claim 7, further comprising analyzing, with the controller, the one or more images to determine if the one or more tissue sections were fully transferred on the one or more slides.

14. A non-transitory computer-readable medium comprising instructions, the instructions executable by one or more processors to perform operations, including:

receiving, from one or more imaging devices, one or more images of one or more tissue sections on a tape transfer apparatus, and at least one of:

one or more images of the one or more tissue sections on a cutting face of a sample block; or one or more images of the one or more tissue sections on one or more slides, wherein the tape transfer apparatus comprises:

a tape;

a feed mechanism; and a take-up mechanism, wherein the tape transfer apparatus is configured to transfer the one or more tissue sections from the sample block to the one or more slides; and comparing the one or more images of the one or more tissue sections on the tape transfer apparatus with at least one of:

the one or more images of the one or more tissue sections on the cutting face of the sample block; or the one or more images of the one or more tissue sections on the one or more slides.

15. The non-transitory computer-readable medium of claim 14, the instructions executable by the one or more processors to further perform operations, including:

saving the one or more images in a database, the database comprising an identification of the sample block, a number of the one or more tissue sections cut from the sample block, or a number of the one or more tissue sections transferred to the one or more slides.

16. The non-transitory computer-readable medium of claim 14, the instructions executable by the one or more processors to further perform operations, including:

identifying a label on the one or more slides and a label on the sample block; and correlating the one or more slides with the sample block.

17. The non-transitory computer-readable medium of claim 16, wherein the label on the one or more slides links the one or more slides to the sample block.

18. The non-transitory computer-readable medium of claim 14, the instructions executable by the one or more processors to further perform operations, including:

determining automatic cessation of cutting sections from the sample block when sufficient sections of tissue from the sample block have been transferred to the one or more slides.

19. The non-transitory computer-readable medium of claim 14, wherein:

the one or more images of the one or more tissue sections on the cutting face of the sample block comprise:

an image of a first tissue section on a first cutting face of the sample block; and an image of a second tissue section on a second cutting face of the sample block;

the one or more images of the one or more tissue sections on the one or more slides comprise:

an image of the first tissue section on a first slide; and an image of the second tissue section on a second slide; and the instructions are executable by the one or more processors to further perform operations, including:

comparing the image of the first tissue section on the first cutting face of the sample block with the image of the first tissue section on the first slide; and comparing the image of the second tissue section on the second cutting face of the sample block with the image of the second tissue section on the second slide.

20. The non-transitory computer-readable medium of claim 14, the instructions executable by the one or more processors to further perform operations, including:

analyzing the one or more images to determine if the one or more tissue sections were fully transferred on the one or more slides.

* * * * *